US012684157B2

(12) United States Patent
Chen et al.

(10) Patent No.: US 12,684,157 B2
(45) Date of Patent: **\*Jul. 14, 2026**

(54) INTER PREDICTION METHOD AND RELATED APPARATUS

(71) Applicant: Huawei Technologies Co., Ltd., Shenzhen (CN)

(72) Inventors: Huanbang Chen, Shenzhen (CN); Xiang Ma, Moscow (RU); Haitao Yang, Shenzhen (CN); Lian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,346

(22) Filed: Jul. 11, 2024

(65) Prior Publication Data

US 2025/0016353 A1 Jan. 9, 2025

Related U.S. Application Data

(63) Continuation of application No. 17/473,517, filed on Sep. 13, 2021, now Pat. No. 12,069,288, which is a
(Continued)

(30) Foreign Application Priority Data

| Mar. 14, 2019 | (CN) | .......................... | 201910195138.4 |
| Apr. 30, 2019 | (CN) | .......................... | 201910363846.4 |
| Mar. 12, 2020 | (CN) | .......................... | 202010169607.8 |

(51) Int. Cl.
*H04N 19/132* (2014.01)
*H04N 19/176* (2014.01)
(Continued)

(52) U.S. Cl.
CPC ......... *H04N 19/513* (2014.11); *H04N 19/176* (2014.11); *H04N 19/182* (2014.11)

(58) Field of Classification Search
CPC .. H04N 19/513; H04N 19/176; H04N 19/182; H04N 19/567; H04N 19/105;
(Continued)

(56) References Cited

U.S. PATENT DOCUMENTS 10,390,015 B2 * 8/2019 Hu .......................... H04N 19/48
10,448,010 B2 * 10/2019 Chen ...................... H04N 19/52
(Continued)

FOREIGN PATENT DOCUMENTS

| CN | 101216941 A | 7/2008 |
| CN | 101325715 A | 12/2008 |
(Continued)

OTHER PUBLICATIONS

Bandyopadhyay, S. et al., (Interdigital Inc.), "CE10-related: Local Illumination compensation simplifications", Joint Video Experts Team (JVET) of ITU-T SG 16 WP3 and ISO/IEC JTC 1/SC 29/WG11, Document: JVET-M0224-v1, 13th Meeting, Marrakech, MA, Jan. 9-18, 2019, 5 pages.
(Continued)

*Primary Examiner* — Philip P. Dang
(74) *Attorney, Agent, or Firm* — Slater Matsil, LLP

(57) ABSTRACT

Disclosed are an inter prediction method based on an affine prediction mode and a related apparatus. The method includes: obtaining a predicted pixel value of a current affine block; obtaining an LIC flag of the current affine block, where the LIC flag is used to indicate whether local illumination compensation LIC is applied to the current affine block; and when the LIC flag indicates that LIC is applied to the current affine block, updating the predicted pixel value of the current affine block based on an update coefficient for
(Continued)

LIC, to obtain an updated predicted pixel value of the current affine block.

20 Claims, 21 Drawing Sheets

Related U.S. Application Data continuation of application No. PCT/CN2020/079081, filed on Mar. 13, 2020.

(51) Int. Cl.
  *H04N 19/182* (2014.01)
  *H04N 19/46* (2014.01)
  *H04N 19/513* (2014.01)

(58) Field of Classification Search
  CPC .... H04N 19/147; H04N 19/503; H04N 19/54;
    H04N 19/70; H04N 19/103; H04N 19/42
  See application file for complete search history.

(56) References Cited

U.S. PATENT DOCUMENTS

| | | | | |
|---|---|---|---|---|
| 10,602,180 | B2 * | 3/2020 | Chen | H04N 19/44 |
| 10,631,002 | B2 * | 4/2020 | Li | H04N 19/147 |
| 10,652,571 | B2 * | 5/2020 | Hu | H04N 19/96 |
| 10,701,390 | B2 * | 6/2020 | Li | H04N 19/54 |
| 10,715,810 | B2 * | 7/2020 | Zhang | H04N 19/176 |
| 10,735,721 | B2 * | 8/2020 | Abe | H04N 19/105 |
| 10,735,759 | B2 * | 8/2020 | Xu | H04N 19/105 |
| 10,834,409 | B2 * | 11/2020 | Yu | H04N 19/136 |
| 10,887,611 | B2 * | 1/2021 | Seregin | H04N 19/521 |
| 10,986,360 | B2 * | 4/2021 | Thirumalai | H04N 19/56 |
| 11,070,797 | B2 * | 7/2021 | Park | H04N 19/159 |
| 11,082,708 | B2 * | 8/2021 | Zhang | H04N 19/159 |
| 11,109,057 | B2 * | 8/2021 | Lin | H04N 19/186 |
| 11,146,800 | B2 * | 10/2021 | Li | H04N 19/176 |
| 11,172,195 | B2 * | 11/2021 | Seregin | H04N 19/105 |
| 11,184,630 | B2 * | 11/2021 | Li | H04N 19/44 |
| 11,197,017 | B2 * | 12/2021 | Xu | H04N 19/56 |
| 11,206,396 | B2 * | 12/2021 | Seregin | H04N 19/159 |
| 11,265,573 | B2 * | 3/2022 | Liu | H04N 19/159 |
| 11,272,201 | B2 * | 3/2022 | Seregin | H04N 19/105 |
| 11,290,743 | B2 * | 3/2022 | Seregin | H04N 19/573 |
| 11,310,515 | B2 * | 4/2022 | Zhao | H04N 19/176 |
| 11,343,541 | B2 * | 5/2022 | Tsai | H04N 19/139 |
| 11,381,834 | B2 * | 7/2022 | Chuang | H04N 19/105 |
| 11,388,394 | B2 * | 7/2022 | Seregin | H04N 19/117 |
| 11,388,398 | B2 * | 7/2022 | Han | H04N 19/85 |
| 11,570,470 | B2 * | 1/2023 | Zhang | H04N 19/139 |
| 11,632,546 | B2 * | 4/2023 | Bang | H04N 19/186 375/240.12 |
| 11,700,391 | B2 * | 7/2023 | Chuang | H04N 19/52 375/240.12 |
| 11,722,694 | B2 * | 8/2023 | Galpin | H04N 19/157 375/240.12 |
| 2018/0376149 | A1 | 12/2018 | Zhang et al. | |
| 2019/0110058 | A1 * | 4/2019 | Chien | H04N 19/52 |
| 2019/0268611 | A1 * | 8/2019 | Chen | H04N 19/196 |
| 2019/0387251 | A1 * | 12/2019 | Lin | H04N 19/105 |
| 2020/0014931 | A1 * | 1/2020 | Hsiao | H04N 19/517 |
| 2020/0252653 | A1 * | 8/2020 | Rusanovskyy | H04N 19/523 |
| 2020/0288158 | A1 * | 9/2020 | Rusanovskyy | H04N 19/176 |
| 2021/0136407 | A1 * | 5/2021 | Aono | H04N 19/55 |
| 2021/0211644 | A1 * | 7/2021 | Su | H04N 19/54 |
| 2021/0243465 | A1 * | 8/2021 | Chen | H04N 19/139 |
| 2022/0038711 | A1 * | 2/2022 | Leleannec | H04N 19/176 |
| 2022/0078488 | A1 * | 3/2022 | Leleannec | H04N 19/52 |
| 2022/0094940 | A1 * | 3/2022 | Bandyopadhyay | H04N 19/132 |
| 2022/0159277 | A1 * | 5/2022 | Urban | H04N 19/176 |

FOREIGN PATENT DOCUMENTS

| | | |
|---|---|---|
| CN | 102215389 A | 10/2011 |
| CN | 106454378 A | 2/2017 |
| CN | 107147911 A | 9/2017 |
| CN | 108462873 A | 8/2018 |
| CN | 108781284 A | 11/2018 |
| WO | 2018171796 A1 | 9/2018 |
| WO | 2018226066 A1 | 12/2018 |

OTHER PUBLICATIONS

Chen, H. et al. (Huawei), "CE1-related: Combination of LIC and affine", Joint Video Experts Team (JVET) of ITU-T SG 16 WP3 and ISO/IEC JTC 1/SC 29/WG 11, Document: JVET-N0171-v1, 14th Meeting, Geneva, CH, Mar. 19-27, 2019, 6 pages.

Chen J. et al., "Algorithm description for Versatile Video Coding and TestModel 4 (VTM 4)", Joint Video Experts Team (JVET) of ITU-T SG 16 WP3 and ISO/IEC JTC 1/SC 29/WG11, Document: JVET-M1002-v1, 13th Meeting, Marrakech, MA, Jan. 9-18, 2019, 60 pages.

International Telecommunication Union, "Line Transmission of Non-Telephone Signals", Video Codec for Audiovisual Services AT p x 64 kbits, ITU-T H.261 (03/93), 29 pages.

International Telecommunication Union, "Series H: Audiovisual and Multimedia Systems, Infrastructure of Audiovisual Services—Coding of Moving Video", Information technology—Generic coding of moving pictures and associated audio information: Video: Frame packing arrangement signalling for 3D content, ITU-T H.262 (Feb. 2012), 238 pages.

International Telecommunication Union, "Series H: Audiovisual and Multimedia Systems, Infrastructure of Audiovisual Services—Coding of Moving Video", Video coding for low bit rate communication, ITU-T H.263 (Jan. 2005), 226 pages.

International Telecommunication Union, "Series H: Audiovisual and Multimedia Systems, Infrastructure of Audiovisual Services—Coding of Moving Video", Advanced video coding for generic audiovisual services, ITU-T H.264 (Apr. 2017), 812 pages.

International Telecommunication Union, "Series H: Audiovisual and Multimedia Systems Infrastructure of Audiovisual Services—Coding of Moving Video", High efficiency video coding, ITU-T H.265(Feb. 2018), 692 pages.

Liu, H. et al. (Qualcomm Inc.), "Local Illumination Compensation", ITU-Telecommunications Standardization Sector, Video Coding Experts Group (VCEG), Document: VCEG-AZ06, 52nd Meeting, Warsaw, Poland, Jun. 19-26, 2015, 4 pages.

Seregin, V. et al. (Qualcomm), "CE10-related: Unidirectional illumination compensation", Joint Video Experts Team (JVET) of ITU-T SG 16 WP3 and ISO/IEC JTC 1/SC 29/WG11, Document: JVET-M0500, 13th Meeting, Marrakech, MA, Jan. 9-18, 2019, 60 pages.

Xu, M. et al. (Tencent), "CE10 related: LIC inheritance restrictions and interaction with GBI", Joint Video Experts Team (JVET) of ITU-T SG 16 WP3 and ISO/IEC JTC 1/SC 29/WG11, Document: JVET-M0450-v1, 13th Meeting, Marrakech, MA, Jan. 9-18, 2019, 4 pages.

* cited by examiner

Downstream port                    Upstream port

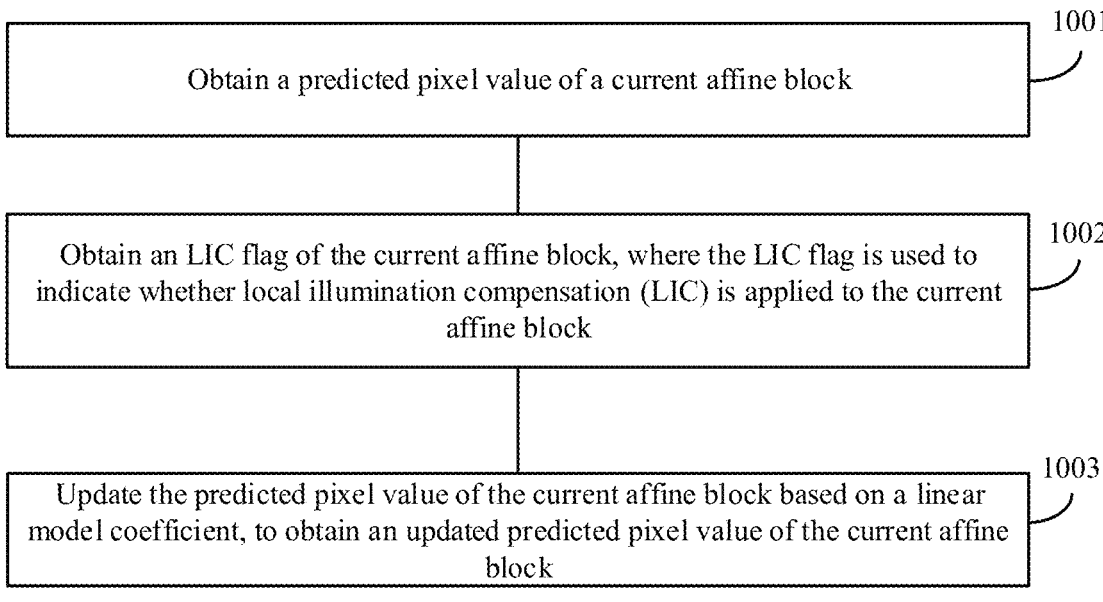

1001

Obtain a predicted pixel value of a current affine block

1002

Obtain an LIC flag of the current affine block, where the LIC flag is used to indicate whether local illumination compensation (LIC) is applied to the current affine block

1003

Update the predicted pixel value of the current affine block based on a linear model coefficient, to obtain an updated predicted pixel value of the current affine block

FIG. 11C

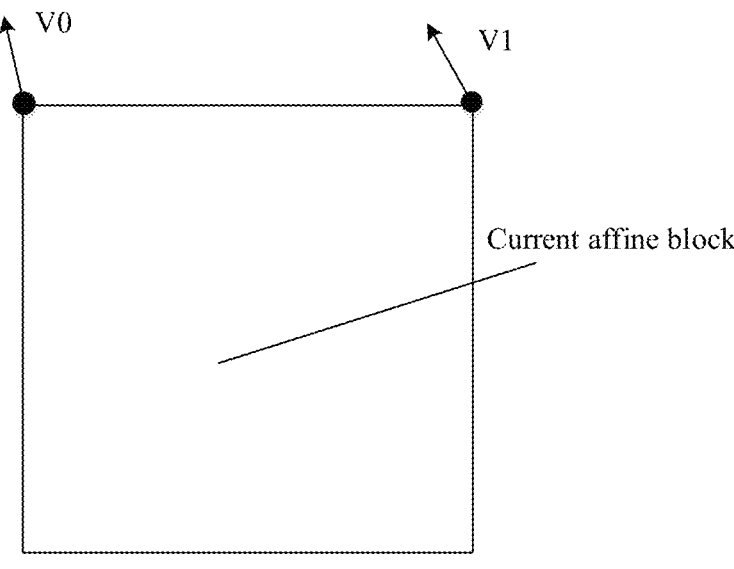

V0

V1

Current affine block

FIG. 12A

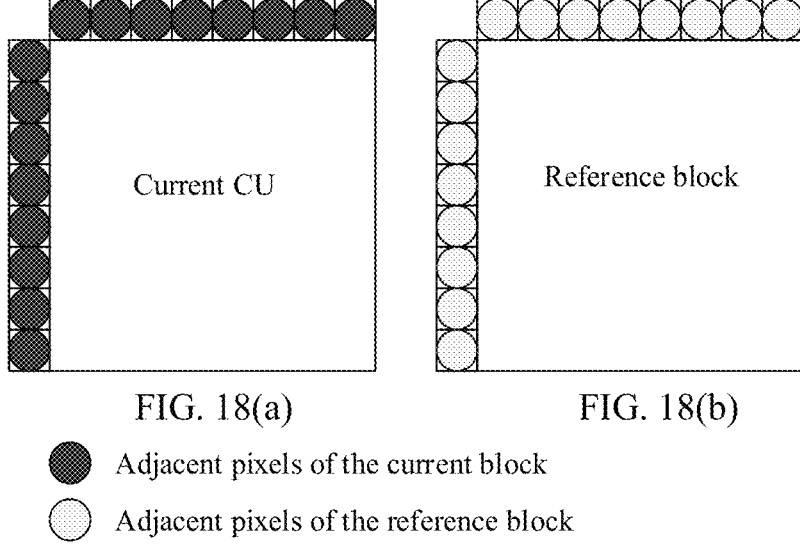
FIG. 18(a)                    FIG. 18(b)
⬤ Adjacent pixels of the current block
◯ Adjacent pixels of the reference block
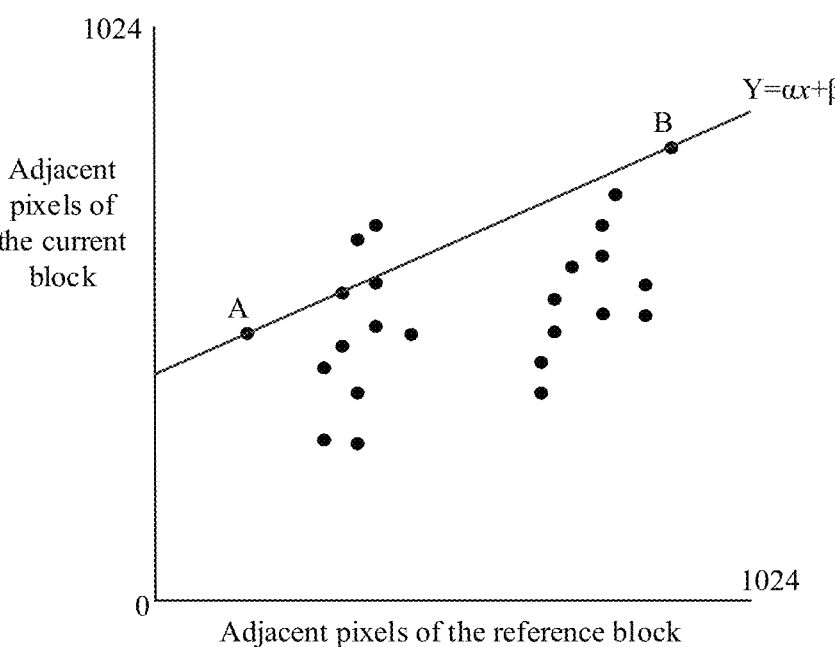
FIG. 19

INTER PREDICTION METHOD AND RELATED APPARATUS

CROSS-REFERENCE TO RELATED APPLICATIONS

This application is a continuation of U.S. patent application Ser. No. 17/473,517, filed on Sep. 13, 2021, which is a continuation of International Application No. PCT/CN2020/079081, filed on Mar. 13, 2020, which claims priority to Chinese Patent Application No. 201910195138.4, filed on Mar. 14, 2019, Chinese Patent Application No. 201910363846.4, filed on Apr. 30, 2019 and Chinese Patent Application No. 202010169607.8, filed on Mar. 12, 2020. All of the aforementioned patent applications are hereby incorporated by reference in their entireties.

TECHNICAL FIELD

The present invention relates to the field of video coding, and in particular, to an inter prediction method and apparatus, for example, an inter prediction method based on an affine prediction mode or a subblock prediction mode, and a related apparatus.

BACKGROUND

Video coding (video encoding and decoding) is used in a wide range of digital video applications, for example, broadcast digital television, video transmission over Internet and mobile networks, real-time conversational applications such as video chat and video conferencing, DVD and Blu-ray discs, video content acquisition and editing systems, and secure applications of camcorders.

Since the development of a block-based hybrid video coding approach in the H.261 standard in 1990, new video coding technologies and tools were developed and formed a basis for new video coding standards. Other video coding standards include MPEG-1 video, MPEG-2 video, ITU-T H.262/MPEG-2, ITU-T H.263, ITU-T H.264/MPEG-4 Part 10, advanced video coding (Advanced Video Coding, AVC), ITU-T H.265/high efficiency video coding (HEVC), and extensions of these standards, such as scalability and/or 3D (three-dimensional) extensions. As video creation and use have become more ubiquitous, video traffic is the biggest load on communication networks and data storage. Accordingly, one of goals of most video coding standards is to achieve a bit rate reduction compared with its predecessor without sacrificing picture quality. Even the latest high efficiency video coding (HEVC) can compress videos approximately twice as much as AVC without sacrificing picture quality, it is hunger for a new technology to further compress video as compared with HEVC.

SUMMARY

Embodiments of the present invention provide an inter prediction method and apparatus for a video picture and a corresponding encoder and decoder, to improve inter prediction accuracy to some extent. This improves coding performance.

According to a first aspect, an embodiment of the present invention provides an inter prediction method (for example, an inter prediction method based on an affine prediction mode or a subblock prediction mode). The method includes: obtaining a predicted pixel value of a current affine block; obtaining a local illumination compensation (LIC) flag of the current affine block, where the LIC flag is used to indicate whether local illumination compensation (LIC) is applied to the current affine block; and when the LIC flag indicates that LIC is applied to the current affine block, updating the predicted pixel value of the current affine block based on an update coefficient for LIC, to obtain an updated predicted pixel value of the current affine block.

It should be understood that there is no sequence limit on the two obtaining steps.

It should be understood that the current affine block may be a picture block on which inter prediction processing is being performed. When the method is an encoding method for a video picture, the current affine block is a current affine coding block. When the method is a decoding method for a video picture, the current affine block is a current affine decoding block. In this application, the predicted pixel value may also be referred to as a predicted pixel value. To avoid confusion, the predicted pixel value is used uniformly in this application. Optionally, in an implementation, the step of obtaining a predicted pixel value of a current affine block may specifically include: performing motion compensation or performing a prediction process on each subblock based on a motion vector of the subblock in the current affine block, to obtain a predicted pixel value of each subblock, so as to obtain the predicted pixel value of the current affine block.

It should be noted that the LIC flag in the standard text or code may be represented by using an LIC flag, a CU_LIC_flag, or an LIC_flag. For example, when LIC_flag==1, it indicates that LIC is applied to the current affine block. When LIC_flag==0, it indicates that LIC is not applied to the current affine block.

In some implementations, the update coefficient for LIC herein may be referred to as a linear model coefficient. In the foregoing step, the predicted pixel value of the current affine block is updated based on the linear model coefficient (LM coefficient), which may alternatively be understood as performing (local) illumination compensation on the predicted pixel value of the current affine block based on the linear model coefficient (using a local illumination compensation technology to perform local illumination compensation on the predicted pixel value of the current affine block), to obtain a predicted pixel value of the current affine block after (local) illumination compensation. For example, the updated predicted pixel value of the current affine block may be determined according to formula (9).

$$pred'(x,y)=\alpha \cdot pred(x,y)+\beta \qquad (9)$$

In formula (9), $pred'\_(x, y)$ is an updated predicted pixel value in a position $(x, y)$ in the current affine block, $pred\_(x, y)$ is a predicted pixel value in the position $(x, y)$ in the current affine block, and $\alpha$ or $\beta$ is an update coefficients (or $\alpha$ and $\beta$ are linear model coefficients).

It may be learned that, in this embodiment of this application, illumination compensation is performed on the predicted pixel value of the current affine block, to improve inter prediction accuracy, reduce a residual value, save a bit rate while maintaining video quality, and further improve coding performance. Specifically, because there may be an illumination difference between the current affine block and a reference block of the current affine block, there may be some differences between a predicted pixel value of the current affine block that is obtained based on the reference block and an actual pixel value of the current affine block. Therefore, the pixel value of the current affine block is updated based on the update coefficient (linear model coefficient), so that the updated predicted pixel value is closer to the actual pixel value of the current affine block, and a residual value between the actual pixel value of the current affine block and the updated predicted pixel value of the current affine block can be reduced, and the bit rate can be reduced while maintaining video quality. This improves coding performance.

In some possible implementations, for a merge affine mode, the obtaining an LIC flag of the current affine block includes: parsing or deriving a candidate index from a bitstream, where for example, if the bitstream does not carry the candidate index, the candidate index is derived as a default value; and determining a corresponding candidate from a list based on the index, where the candidate includes a multi-tuple motion vector (for example, motion vectors of a plurality of control points) and an LIC flag, and the list includes a candidate list or a history-based candidate list (HMVP list), where the LIC flag in the candidate is used as the LIC flag of the current affine block or the LIC flag of the current affine block is inherited from the LIC flag in the candidate.

In some possible implementations, for the merge affine mode, the method further includes:

constructing the list, where each candidate of one or more candidates in the list includes a multi-tuple motion vector and an LIC flag, and the list includes the candidate list or the history-based candidate list (HMVP list).

In some possible implementations, when a control point motion vector (CPMV) is inherited, the multi-tuple motion vector represents motion vectors of a plurality of control points of an adjacent affine block of the current affine block, or the multi-tuple motion vector represents motion vectors of a plurality of control points of the current affine block, where an affine model of the current affine block is inherited from an affine model of the adjacent affine block of the current affine block; and correspondingly, the LIC flag is inherited from an LIC flag of the adjacent affine block.

In some possible implementations, when the candidate in the list is constructed, the multi-tuple motion vector represents motion vectors of a plurality of control points of the current affine block, and the motion vectors of the plurality of control points respectively come from a plurality of adjacent encoded blocks of the current affine block; and correspondingly, the LIC flag is determined based on LIC flags of the plurality of adjacent encoded blocks; or the LIC flag is determined based on LIC flags of the plurality of control points.

It should be understood that the LIC flags of the plurality of control points may inherit the LIC flags of the adjacent encoded blocks of the current affine block.

In some possible implementations, when the candidate in the list is constructed, and values of a plurality of LIC flags of the plurality of control points corresponding to the multi-tuple motion vector are the same, the LIC flag in the candidate is any one of the LIC flags whose values are the same or any one of the plurality of LIC flags; otherwise, when at least one of the plurality of LIC flags of the plurality of control points corresponding to the multi-tuple motion vector is a first value, the LIC flag in the candidate is an LIC flag whose value is the first value; otherwise, the LIC flag in the candidate is an LIC flag whose value is a second value; or when a quantity of LIC flags having a first value is greater than or equal to a quantity of LIC flags having a second value in the plurality of LIC flags of the plurality of control points corresponding to the multi-tuple motion vector, the LIC flag in the candidate is an LIC flag whose value is the first value; otherwise, the LIC flag in the candidate is an LIC flag whose value is the second value; or when a quantity of LIC flags having a first value is less than a quantity of LIC flags having a second value in the plurality of LIC flags of the plurality of control points corresponding to the multi-tuple motion vector, the LIC flag in the candidate is an LIC flag whose value is the second value; otherwise, the LIC flag in the candidate is an LIC flag whose value is the first value.

In some possible implementations, when the candidate (candidate) in the list is constructed, and at least one of the plurality of LIC flags of the plurality of control points corresponding to the multi-tuple motion vector is a first value, the LIC flag in the candidate is an LIC flag whose value is the first value; otherwise, the LIC flag in the candidate is an LIC flag whose value is a second value; or when a quantity of LIC flags having a first value is greater than or equal to a quantity of LIC flags having a second value in the plurality of LIC flags of the plurality of control points corresponding to the multi-tuple motion vector, the LIC flag in the candidate is an LIC flag whose value is the first value; otherwise, the LIC flag in the candidate is an LIC flag whose value is the second value; or when a quantity of LIC flags having a first value is less than a quantity of LIC flags having a second value in the plurality of LIC flags of the plurality of control points corresponding to the multi-tuple motion vector, the LIC flag in the candidate is an LIC flag whose value is the second value; otherwise, the LIC flag in the candidate is an LIC flag whose value is the first value.

In some possible implementations, when the control point motion vector (CPMV) is constructed, if motion information of an Nth control point in the plurality of control points of the current affine block comes from a temporally adjacent encoded block of the current affine block, it is determined that an LIC flag of the Nth control point is a default value or a preset value (the default value or the preset value is the second value, for example, 0); or when the control point motion vector (CPMV) is inherited, if motion information of an Nth control point in the plurality of control points of the adjacent affine block of the current affine block comes from a temporally adjacent encoded block of the adjacent affine block, it is determined that an LIC flag of the Nth control point in the plurality of control points of the adjacent affine block of the current affine block is a default value or a preset value (the default value or the preset value is the second value, for example, 0).

In some possible implementations, when the control point motion vector (CPMV) is constructed, if motion information of an Nth control point in the plurality of control points of the current affine block comes from a temporally adjacent encoded block of the current affine block and an LIC flag of the temporally adjacent encoded block is available (available, that is, can be obtained), an LIC flag of the Nth control point is inherited from the LIC flag of the temporally adjacent encoded block; or when the control point motion vector (CPMV) is inherited, if motion information of an Nth control point in the plurality of control points of the adjacent affine block of the current affine block comes from a temporally adjacent encoded block of the adjacent affine block and an LIC flag of the temporally adjacent encoded block is available (available, that is, can be obtained), an LIC flag of the Nth control point in the plurality of control points of the adjacent affine block of the current affine block is inherited from the LIC flag of the temporally adjacent encoded block.

In some possible implementations, for an AMVP affine mode, the obtaining an LIC flag of the current affine block includes: parsing or deriving the LIC flag (for example, LIC_flag) of the current affine block from a bitstream. For example, if the bitstream does not carry the LIC flag, the LIC flag is derived as a default value.

Correspondingly, for the AMVP affine mode, the method may further include: constructing a list, where one or more candidates in the list each include a multi-tuple motion vector, and the list includes a candidate list or a history-based candidate list (HMVP list) (the bitstream carries a candidate index, but the LIC flag is encoded into the bitstream and transferred to a decoder side).

In some possible implementations, the obtaining an LIC flag of the current affine block includes: determining that the LIC flag of the current affine block is a default value or a preset value (the default value or the preset value is the second value, for example, 0); or determining that an LIC flag of an Nth control point in a plurality of control points of the current affine block is a default value or a preset value (the default value or the preset value is the second value, for example, 0), where motion information of the Nth control point comes from a temporally adjacent encoded block; or determining that an LIC flag of an Nth control point in a plurality of control points of an adjacent affine block of the current affine block is a default value or a preset value (the default value or the preset value is the second value, for example, 0).

In some possible implementations, the value of the LIC flag is the first value (for example, 1), indicating that local illumination compensation (local illumination compensation, LIC) is applied to the current affine block; or the value of the LIC flag is the second value (for example, 0), indicating that local illumination compensation (local illumination compensation, LIC) is not applied to the current affine block.

In some possible implementations, the updating the predicted pixel value of the current affine block based on an update coefficient for LIC, to obtain an updated predicted pixel value of the current affine block includes: determining, based on a reference pixel set, the update coefficient (for example, a linear model coefficient) used for LIC, where the reference pixel set includes at least one reconstructed pixel adjacent to a left boundary (a left-most pixel) of the current affine block, and at least one reconstructed pixel adjacent to a top boundary (a top-most pixel) of the current affine block; or, the reference pixel set includes reconstructed pixels adjacent to a left boundary and/or a top boundary of the current affine block; and updating the predicted pixel value of the current affine block based on the update coefficient for LIC, to obtain the updated predicted pixel value of the current affine block.

In some possible implementations, motion information (for example, motion vectors) of one or more subblocks of the current affine block is used to obtain, determine, or locate a subset or a universal set of the reference pixel set.

In some possible implementations, the one or more subblocks of the current affine block include a subblock in the top-left position, a subblock in the central position, a subblock in the top-most position, and/or a subblock in the left-most position.

In some possible implementations, the current affine block includes a plurality of subblocks, and the obtaining a predicted pixel value of a current affine block includes: obtaining a motion vector of each subblock in the current affine block based on the motion vectors of the plurality of control points of the current affine block and position coordinates of the plurality of control points of the current affine block; or obtaining a motion vector of each subblock in the current affine block based on a stored affine model parameter or an affine model parameter of the current affine block or an affine model parameter of the adjacent affine block of the current affine block; or obtaining a motion vector of each subblock in the current affine block based on motion vectors of the plurality of control points of the adjacent affine block of the current affine block and position coordinates of the plurality of control points of the adjacent affine block; or obtaining a motion vector of each subblock in the current affine block based on a stored multi-tuple motion vector and stored position coordinates, or stored motion vectors of a plurality of control points and position coordinates of the plurality of control points; and performing a motion compensation process or performing a prediction process based on the motion vector of each subblock in the current affine block, so as to obtain a predicted pixel value of each subblock.

According to a second aspect, an embodiment of the present invention provides an inter prediction method, where the method includes: obtaining a predicted pixel value of a current affine block; determining whether a local illumination compensation (LIC) operation is applied to the current affine block (for example, determining whether the LIC operation is applied to the current affine block); and if the local illumination compensation operation needs applied to the current affine block, updating the predicted pixel value of the current affine block based on an update coefficient for the LIC operation, to obtain an updated predicted pixel value of the current affine block.

According to a third aspect, an embodiment of the present invention provides an inter prediction method, where the method includes: obtaining a predicted pixel value of a current affine block; obtaining an LIC flag of the current affine block, where the LIC flag is used to indicate whether local illumination compensation (LIC) is applied to the current affine block; when a value of the LIC flag is a first value, updating the predicted pixel value of the current affine block based on an update coefficient for LIC, to obtain an updated predicted pixel value of the current affine block; and reconstructing the current affine block based on the updated predicted pixel value; and when the value of the LIC flag is a second value, reconstructing the current affine block based on the predicted pixel value.

According to a fourth aspect, an embodiment of the present invention provides a video picture decoding method, where the method includes: parsing a bitstream to obtain a candidate index; determining a corresponding candidate from a list based on the index, where the candidate includes an LIC flag and an affine model parameter or information representing an affine model parameter; obtaining a predicted pixel value of a current affine block based on the affine model parameter or the information representing the affine model parameter in the candidate (for example, obtaining a motion vector of each subblock of the current affine block, to obtain a predicted pixel value of each subblock of the current affine block); determining, based on the LIC flag in the candidate, whether local illumination compensation (LIC) is applied to the current affine block; and when it is determined to perform LIC on the current affine block (or when it is determined to perform LIC on one or more subblocks of the current affine block), updating the predicted pixel value of the current affine block based on an update coefficient for LIC, to obtain an updated predicted pixel value of the current affine block.

In some possible implementations, the information representing the affine model parameter includes a multi-tuple motion vector corresponding to a plurality of control points of the current affine block, or a multi-tuple motion vector corresponding to a plurality of control points of an adjacent affine block of the current affine block.

In some possible implementations, the determining, based on the LIC flag in the candidate, whether local illumination compensation (local illumination compensation, LIC) is applied to the current affine block includes: when a value of the LIC flag is a first value, determining to perform LIC on the current affine block (or determining to perform LIC on one or more subblocks of the current affine block); or when a value of the LIC flag is a second value, determining not to perform LIC on the current affine block (or determining not to perform LIC on one or more subblocks of the current affine block).

It should be noted that, in a possible application scenario, the "LIC flag" in the present invention may alternatively be named another name, such as LIC_flag, cu_lic_flag, or lic_flag. This is not limited in the present invention.

It may be learned that, in an inter prediction process, if the current affine block uses an affine motion model-based merge mode, whether to perform local illumination compensation on the current block is determined based on a value of an LIC_flag in a candidate corresponding to a merge candidate index and in a merge list. This ensures a smooth encoding/decoding process, and improving coding efficiency and prediction accuracy.

A fifth aspect of this application provides a picture prediction apparatus, including several functional units configured to implement any method in the first aspect. For example, the picture prediction apparatus may include a prediction unit, configured to obtain a predicted pixel value of a current affine block; an LIC decision unit, configured to obtain an LIC flag (for example, LIC_flag) of the current affine block, where the LIC flag is used to indicate whether local illumination compensation (LIC) is applied to the current affine block; and an update unit, configured to: when the LIC flag indicates that LIC is applied to the current affine block, update the predicted pixel value of the current affine block based on an update coefficient for LIC, to obtain an updated predicted pixel value of the current affine block. In different application scenarios, the picture prediction apparatus is applied, for example, to a video encoding apparatus (video encoder) or a video decoding apparatus (video decoder).

A sixth aspect of this application provides a picture prediction apparatus, including several functional units configured to implement any method in the second aspect. For example, the picture prediction apparatus may include a prediction unit, configured to obtain a predicted pixel value of a current affine block; an LIC decision unit, configured to determine whether a local illumination compensation (LIC) operation is applied to the current affine block (for example, determine whether the LIC operation is applied to the current affine block); and an update unit, configured to: if the local illumination compensation operation needs applied to the current affine block, update the predicted pixel value of the current affine block based on an update coefficient for the LIC operation, to obtain an updated predicted pixel value of the current affine block. In different application scenarios, the picture prediction apparatus is applied, for example, to a video encoding apparatus (video encoder) or a video decoding apparatus (video decoder).

A seventh aspect of this application provides a video picture coding apparatus, including several functional units configured to implement any method in the third aspect. For example, the video picture coding apparatus may include: a prediction unit, configured to obtain a predicted pixel value of a current affine block; an LIC decision unit, configured to obtain an LIC flag of the current affine block, where the LIC flag is used to indicate whether local illumination compensation (LIC) is applied to the current affine block; an update unit, configured to: when a value of the LIC flag is a first value, update the predicted pixel value of the current affine block based on an update coefficient for LIC, to obtain an updated predicted pixel value of the current affine block; and a reconstruction unit, configured to reconstruct the current affine block based on the updated predicted pixel value, where the reconstruction unit is further configured to: when the value of the LIC flag is a second value, reconstruct the current affine block based on the predicted pixel value. In different application scenarios, the video picture coding apparatus is applied, for example, to a video encoding apparatus (video encoder) or a video decoding apparatus (video decoder).

An eighth aspect of this application provides a decoding apparatus, including several functional units configured to implement any method in the fourth aspect. For example, the decoding apparatus may include: an entropy decoding unit, configured to parse a bitstream to obtain a candidate index; a prediction unit, configured to determine a corresponding candidate from a list based on the index, where the candidate includes an LIC flag and an affine model parameter or information representing an affine model parameter, and obtain a predicted pixel value of a current affine block based on the affine model parameter or the information representing the affine model parameter in the candidate (for example, obtain a motion vector of each subblock of the current affine block, so as to obtain a predicted pixel value of each subblock of the current affine block); an LIC decision unit, configured to determine, based on the LIC flag in the candidate, whether local illumination compensation (LIC) is applied to the current affine block; and an update unit, configured to: when the LIC decision unit determines to perform LIC on the current affine block (or when the LIC decision unit determines to perform LIC on one or more subblocks of the current affine block), update the predicted pixel value of the current affine block based on an update coefficient for LIC, to obtain an updated predicted pixel value of the current affine block.

In some possible implementations, the information representing the affine model parameter includes a multi-tuple motion vector corresponding to a plurality of control points of the current affine block, or a multi-tuple motion vector corresponding to a plurality of control points of an adjacent affine block of the current affine block.

In some possible implementations, the LIC decision unit is configured to: when a value of the LIC flag is a first value, determine to perform LIC on the current affine block (or determine to perform LIC on one or more subblocks of the current affine block); and/or when the value of the LIC flag is a second value, determine not to perform LIC on the current affine block (or determine not to perform LIC on one or more subblocks of the current affine block).

According to a ninth aspect, a video data decoding device is provided, where the device includes: a memory, configured to store video data in a bitstream form; and a video decoder, configured to implement some or all steps of the method in any one of the first, second, third or fourth aspect.

According to a tenth aspect, a video data encoding device is provided, where the device includes: a memory, configured to store video data in a bitstream form; and a video encoder, configured to implement some or all steps of the method in any one of the first, second, third or fourth aspect.

According to an eleventh aspect, an embodiment of this application provides a video coding device (for example, a video encoding device or a video decoding device), including a non-volatile memory and a processor that are coupled to each other, where the processor invokes program code stored in the memory to perform some or all steps of the method in any one of the first, second, third or fourth aspect. In an implementation, the memory is a non-volatile memory.

In an implementation, the memory and the processor are coupled to each other.

According to a twelfth aspect, an embodiment of this application provides a computer-readable storage medium, where the computer-readable storage medium stores program code, the program code includes instructions used to perform some or all steps of the method in any one of the first, second, third or fourth aspect, and the instructions cause one or more processors to perform the method according to any possible embodiment of the first, second, third, or fourth aspect.

According to a thirteenth aspect, an embodiment of this application provides a computer program product. When the computer program product runs on a computer, the computer is enabled to perform some or all steps of the method in any one of the first, second, third, or fourth aspect.

According to a fourteenth aspect, an embodiment of the present invention provides a video encoder, where the video encoder includes: an inter prediction module, corresponding to the picture prediction apparatus in the method according to any one of the fifth, sixth, or seventh aspect, where the inter prediction module is configured to predict and obtain a predictor of a pixel value of an affine picture block; an entropy encoding module, configured to encode indication information into a bitstream, where the indication information includes LIC flag information or a candidate index, the LIC flag information is used to indicate whether local illumination compensation (LIC) is applied to an current affine block, or the candidate index is used to indicate a position of a candidate in a list, and the candidate includes flag information used to indicate whether local illumination compensation (LIC) is applied to the current affine block; and a reconstruction module, configured to reconstruct the picture block based on the predictor of the pixel value of the picture block.

According to a fifteenth aspect, an embodiment of the present invention provides a video decoder, where the video decoder includes: an entropy decoding module, configured to decode indication information from a bitstream, where the indication information includes LIC flag information or a candidate index, the LIC flag information is used to indicate whether local illumination compensation (LIC) is applied to a current affine block, or the candidate index is used to indicate a position of a candidate in a list, and the candidate includes flag information used to indicate whether local illumination compensation (LIC) is applied to the current affine block; an inter prediction module, corresponding to the picture prediction apparatus in the method according to any one of the fifth, sixth, or seventh aspect, where the inter prediction module is configured to predict and obtain a predictor of a pixel value of the picture block; and a reconstruction module, configured to reconstruct the picture block based on the predictor of the pixel value of the picture block.

It should be understood that the technical solutions of the second to fifteenth aspects of this application are consistent with the technical solutions of the first aspect of this application, and beneficial effects obtained in each aspect and corresponding feasible implementations are similar, and are not described again.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

FIG. 1B is an example flowchart of a video picture encoding method;

FIG. 12A is an example schematic diagram of motion information of two control points of a current affine picture block;

FIG. 18(*a*) and FIG. 18(*b*) are a correspondence diagram between a current block and a reference block and an example schematic diagram of local illumination compensation LIC; and FIG. 19 is an example schematic diagram of a linear model of local illumination compensation LIC.

DETAILED DESCRIPTION OF ILLUSTRATIVE EMBODIMENTS

Figure 1A:
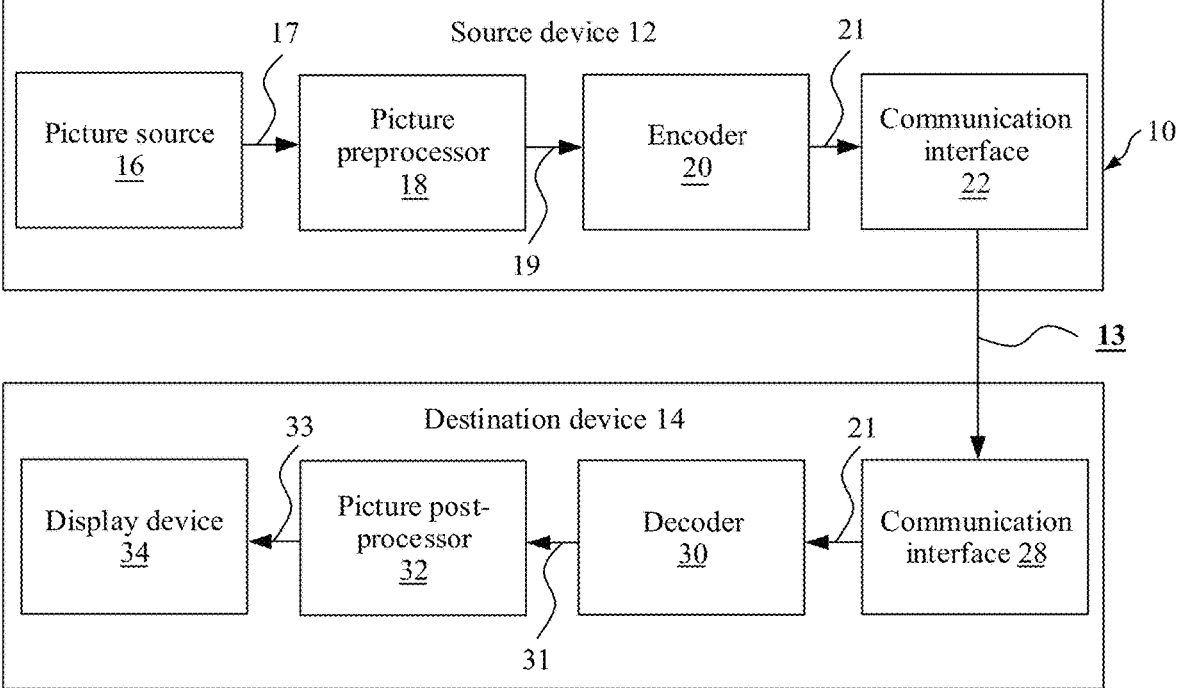
FIG. 1A is a block diagram of an instance of a video coding system 10 used to implement an embodiment of the present invention.

The following describes the embodiments of the present invention with reference to the accompanying drawings in the embodiments of the present invention. The following description shows specific aspects of the embodiments of the present invention or may use accompanying drawings of the specific aspects of the embodiments of the present invention. It should be understood that the embodiments of the present invention may be used in other aspects, and may include a structural or logical change not depicted in the accompanying drawings. Therefore, the following detailed description should not be understood in the sense of limitation, and the scope of the present invention is defined by the appended claims. For example, it should be understood that the disclosure with reference to the described method may also be applied to a corresponding device or system for performing the method, and vice versa. For example, if one or more specific method steps are described, a corresponding device may include one or more units, such as functional units, to perform the described one or more method steps (for example, one unit performs one or more steps, or each of a plurality of units performs one or more of a plurality of steps), even though such one or more units are not explicitly illustrated or described in the accompanying drawings. In addition, for example, if a specific apparatus is described based on one or more units, such as functional units, a corresponding method may include one step to perform functionality of one or more units (for example, one step is used to perform functionality of one or more units, or each of a plurality of steps is used to perform functionality of one or more of a plurality of units), even though such one or more steps are not explicitly illustrated or described in the accompanying drawings. Further, it should be understood that, unless otherwise clearly stated, the example embodiments and/or features of aspects described herein may be combined with each other.

In the embodiments of the present invention, "at least one" refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be in a singular or plural form.

The technical solutions in the embodiments of the present invention may not only be applied to existing video coding standards (for example, standards such as H.264 and HEVC), but may also be applied to future video coding standards (for example, the H.266 standard). Terms used in the implementation part of the present invention are merely used to explain specific embodiments of the present invention, and are not intended to limit the present invention. The following first simply describes some concepts that may be involved in the embodiments of the present invention.

Video coding typically refers to processing a sequence of pictures, which forms a video or video sequence. In the video coding field, terms "picture", "frame" or "image" may be used as synonyms. Video coding used herein represents video encoding or video decoding. Video encoding is performed on a source side, and usually includes processing (for example, compressing) an original video picture to reduce an amount of data required to represent the video picture, for more efficient storage and/or transmission. Video decoding is performed on a destination side, and usually includes performing inverse processing compared with an encoder to reconstruct the video picture. "Coding" of the video picture in the embodiments is understood as "encoding" or "decoding" of the video sequence. A combination of the encoding portion and the decoding portion is also referred to as codec (encoding and decoding).

A video sequence includes a series of pictures, the picture is further split into slices, and the slice is then split into blocks. Video coding is performed block by block. In some new video coding standards, the concept of block is further extended. For example, there is a macroblock (MB) in the H.264 standard, and the macroblock may be further split into a plurality of prediction blocks (partition) that can be used for prediction encoding. In the high efficiency video coding (HEVC) standard, a plurality of block units are functionally divided by using basic concepts such as a coding unit (CU), a prediction unit (PU), and a transform unit (TU), and are described by using a new tree-based structure. For example, the CU may be split into smaller CUs based on a quad-tree, and the smaller CU may be further split, so as to form a quad-tree structure. The CU is a basic unit for dividing and encoding a coding picture. The PU and the TU also have a similar tree structure. The PU may be corresponding to a prediction block, and is a basic unit for prediction encoding. The CU is further split into a plurality of PUs based on a splitting type. The TU may correspond to the transform block, and is a basic unit for transforming a prediction residual. However, all of the CU, the PU, and the TU essentially belong to the concept of block (or picture block).

For example, in HEVC, a CTU is split into a plurality of CUs by using a quad-tree structure denoted as a coding tree. Whether to encode a picture area by using inter-picture (temporal) or intra-picture (spatial) prediction is determined at a CU level. Each CU may be further split into one, two, or four PUs based on a PU splitting type. A same prediction process is applied within a PU, and related information is transmitted to a decoder on a PU basis. After a residual block is obtained by applying a prediction process based on the PU splitting type, the CU may be partitioned into transform units (TU) based on another quad-tree structure similar to the coding tree used for the CU. In the latest development of video compression technology, a quad-tree and a binary tree (QTBT) are used to partition a coding block. In a QTBT block structure, the CU may be of a square or rectangular shape.

In this specification, for ease of description and understanding, a to-be-processed picture block in a current coding picture (referred to as a to-be-processed picture block) may be referred to as a current block, for example, in encoding, the to-be-processed picture block refers to a block currently being encoded; and in decoding, the to-be-processed picture block refers to a block currently being decoded. A decoded picture block that is in a reference picture and that is used to predict the current block is referred to as a reference block, that is, the reference block is a block that provides a reference signal for the current block, where the reference signal represents a pixel value in the picture block. A block that is in the reference picture and that provides a prediction signal for the current block may be referred to as a prediction block, where the prediction signal represents a pixel value or a sampling value or a sampling signal within the prediction block. For example, after a plurality of reference blocks are traversed, an optimal reference block is found, and the optimal reference block provides prediction for the current block, and may be referred to as a prediction block.

In a case of lossless video coding, an original video picture may be reconstructed, that is, a reconstructed video picture has the same quality as the original video picture (it is assumed that there is no transmission loss or other data loss during storage or transmission). In a case of lossy video coding, by performing further compression, for example, through quantization, an amount of data required to represent a video picture is reduced, and a decoder side cannot completely reconstruct the video picture, that is, quality of a reconstructed video picture is lower or worse than quality of the original video picture.

Several video coding standards of H.261 are "lossy hybrid video codecs" (that is, spatial and temporal prediction in a sample domain are combined with 2D transform coding for applying quantization in a transform domain). Each picture of a video sequence is usually partitioned into a set of non-overlapping blocks, and the coding is typically performed on a block level. In other words, on the encoder side the video is typically processed, for example, encoded, on a block (video block) level, for example, by using spatial (intra picture) prediction and temporal (inter picture) prediction to generate a prediction block, subtracting the prediction block from the current block (currently processed or to-be-processed block) to obtain a residual block, and transforming the residual block and quantizing the residual block in the transform domain to reduce an amount of data to be transmitted (compressed), while on the decoder side the inverse processing compared to the encoder is applied to the encoded or compressed block to reconstruct the current block for representation. In addition, the encoder replicates the decoder processing loop, so that both generate identical prediction (for example, intra and inter prediction) and/or reconstructions for processing, that is, coding, a subsequent block.

The following describes a system architecture applied in an embodiment of the present invention. FIG. 1A schematically shows a schematic block diagram of a video encoding and decoding system 10 applied in an embodiment of the present invention. As shown in FIG. 1A, the video encoding and decoding system 10 may include a source device 12 and a destination device 4. The source device 12 generates encoded video data. Therefore, the source device 12 may be referred to as a video encoding apparatus. The destination device 4 may decode the encoded video data generated by the source device 12. Therefore, the destination device 4 may be referred to as a video decoding apparatus. Various implementations of the source device 12, the destination device 4, or both may include one or more processors and a memory coupled to the one or more processors. The memory may include but is not limited to a RAM, a ROM, an EEPROM, a flash memory, or any other medium that may be configured to store desired program code in a form of an instruction or a data structure accessible to a computer, as described herein. The source device 12 and the destination device 4 may include various apparatuses including a desktop computer, a mobile computing apparatus, a notebook (for example, a laptop) computer, a tablet computer, a set-top box, a telephone handset such as a so-called "smart" phone, a television set, a camera, a display apparatus, a digital media player, a video game console, an in-vehicle computer, a wireless communication device, or the like.

Although FIG. 1A depicts the source device 12 and the destination device 4 as separate devices, a device embodiment may also include both the source device 12 and the destination device 4 or functionality of both, that is, the source device 12 or corresponding functionality and the destination device 14 or corresponding functionality. In such an embodiment, same hardware and/or software, or separate hardware and/or software, or any combination thereof, may be used to implement the source device 12 or the corresponding functionality and the destination device 14 or the corresponding functionality.

A communication connection may be established between the source device 12 and the destination device 4 by using a link 13, and the destination device 4 may receive the encoded video data from the source device 12 by using the link 13. The link 13 may include one or more media or devices capable of moving the encoded video data from the source device 12 to the destination device 4. In one instance, the link 13 may include one or more communication media that enable the source device 12 to transmit the encoded video data directly to the destination device 4 in real time. In this instance, the source device 12 may modulate the encoded video data based on a communication standard (for example, a wireless communication protocol), and may transmit modulated video data to the destination device 14. The one or more communication media may include wireless and/or wired communication media, such as a radio frequency (RF) spectrum or one or more physical transmission lines. The one or more communication media may form a part of a packet-based network, such as a local area network, a wide area network, or a global network (for example, Internet). The one or more communication media may include routers, switches, base stations, or other devices that facilitate communication from the source device 12 to the destination device 14.

The source device 12 includes an encoder 20. In addition, optionally, the source device 12 may further include a picture source 16, a picture preprocessor 18, and a communication interface 22. In a specific implementation, the encoder 20, the picture source 16, the picture preprocessor 18, and the communication interface 22 may be hardware components in the source device 12, or may be software programs in the source device 12, which are separately described as follows:

The picture source 16 may include or may be any type of picture capturing device for, for example, capturing a real-world picture, and/or any type of picture or comment generating device (for screen content encoding, some text on the screen is also considered to be a part of a to-be-encoded picture or image), for example, a computer graphics processor for generating a computer animated picture, or for obtaining and/or providing a real-world picture, a computer animated picture (for example, screen content, a virtual reality (virtual reality, VR) picture), and/or any combination thereof (for example, an augmented reality (augmented reality, AR) picture). The picture source 16 may be a camera for capturing a picture or a memory for storing a picture, and the picture source 16 may further include any type of (internal or external) interface for storing a previously captured or generated picture and/or obtaining or receiving a picture. When the picture source 16 is a camera, the picture source 16 may be, for example, a local or integrated camera integrated in the source device. When the picture source 16 is a memory, the picture source 16 may be a local or, for example, an integrated memory integrated in the source device. When the picture source 16 includes an interface, the interface may be, for example, an external interface for receiving a picture from an external video source, the external video source may be, for example, an external picture capturing device, such as a camera, an external memory, or an external picture generating device, and the external picture generating device may be, for example, an external computer graphics processor, a computer, or a server. An interface may be any type of interface based on any proprietary or standardized interface protocol, such as a wired or wireless interface or an optical interface.

The picture may be considered as a two-dimensional array or a matrix of pixels (picture element). A pixel in the array may also be referred to as a sampling point. A quantity of sampling points in horizontal and vertical directions (or axes) of the array or the picture defines a size and/or resolution of the picture. To represent a color, three color components are usually used, that is, the picture may be denoted as or include three sampling arrays. For example, in an RGB format or color space, a picture includes corresponding red, green, and blue sampling arrays. However, in video encoding, each pixel is usually represented in a luminance/chrominance format or color space, for example, a picture in a YUV format includes a luminance component indicated byY (which may also be indicated by L) and two chrominance components indicated by U and V. The luminance (luma) component Y represents luminance or gray horizontal intensity (for example, both are the same in a gray level picture), and the two chrominance (chroma) components U and V represent the chrominance or color information component. Correspondingly, a picture in the YUV format includes a luminance sampling array of luminance sampling values (Y) and two chrominance sampling arrays of chrominance values (U and V). A picture in the RGB format may be converted or transformed into the YUV format, and vice versa. This process is also referred to as color transform or conversion. If a picture is black and white, the picture may include only a luminance sampling array. In this embodiment of the present invention, the picture transmitted from the picture source 16 to a picture processor may also be referred to as original picture data 17.

The picture preprocessor 18 is configured to: receive the original picture data 17, and preprocess the original picture data 17, so as to obtain a preprocessed picture 19 or preprocessed picture data 19. For example, preprocessing performed by the picture preprocessor 18 may include trimming, color format conversion (for example, conversion from the RGB format to the YUV format), color modulation, or denoising.

The video encoder 20 (or referred to as the encoder 20) is configured to receive the preprocessed picture data 19, and process the preprocessed picture data 19 in a correlation prediction mode (such as prediction modes in various embodiments of this specification), to provide encoded picture data 21 (structural details of the encoder 20 are further described below based on FIG. 2 or FIG. 4 or FIG. 5). In some embodiments, the encoder 20 may be configured to execute the embodiments described later, so as to implement application of an inter prediction method described in the present invention to an encoder side.

The communication interface 22 may be configured to receive the encoded picture data 21 and may transmit the encoded picture data 21 to the destination device 14 or any other device (for example, a memory) by using the link 13 for storage or direct reconstruction. The any other device may be any device for decoding or storage. The communication interface 22 may be, for example, configured to encapsulate the encoded picture data 21 in an appropriate format, such as a data packet, for transmission on the link 13.

The destination device 14 includes a decoder 30. In addition, optionally, the destination device 14 may further include a communication interface 28, a picture post-processor 32, and a display device 34, which are separately described as follows:

The communication interface 28 may be configured to receive the encoded picture data 21 from the source device 12 or any other source, where the any other source is, for example, a storage device, and the storage device is, for example, an encoded picture data storage device. The communication interface 28 may be configured to transmit or receive the encoded picture data 21 by using the link 13 between the source device 12 and the destination device 14 or by using a network of any type, where the link 13 is, for example, a direct wired or wireless connection, and the network of any type is, for example, a wired or wireless network or any combination thereof, or a private or public network of any type or any combination thereof. The communication interface 28 may be, for example, configured to decapsulate a data packet transmitted by the communication interface 22 to obtain the encoded picture data 21.

Both the communication interface 28 and the communication interface 22 may be configured as unidirectional communication interfaces or bidirectional communication interfaces, and may be configured to, for example, send and receive a message to establish a connection, acknowledge and exchange any other information related to a communication link and/or data transmission such as encoded picture data transmission.

The video decoder 30 (or referred to as the decoder 30) is configured to receive the encoded picture data 21 and provide decoded picture data 31 or a decoded picture 31 (structural details of the decoder 30 are further described below based on FIG. 3 or FIG. 4 or FIG. 5). In some embodiments, the decoder 30 may be configured to execute the embodiments described later, so as to implement application of an inter prediction method described in the present invention to a decoder side.

The picture post-processor 32 is configured to perform post-processing on the decoded picture data 31 (also referred to as reconstructed picture data), so as to obtain post-processed picture data 33. The post-processing performed by the picture post-processor 32 may include: color format conversion (for example, conversion from the YUV format to the RGB format), color modulation, trimming, or resampling, or any other processing, and may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, such as an integrated or external display or monitor. For example, the display may include a liquid crystal display (LCD), an organic light emitting diode (OLED) display, a plasma display, a projector, a micro LED display, a liquid crystal on silicon (liquid crystal on silicon, LCoS), a digital light processor (DLP), or any other type of display.

Although FIG. 1A depicts the source device 12 and the destination device 14 as separate devices, a device embodiment may also include both the source device 12 and the destination device 14 or functionality of both, that is, the source device 12 or corresponding functionality and the destination device 14 or corresponding functionality. In such an embodiment, same hardware and/or software, or separate hardware and/or software, or any combination thereof, may be used to implement the source device 12 or the corresponding functionality and the destination device 14 or the corresponding functionality.

It may be apparent to a person skilled in the art based on the description that functionality of different units or existence and (exact) split of the functionalities of the source device 12 and/or the destination device 14 shown in FIG. 1A may vary based on actual devices and applications. The source device 12 and the destination device 14 may include any one of various devices, including any type of handheld or stationary device, such as a notebook or laptop computer, a mobile phone, a smartphone, a tablet or tablet computer, a video camera, a desktop computer, a set-top box, a television set, a camera, an in-vehicle device, a display device, a digital media player, a video game console, a video streaming device (such as a content service server or a content distribution server), a broadcast receiver device, and a broadcast transmitter device, and may not use or use any type of operating system.

The encoder 20 and the decoder 30 may be implemented as any one of various suitable circuits, such as one or more microprocessors, a digital signal processor (DSP), an application-specific integrated circuit (ASIC), a field-programmable gate array (FPGA), discrete logic, hardware, or any combination thereof. If some of the technologies are implemented in software, the device may store software instructions in a suitable non-transitory computer-readable storage medium and may use one or more processors to execute the instructions by using hardware to execute the technologies of this disclosure. Any of the foregoing content (including hardware, software, and a combination of hardware and software) may be considered as one or more processors.

In some cases, the video encoding and decoding system 10 shown in FIG. 1A is merely an example, and the technologies of the present invention may be applied to a video coding settings (for example, video encoding or video decoding) that do not necessarily include any data communication between encoding and decoding devices. In other examples, data may be retrieved from a local memory, streamed over a network, or the like. The video encoding device may encode data and store the data in a memory, and/or the video decoding device may retrieve the data from the memory and decode the data. In some examples, encoding and decoding are performed by devices that do not communicate with one another but only encode data to and/or retrieve data from the memory and decode the data.

Figure 1B:
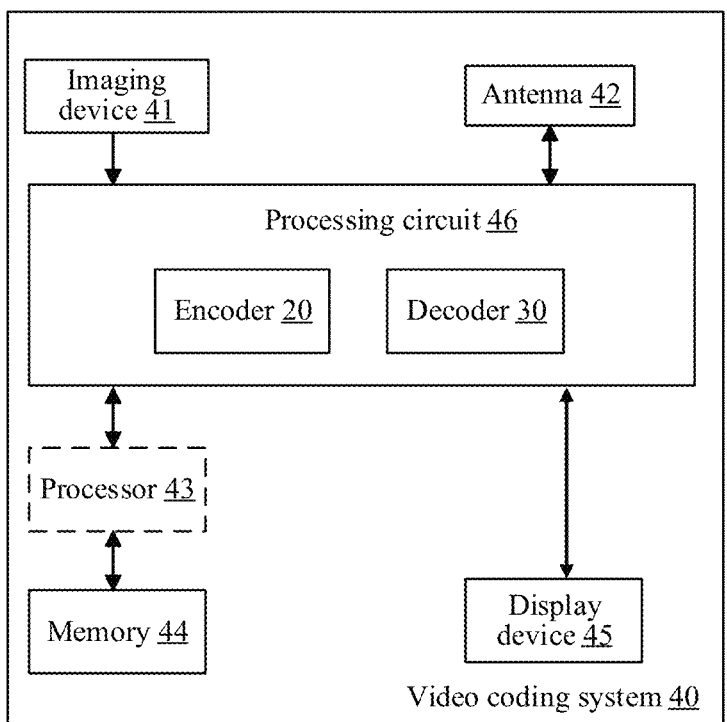
FIG. 1B is a block diagram of another example video coding system 40 used to implement an embodiment of the present invention.
Figure 2:
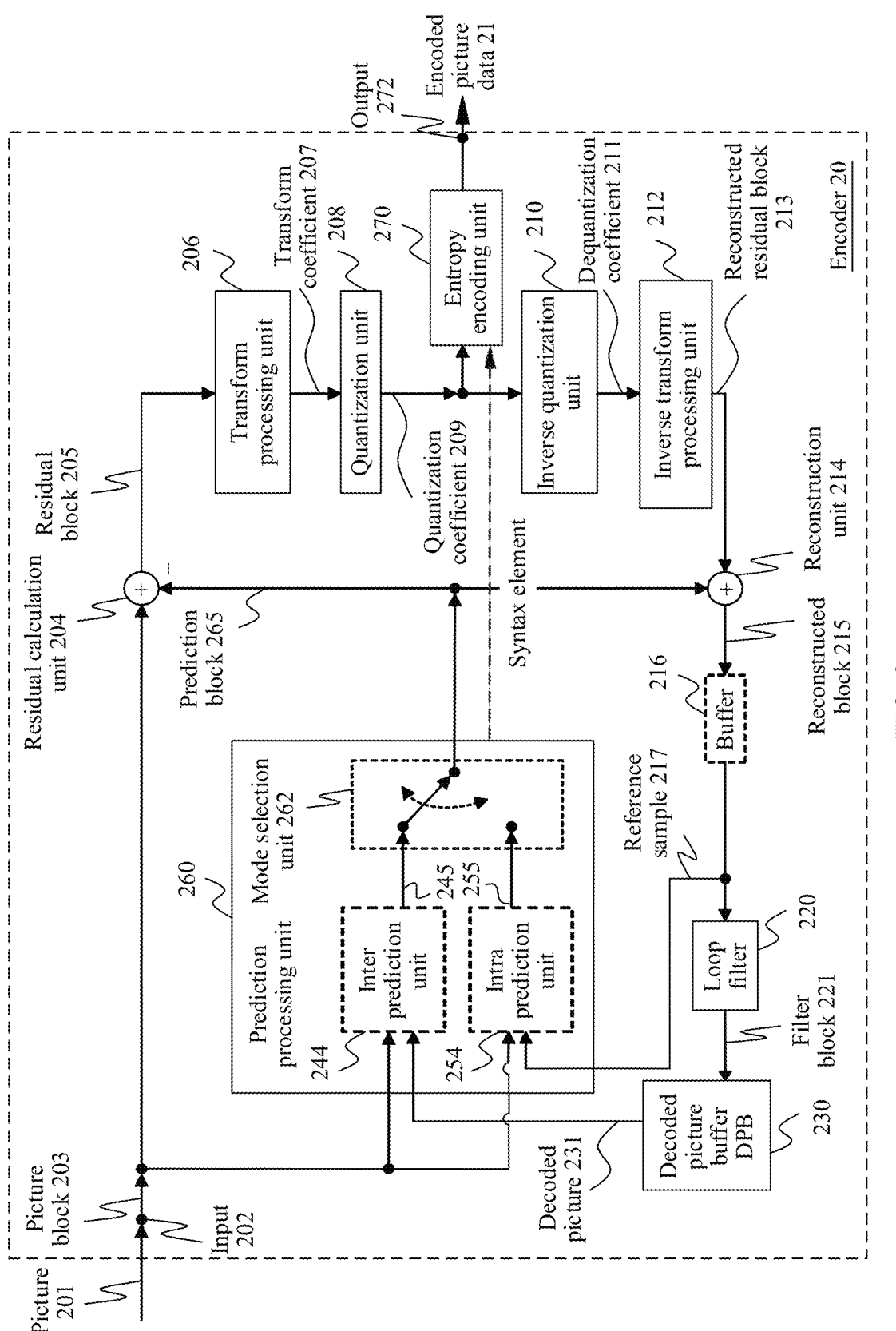
FIG. 2 is a structural block diagram of an example encoder 20 used to implement an embodiment of the present invention.
Figure 3:
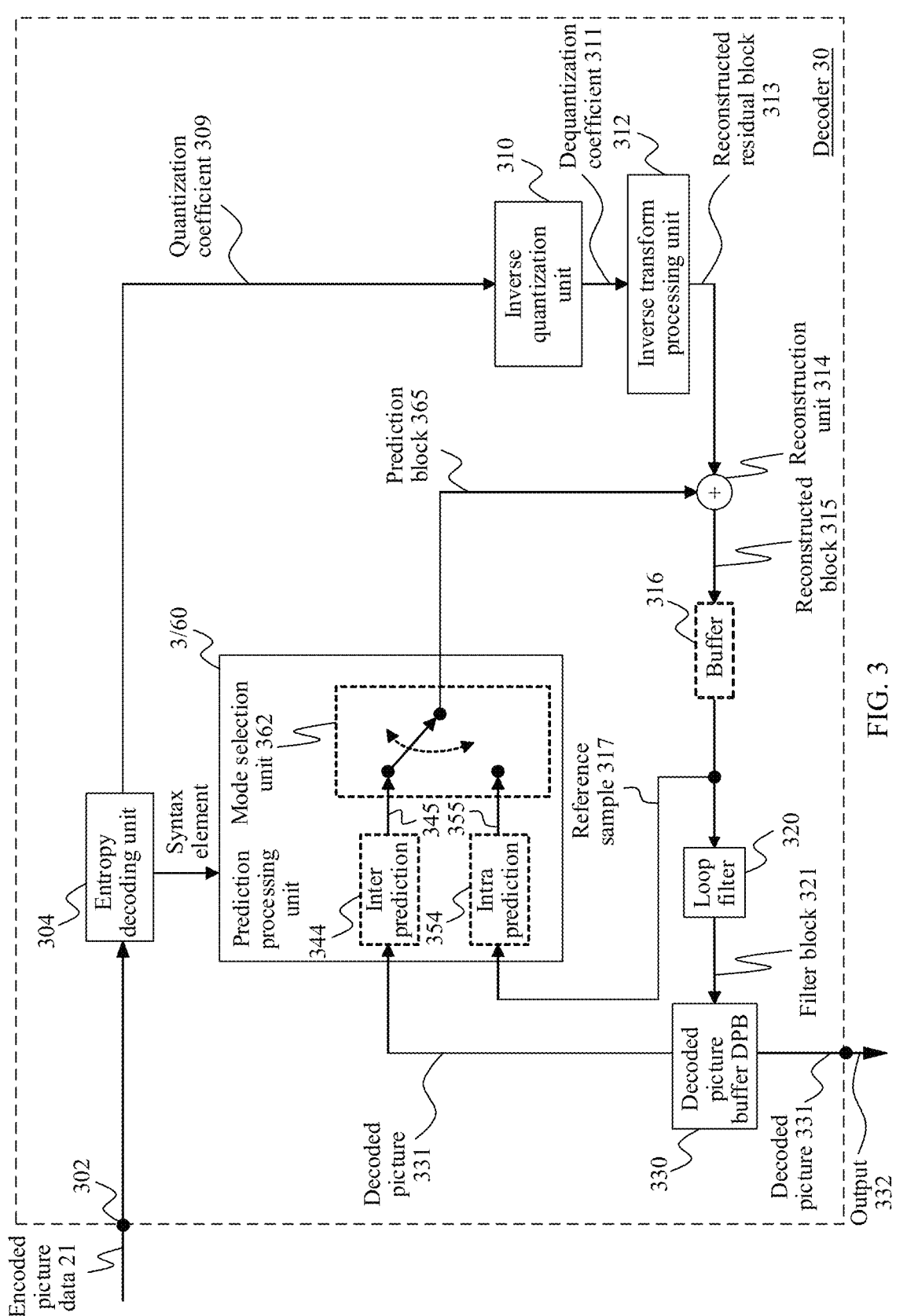
FIG. 3 is a structural block diagram of an instance of a decoder 30 used to implement an embodiment of the present invention.

FIG. 1B is an explanatory diagram of an example video coding system 40 including the encoder 20 of FIG. 2 and/or the decoder 30 of FIG. 3 according to an example embodiment. The video coding system 40 may implement combinations of various technologies in the embodiments of the present invention. In the described implementation, the video coding system 40 may include an imaging device 41, an encoder 20, a decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As discussed, although the video coding system 40 is depicted with the encoder 20 and the decoder 30, in different examples, the video coding system 40 may include only the encoder 20 or the decoder 30.

In some examples, the antenna 42 may be configured to transmit or receive an encoded bitstream of video data. In addition, in some examples, the display device 45 may be configured to present video data. In some examples, the logic circuit 47 may be implemented by using the processing unit 46. The processing unit 46 may include an application-specific integrated circuit (ASIC) logic, a graphics processor, a general purpose processor, and the like. The video coding system 40 may also include an optional processor 43. The optional processor 43 may similarly include an application-specific integrated circuit (ASIC) logic, a graphics processor, a general purpose processor, and the like. In some examples, the logic circuit 47 may be implemented by using hardware, such as video encoding dedicated hardware, and the processor 43 may be implemented by using general software, an operating system, and the like. In addition, the memory 44 may be any type of memory, such as a volatile memory (such as a static random access memory (SRAM), a dynamic random access memory (DRAM)), or a non-volatile memory (such as a flash memory). In a non-limiting instance, the memory 44 may be implemented by using a cache memory. In some examples, the logic circuit 47 may access the memory 44 (for example, for implementing a picture buffer). In another instance, the logic circuit 47 and/or the processing unit 46 may include a memory (for example, a cache) for implementing a picture buffer or the like.

In some examples, the encoder 20 implemented by using the logic circuit may include a picture buffer (for example, implemented by using the processing unit 46 or the memory 44) and a graphics processing unit (for example, implemented by using the processing unit 46). The graphics processing unit may be communicatively coupled to the picture buffer. The graphics processing unit may include the encoder 20 implemented by using the logic circuit 47 to implement various modules described with reference to FIG. 2 and/or any other encoder system or subsystem described herein. The logic circuit may be configured to perform various operations described herein.

In some examples, the decoder 30 may be implemented in a similar manner by using the logic circuit 47 to implement various modules described with reference to the decoder 30 of FIG. 3 and/or any other decoder system or subsystem described herein. In some examples, the decoder 30 implemented by using the logic circuit may include a picture buffer (for example, implemented by using the processing unit 46 or the memory 44) and a graphics processing unit (for example, implemented by using the processing unit 46). The graphics processing unit may be communicatively coupled to the picture buffer. The graphics processing unit may include the decoder 30 implemented by using the logic circuit 47 to implement various modules described with reference to FIG. 3 and/or any other decoder system or subsystem described herein.

In some examples, the antenna 42 may be configured to receive an encoded bitstream of video data. As discussed, the encoded bitstream may include data, an indicator, an index value, pattern selection data, and the like related to an encoded video frame as discussed herein, such as data related to encoding partition (for example, a transform coefficient or a quantized transform coefficient (as discussed), an optional indicator, and/or data defining encoding partition). The video coding system 40 may further include the decoder 30 coupled to the antenna 42 and configured to decode the encoded bitstream. The display device 45 is configured to present a video frame.

It should be understood that, for the instance described with reference to the encoder 20, the decoder 30 may be configured to perform a reverse process in this embodiment of the present invention. With respect to a signaling syntax element, the decoder 30 may be configured to receive and parse such a syntax element and decode related video data accordingly. In some examples, the encoder 20 may entropy encode the syntax element into an encoded video bitstream. In such examples, the decoder 30 may parse such a syntax element and decode related video data accordingly.

It should be noted that the method described in this embodiment of the present invention is mainly used in an inter prediction process. This process exists in both the encoder 20 and the decoder 30. The encoder 20 and the decoder 30 in this embodiment of the present invention may be an encoder/a decoder corresponding to a video standard protocol such as H.263, H.264, HEVV, MPEG-2, MPEG-4, VP8, or VPg, or a next-generation video standard protocol such as H.266.

FIG. 2 shows a schematic/conceptual block diagram of an example encoder 20 used to implement an embodiment of the present invention. In an instance of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, and for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder, where the backward signal path of the encoder corresponds to a signal path of a decoder (refer to the decoder 30 in FIG. 3).

The encoder 20 receives a picture 201 or a picture block 203 of the picture 201 such as a picture in a picture sequence that forms a video or a video sequence, by using, for example, an input 202. The picture block 203 may also be referred to as a current coding block or a to-be-processed picture block, and the picture 201 may be referred to as a current picture or a to-be-encoded picture (especially when the current picture is distinguished from another picture in video encoding, for example, the another picture is a previously encoded and/or decoded picture in a same video sequence, that is, a video sequence including the current picture).

An embodiment of the encoder 20 may include a partition unit (not shown in FIG. 2) configured to partition the picture 201 into a plurality of blocks, such as a picture block 203, usually into a plurality of non-overlapping blocks. The partition unit may be configured to use a same block size and define a corresponding grid of the block size for all pictures in the video sequence, or be configured to change block sizes between pictures or subsets or picture groups, and partition each picture into corresponding blocks.

In an instance, the prediction processing unit 260 of the encoder 20 may be configured to execute any combination of the above partition technologies.

For example, in the picture 201, the picture block 203 is also or may be considered as a two-dimensional array or matrix of sampling points with a sampling value, although a size of the picture block 203 is smaller than that of the picture 201. In other words, the picture block 203 may include, for example, one sampling array (for example, a luminance array in a case of a black-and-white picture 201) or three sampling arrays (for example, one luminance array and two chrominance arrays in a case of a color picture) or any other quantity and/or category of arrays based on an applied color format. Quantities of sampling points in horizontal and vertical directions (or axes) of the picture block 203 define the size of the picture block 203.

The encoder 20 shown in FIG. 2 is configured to encode the picture 201 block by block, for example, encode and predict each picture block 203.

The residual calculation unit 204 is configured to calculate a residual block 205 based on the picture block 203 and a prediction block 265 (other details of the prediction block 265 are provided below), for example, by subtracting a sample value of the prediction block 265 from a sample value of the picture block 203 sample by sample (pixel by pixel), to obtain the residual block 205 in a sample domain.

The transform processing unit 206 is configured to apply transform such as discrete cosine transform (DCT) or discrete sine transform (DST) on a sample value of the residual block 205 to obtain a transform coefficient 207 in a transform domain. The transform coefficient 207 may also be referred to as a transform residual coefficient, and represents the residual block 205 in the transform domain.

The transform processing unit 206 may be configured to apply an integer approximate value of the DCT/DST, for example, transform specified for HEVC/H.265. Compared with orthogonal DCT transform, this integer approximate value is usually scaled by a factor. To maintain a norm of a residual block processed by using forward transform and inverse transform, an additional scaling factor is applied as a part of the transform process. The scaling factor is usually selected based on constraints, for example, the scaling factor is a power of 2 for a shift operation, bit depth of a transform coefficient, and a trade-off between accuracy and implementation costs. For example, a specific scaling factor is specified for inverse transform on the decoder 30 side by using, for example, the inverse transform processing unit 212 (and is specified for corresponding inverse transform on the encoder 20 side by using, for example, the inverse transform processing unit 212), and correspondingly, a corresponding scaling factor may be specified for forward transform on the encoder 20 side by using the transform processing unit 206.

The quantization unit 208 is configured to quantize the transform coefficient 207 to obtain a quantized transform coefficient 209, for example, by applying scalar quantization or vector quantization. The quantized transform coefficient 209 may also be referred to as a quantized residual coefficient 209. A quantization process may reduce bit depth associated with some or all of transform coefficients 207. For example, n bits of transform coefficients may be rounded down to m bits of transform coefficients during quantization, where n is greater than m. A degree of quantization may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. A suitable quantization step may be indicated by using a quantization parameter (QP). For example, the quantization parameter may be an index of a predefined set of suitable quantization steps. For example, a smaller quantization parameter may correspond to fine quantization (a smaller quantization step), a larger quantization parameter may correspond to coarse quantization (a larger quantization step), and vice versa. Quantization may include dividing the quantization step and corresponding quantization or inverse quantization performed, for example, by the inverse quantization unit 210, or may include multiplying by the quantization step. The quantization step may be determined by using the quantization parameter in embodiments based on some standards such as HEVC. In general, the quantization step may be calculated based on the quantization parameter by using fixed-point approximation of an equation containing a division method. An additional scaling factor may be introduced for quantization and dequantization to recover a norm of a residual block that may be modified due to a scale used in the fixed-point approximation of the equation of the quantization step and the quantization parameter. In an instance implementation, scales of inverse transform and dequantization may be combined. Alternatively, a customized quantization table may be used and sent from the encoder to the decoder by using a signal, for example, in a bitstream. Quantization is a lossy operation, where a larger quantization step indicates a larger loss.

The inverse quantization unit 210 is configured to apply inverse quantization of the quantization unit 208 on a quantized coefficient to obtain a dequantized coefficient 211, for example, apply an inverse quantization solution of a quantization solution applied by the quantization unit 208, for example, based on or by using a quantization step same as that of the quantization unit 208. The dequantized coefficient 211 may also be referred to as a dequantized residual coefficient 211, which corresponds to the transform coefficient 207, although a loss due to quantization is generally different from that due to the transform coefficient.

The inverse transform processing unit 212 is configured to apply inverse transform of transform applied by the transform processing unit 206, for example, inverse discrete cosine transform (DCT) or inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, the reconstructed residual block 213) to the prediction block 265 to obtain a reconstructed block 215 in the sample domain, for example, add a sample value of the reconstructed residual block 213 to the sample value of the prediction block 265.

Optionally, a buffer unit 216 (or referred to as a "buffer" 216) of a line buffer 216 is configured to buffer or store the reconstructed block 215 and the corresponding sample value for, for example, intra prediction. In another embodiment, the encoder may be configured to use the unfiltered reconstructed block and/or the corresponding sample value stored in the buffer unit 216 for any type of estimation and/or prediction, such as intra prediction.

For example, an embodiment of the encoder 20 may be configured so that the buffer unit 216 is not only configured to store the reconstructed block 215 for intra prediction 254, but also used by the loop filter unit 220 (not shown in FIG. 2), so that the buffer unit 216 and the decoded picture buffer unit 230 form a buffer. Another embodiment may be used to use a filtered block 221 and/or a block or sample from the decoded picture buffer 230 (neither of which is shown in FIG. 2) as an input or a basis for intra prediction 254.

The loop filter unit 220 (or referred to as a "loop filter" 220) is configured to filter the reconstructed block 215 to obtain the filtered block 221, to smoothly perform pixel transform or improve video quality. The loop filter unit 220 is intended to represent one or more loop filters, such as a deblocking filter, a sample-adaptive offset (SAO) filter, or another filter, such as a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post filter. The filtered block 221 may also be referred to as a filtered reconstructed block 221. The decoded picture buffer 230 may store the reconstructed block after the loop filter unit 220 performs a filtering operation on the reconstructed coding block.

The embodiment of the encoder 20 (correspondingly, the loop filter unit 220) may be configured to output a loop filter parameter (for example, sample-adaptive offset information), for example, directly output the loop filter parameter or output the loop filter parameter after entropy encoding by the entropy encoding unit 270 or any another entropy encoding unit, for example, so that the decoder 30 can receive and apply the same loop filter parameter for decoding.

The decoded picture buffer (DPB) 230 may be a reference picture memory for storing reference picture data for encoding video data by the encoder 20. The DPB 230 may be formed by any one of a plurality of storage devices, such as a dynamic random access memory (dynamic random access memory, DRAM) (including a synchronous DRAM (SDRAM), a magnetoresistive RAM (MRAM), a resistive RAM (RRAM)), or another type of storage device. The DPB 230 and the buffer 216 may be provided by using a same storage device or separate storage devices. In an instance, the decoded picture buffer (DPB) 230 is configured to store the filtered block 221. The decoded picture buffer 230 may be further configured to store a same current picture or, for example, other previously filtered blocks of different previously reconstructed pictures, such as previously reconstructed and filtered blocks 221, and may provide complete previously reconstructed, namely, decoded pictures (and corresponding reference blocks and samples) and/or partly reconstructed current pictures (and corresponding reference blocks and samples) for, for example, inter prediction. In an instance, the decoded picture buffer (decoded picture buffer, DPB) 230 is configured to store the reconstructed block 215 if the reconstructed block 215 is reconstructed without in-loop filtering.

The prediction processing unit 260, also referred to as a block prediction processing unit 260, is configured to receive or obtain the picture block 203 (the current picture block 203 of the current picture 201) and reconstructed picture data, such as a reference sample from a same (current) picture of the buffer 216 and/or reference picture data 231 from one or more previously decoded pictures of the decoded picture buffer 230, and is configured to process such data for prediction, that is, provide a prediction block 265 that may be an inter prediction block 245 or an intra prediction block 255.

The mode selection unit 262 may be configured to select a prediction mode (for example, an intra or inter prediction mode) and/or the corresponding prediction block 245 or 255 used as the prediction block 265 to calculate the residual block 205 and reconstruct the reconstructed block 215.

An embodiment of the mode selection unit 262 may be used to select a prediction mode (for example, select a prediction mode from those prediction modes supported by the prediction processing unit 260), where the prediction mode provides best match or a minimum residual (the minimum residual means better compression in transmission or storage), or provides a minimum signaling overhead (the minimum signaling overhead means better compression in transmission or storage), or considers or balances both. The mode selection unit 262 may be configured to determine the prediction mode based on rate distortion optimization (RDO), that is, select a prediction mode that provides minimum rate distortion optimization, or select a prediction mode in which related rate distortion meets at least a prediction mode selection criterion.

Prediction processing performed in an instance of the encoder 20 (for example, by using the prediction processing unit 260) and mode selection performed (for example, by using the mode selection unit 262) are explained in detail below.

As described above, the encoder 20 is configured to determine or select a best or an optimal prediction mode from (a predetermined) prediction mode set. The prediction mode set may include, for example, an intra prediction mode and/or an inter prediction mode.

In a possible implementation, an intra prediction mode set may include a plurality of different intra prediction modes, for example, non-directional modes such as a DC (or mean) mode and a planar mode, or directional modes as defined in H.265, or may include 67 different intra prediction modes, for example, non-directional modes such as a DC (or mean) mode and a planar mode, or directional modes as defined in developing H.266.

In a possible implementation, an inter prediction mode set depends on available reference pictures (that is, for example, at least some decoded pictures stored in the DPB 230 as described above) and another inter prediction parameter, for example, depends on whether an entire reference picture is used or only a portion of the reference picture is used, for example, an optimal matched reference block is searched for around a search window region of a region of a current block; and/or depends, for example, on whether pixel interpolation such as half/semi-pel and/or quarter-pel interpolation is used, where the inter prediction mode set may include, for example, advanced motion vector prediction (AMVP) mode and a merge mode. In specific implementation, the inter prediction mode set may include an affine motion model-based prediction mode described in this embodiment of the present invention, for example, an affine motion model-based advanced motion vector prediction mode (affine AMVP mode) or an affine motion model-based merge mode (affine merge mode); specifically, a control point-based AMVP mode (inherited control point motion vector prediction method or constructed control point motion vector prediction method) and a control point-based merge mode (inherited control point motion vector prediction method or constructed control point motion vector prediction method); and an advanced temporal motion vector prediction (ATMVP) method, a PLANAR method, and the like; or, a subblock-based merge mode formed by combining the affine motion model-based merge mode, the ATMVP and/or the PLANAR method; or the like. In this embodiment of the present invention, inter prediction for the to-be-processed picture block may be applied to unidirectional prediction (forward or backward), bidirectional prediction (forward and backward), or multi-frame prediction. When inter prediction is applied to bidirectional prediction, bidirectional prediction block level generalized Bi-prediction (GBi), or referred to as a weighted prediction method, may be used. In an instance, the intra prediction unit 254 may be configured to execute any combination of intra prediction technologies described below.

In addition to the foregoing prediction modes, a skip mode and/or a direct mode may also be used in this embodiment of the present invention.

The prediction processing unit 260 may be further configured to partition the picture block 203 into smaller block partitions or subblocks, for example, through iterative use of quad-tree (QT) partition, binary-tree (BT) partition, or triple-tree (Tr) partition, or any combination thereof; and is configured to perform prediction, for example, for each of the block partitions or the subblocks, where mode selection includes selecting a tree structure of the to-be-partitioned picture block 203 and selecting a prediction mode applied to each of the block partitions or the subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and the decoded picture 231, or at least one or more previously reconstructed blocks, such as one or more reconstructed blocks of other/different previously decoded pictures 231, to perform motion estimation based on the determined inter prediction mode. For example, the video sequence may include the current picture and the previously decoded picture 31, or in other words, the current picture and the previously decoded picture 31 may be parts of the picture sequence forming the video sequence, or form the picture sequence.

For example, the encoder 20 may be configured to select a reference block from a plurality of reference blocks of a same picture or different pictures in a plurality of other pictures (reference pictures), and to provide a reference picture and/or an offset (spatial offset) between a position of the reference block (X and Y coordinates) and a position of a current block to the motion estimation unit (not shown in FIG. 2) as an inter prediction parameter. The offset is also referred to as a motion vector (MV).

The motion compensation unit is configured to: obtain the inter prediction parameter, and perform inter prediction based on or by using the inter prediction parameter to obtain the inter prediction block 245. Motion compensation performed by the motion compensation unit (not shown in FIG. 2) may include taking out or generating a prediction block (predictor) based on a motion/block vector determined by using motion estimation (by possibly performing interpolation of sub-pixel accuracy). Interpolation filtering may produce an additional pixel sample from a known pixel sample, potentially increasing a quantity of candidate prediction blocks that can be used to encode a picture block. Once a motion vector for a PU of a current picture block is received, the motion compensation unit 246 may locate a prediction block to which the motion vector points in a reference picture list. The motion compensation unit 246 may further generate a syntax element associated with a block and a video slice, which can be used by the decoder 30 to decode a picture block of the video slice.

Specifically, the inter prediction unit 244 may transmit a syntax element to the entropy encoding unit 270, where the syntax element, for example, includes an inter prediction parameter (for example, indication information of an inter prediction mode that is used for prediction of the current block and that is selected after a plurality of inter prediction modes are traversed), and an index number of a candidate motion vector list, and optionally includes a GBi index number, a reference frame index, and the like. In a possible application scenario, if there is only one inter prediction mode, the inter prediction parameter may not be carried in the syntax element. In this case, the decoder side 30 may directly perform decoding by using a default prediction mode. It may be understood that the inter prediction unit 244 may be configured to execute any combination of inter prediction technologies.

The intra prediction unit 254 is configured to obtain, for example, receive a picture block 203 (a current picture block) of a same picture and one or more previously reconstructed blocks, for example, reconstructed adjacent blocks, to perform intra estimation. For example, the encoder 20 may be configured to select an intra prediction mode from a plurality of (predetermined) intra prediction modes.

An embodiment of the encoder 20 may be used to select an intra prediction mode based on an optimization criterion, such as based on a minimum residual (for example, providing an intra prediction mode of the prediction block 255 most similar to the current picture block 203) or minimum bit rate distortion.

The intra prediction unit 254 is further configured to determine the intra prediction block 255 based on an intra prediction parameter of the selected intra prediction mode. In any case, after an intra prediction mode for a block is selected, the intra prediction unit 254 is further configured to provide an intra prediction parameter to the entropy encoding unit 270, that is, to provide information indicating the selected intra prediction mode for a block. In an instance, the intra prediction unit 254 may be configured to execute any combination of intra prediction technologies.

Specifically, the intra prediction unit 254 may transmit a syntax element to the entropy encoding unit 270, where the syntax element includes an intra prediction parameter (for example, indication information of an intra prediction mode that is used for prediction of the current block and that is selected after a plurality of intra prediction modes are traversed). In a possible application scenario, if there is only one intra prediction mode, the intra prediction parameter may not be carried in the syntax element. In this case, the decoder side 30 may directly perform decoding by using a default prediction mode.

The entropy encoding unit 270 is configured to apply (or not to apply) an entropy encoding algorithm or solution (for example, a variable length coding (VLC) solution, a context adaptive VLC (CAVLC) solution, an arithmetic coding solution, context adaptive binary arithmetic coding (CABAC), syntax-based context-adaptive binary arithmetic coding (SBAC), probability interval partitioning entropy (PIPE) encoding or another entropy encoding method or technology) to a single one or all of the quantized residual coefficient 209, the inter prediction parameter, the intra prediction parameter, and/or the loop filter parameter to obtain the encoded picture data 21 that can be output in a form of, for example, the encoded bitstream 21 by an output 272. The encoded bitstream may be transmitted to the decoder 30 or archived for transmission or retrieval by the decoder 30 later. The entropy encoding unit 270 may be further configured to entropy encode another syntax element of a current video slice that is being encoded.

Another structural variation of the encoder 20 may be used to encode a video stream. For example, a non-transform-based encoder 20 may directly quantize a residual signal without the transform processing unit 206 for some blocks or frames. In another implementation, the encoder 20 may have the quantization unit 208 and the inverse quantization unit 210 that are combined into a single unit.

Figure 11A:
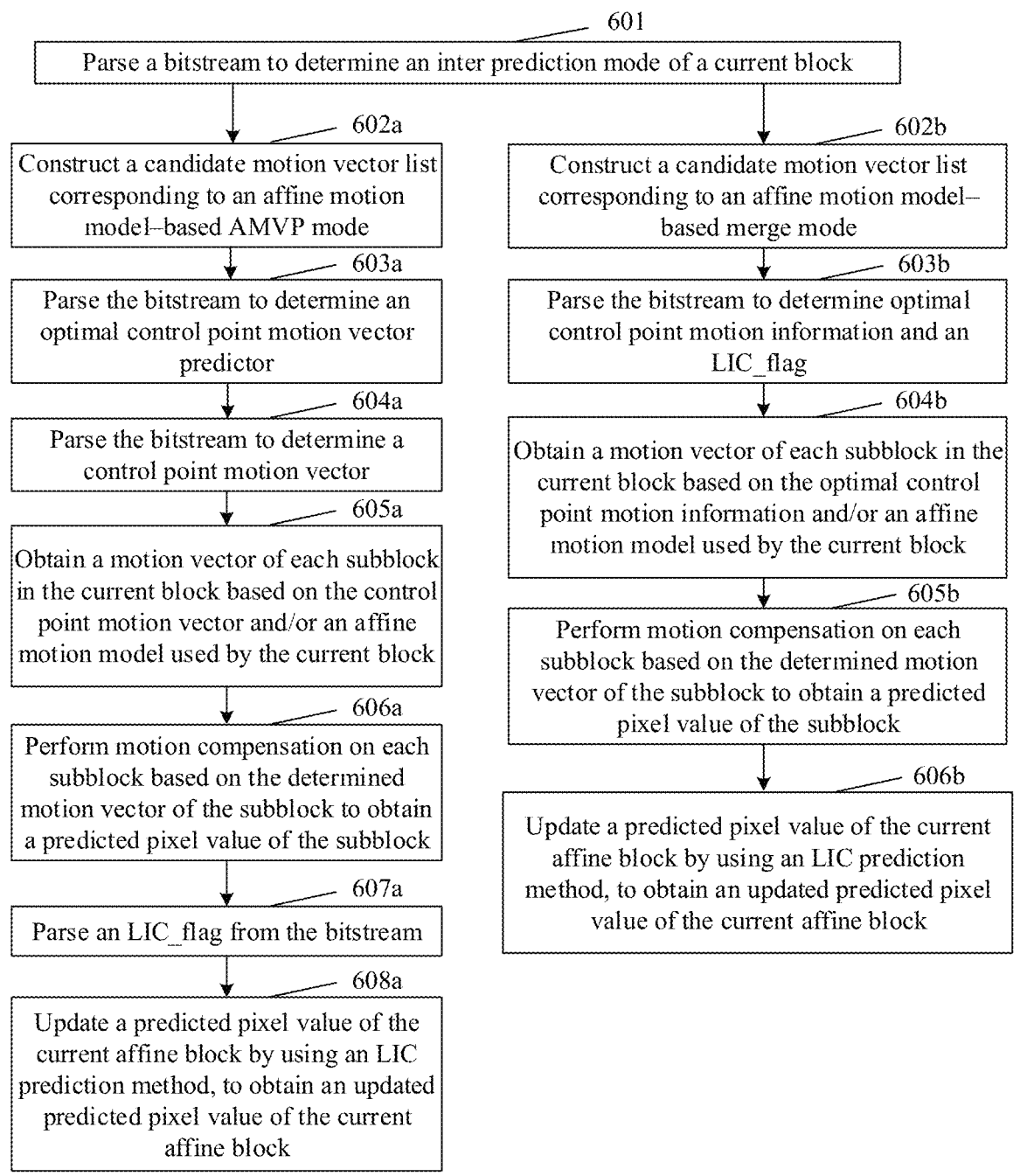
FIG. 11A is an example flowchart of a video picture decoding method.
Figure 11B:
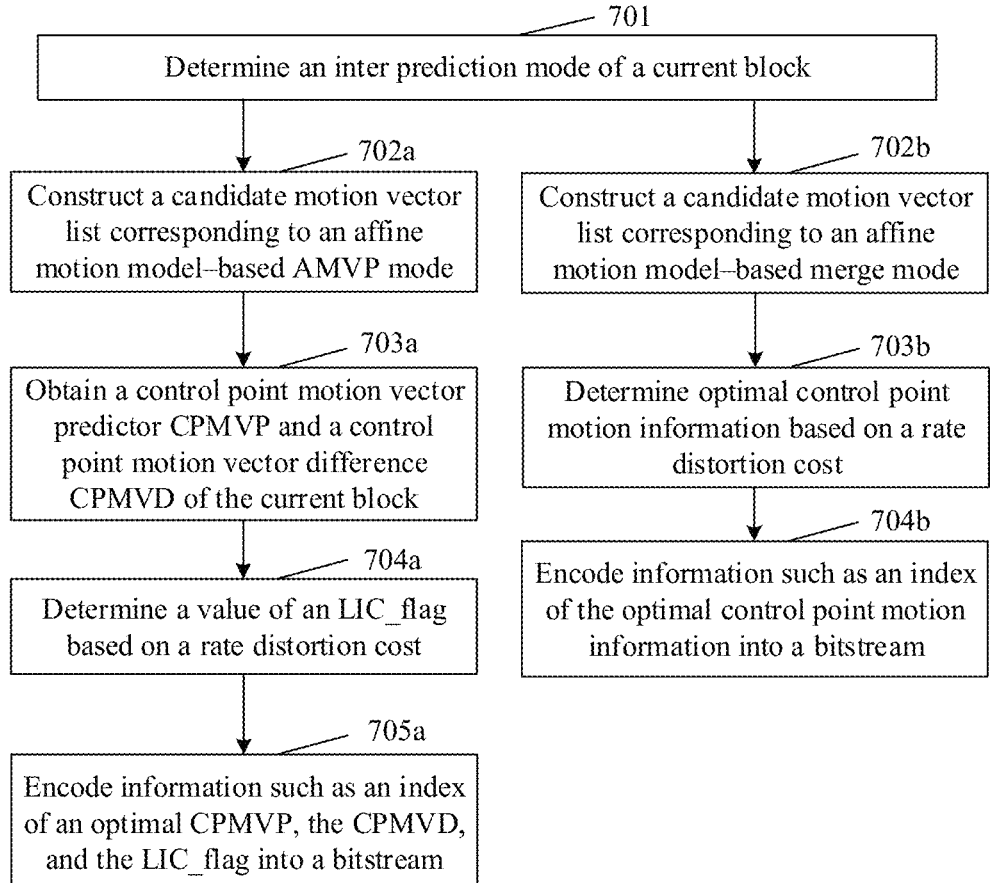
FIG. 11C is an example flowchart of an inter prediction method.

In a specific embodiment, the encoder 20 may be configured to implement an inter prediction method described in an embodiment of FIG. 11B in the following.

It should be understood that another structural change of the encoder 20 may be used to encode a video stream. For example, for some picture blocks or picture frames, the encoder 20 may directly quantize a residual signal without processing by the transform processing unit 206, and correspondingly without processing by the inverse transform processing unit 212. Alternatively, for some picture blocks or picture frames, the encoder 20 does not generate residual data, and correspondingly does not need processing by the transform processing unit 206, the quantization unit 208, the inverse quantization unit 210, and the inverse transform processing unit 212. Alternatively, the encoder 20 may store a reconstructed picture block directly as a reference block without processing by the filter 220. Alternatively, the quantization unit 208 and the inverse quantization unit 210 in the encoder 20 may be combined together. The loop filter 220 is optional, and in a case of lossless compression coding, the transform processing unit 206, the quantization unit 208, the inverse quantization unit 210, and the inverse transform processing unit 212 are optional. It should be understood that, based on different application scenarios, the inter prediction unit 244 and the intra prediction unit 254 may be selectively enabled.

FIG. 3 is a schematic/conceptual block diagram of an instance of a decoder 30 used to implement an embodiment of the present invention. The decoder 30 is configured to receive, for example, encoded picture data (for example, the encoded bitstream) 21 encoded by the encoder 20 to obtain a decoded picture 231. During a decoding process, the decoder 30 receives video data, from the encoder 20, such as representing an encoded video bitstream of a picture block of an encoded video slice and an associated syntax element.

In the instance of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the decoder 30 may perform a decoding process substantially inverse to an encoding process performed by the encoder 20 described above with reference to FIG. 2.

The entropy decoding unit 304 is configured to perform entropy decoding on the encoded picture data 21 to obtain, for example, a quantized coefficient 309 and/or a decoded coding parameter (not shown in FIG. 3), such as any one or all of an inter prediction parameter, an intra prediction parameter, a loop filter parameter, and/or another syntax element (decoded). The entropy decoding unit 304 is further configured to forward the inter prediction parameter, the intra prediction parameter, and/or the another syntax element to the prediction processing unit 360. The decoder 30 may receive a syntax element at a video slice level and/or a video block level.

The inverse quantization unit 310 may be functionally the same as the inverse quantization unit 210, the inverse transform processing unit 312 may be functionally the same as the inverse transform processing unit 212, the reconstruction unit 314 may be functionally the same as the reconstruction unit 214, the buffer 316 may be functionally the same as the buffer 216, the loop filter 320 may be functionally the same as the loop filter 220, and the decoded picture buffer 330 may be functionally the same as the decoded picture buffer 230.

The prediction processing unit 360 may include an inter prediction unit 344 and an intra prediction unit 354, where the inter prediction unit 344 may be functionally similar to the inter prediction unit 244, and the intra prediction unit 354 may be functionally similar to the intra prediction unit 254. The prediction processing unit 360 is usually configured to perform block prediction and/or obtain a prediction block 365 from the encoded picture data 21, and (explicitly or implicitly) receive or obtain a prediction-related parameter and/or information about a selected prediction mode from, for example, the entropy decoding unit 304.

When a video slice is encoded as an intra coded slice (I) slice, the intra prediction unit 354 of the prediction processing unit 360 is configured to generate a prediction block 365 for a picture block of the current video slice based on an intra prediction mode represented by a signal and data from a current frame or a previous decoded block of a picture. When a video frame is encoded as an inter coded slice (that is, B or P), the inter prediction unit 344 (for example, a motion compensation unit) of the prediction processing unit 360 is configured to generate a prediction block 365 for a video block of a current video slice based on a motion vector and another syntax element received from the entropy decoding unit 304. For inter prediction, a prediction block may be generated from a reference picture in a reference picture list. The decoder 30 may construct reference frame lists: a list 0 and a list 1, based on a reference picture stored in the DPB 330 by using a default construction technology.

The prediction processing unit 360 is configured to: determine prediction information of a video block for the current video slice by parsing the motion vector and another syntax element, and generate, by using the prediction information, a prediction block for a current video block being decoded. In an instance of the present invention, the prediction processing unit 360 determines, by using some received syntax elements, a prediction mode (for example, intra or inter prediction) for encoding a video block of a video slice, an inter prediction slice type (for example, a B slice, a P slice, or a GPB slice), one or more pieces of construction information in a reference picture list used for a slice, a motion vector of each inter encoding video block used for a slice, an inter prediction state of each inter encoding video block for a slice, and other information, so as to decode the video block of the current video slice. In another instance of this disclosure, a syntax element received by the decoder 30 from a bitstream includes a syntax element in one or more of an adaptive parameter set (APS), a sequence parameter set (SPS), a picture parameter set (PPS), or a slice header.

The inverse quantization unit 310 may be configured to inversely quantize (that is, dequantize) a quantized transform coefficient provided in a bitstream and decoded by the entropy decoding unit 304. An inverse quantization process may include using a quantization parameter calculated by the encoder 20 for each video block in the video slice, to determine a degree of quantization applied and also determine a degree of inverse quantization applied.

The inverse transform processing unit 312 is configured to apply inverse transform (for example, inverse DCT, inverse integer transform, or a conceptually similar inverse transform process) to the transform coefficient, so as to generate a residual block in a pixel domain.

The reconstruction unit 314 (for example, a summer 314) is configured to add an inverse transform block 313 (that is, a reconstructed residual block 313) to the prediction block 365 to obtain a reconstructed block 315 in a sample domain, for example, add a sample value of the reconstructed residual block 313 to a sample value of the prediction block 365.

The loop filter unit 320 (during or after an encoding cycle) is configured to filter the reconstructed block 315 to obtain a filtered block 321, to smoothly perform pixel transform or improve video quality. In an instance, the loop filter unit 320 may be configured to execute any combination of filtering technologies described below. The loop filter unit 320 is intended to represent one or more loop filters, such as a deblocking filter, a sample-adaptive offset (SAO) filter, or another filter, such as a bilateral filter, an adaptive loop filter (adaptive loop filter, ALF), a sharpening or smoothing filter, or a collaborative filter. Although the loop filter unit 320 is shown as an in-loop filter in FIG. 3, in another configuration, the loop filter unit 320 may be implemented as a post filter.

A decoded video block 321 in a given frame or picture is then stored in the decoded picture buffer 330 storing a reference picture for subsequent motion compensation.

The decoder 30 is configured to, for example, output a decoded picture 31 by using an output 332 to present the picture to a user or to the user for viewing.

Another variation of the decoder 30 may be used to decode a compressed bitstream. For example, the decoder 30 may generate an output video stream without the loop filter unit 320. For example, a non-transform-based decoder 30 may directly inversely quantize a residual signal without the inverse transform processing unit 312 for some blocks or frames. In another implementation, the decoder 30 may have the inverse quantization unit 310 and the inverse transform processing unit 312 that are combined into a single unit.

In a specific embodiment, the decoder 30 may be configured to implement an inter prediction method described in an embodiment of FIG. 11A in the following.

It should be understood that another structural change of the decoder 30 may be used to decode an encoded video bitstream. For example, the decoder 30 may generate an output video stream without processing by the filter 320. Alternatively, for some picture blocks or picture frames, the entropy decoding unit 304 of the decoder 30 does not decode the quantized coefficient, and correspondingly does not need processing by the inverse quantization unit 310 and the inverse transform processing unit 312. The loop filter 320 is optional. In a case of lossless compression, the inverse quantization unit 310 and the inverse transform processing unit 312 are optional. It should be understood that, based on different application scenarios, the inter prediction unit and the intra prediction unit may be selectively enabled.

It should be understood that, in the encoder 20 and the decoder 30 in the present invention, a processing result of a specific phase may be further processed and then output to the next phase. For example, after interpolation filtering, motion vector derivation or loop filtering, a further operation, such as clip or shift, may be performed on the processing result of a corresponding phase.

For example, further operations may be applied to the control point motion vectors of a current picture block that are derived based on a motion vector of an adjacent affine coding block, which is not limited in the present invention. For example, a value range of the motion vector is constrained to be within the bit width. It is assumed that an allowed bit width of the motion vector is bitDepth, the range of the motion vector is $-2^\wedge(\text{bitDepth-1})$ to $2^\wedge(\text{bitDepth-1})-1$, where symbol "^" represents a power. If bitDepth is set equal to 16, the value range is $-32768$ to $32767$. If bitDepth is set equal to 18, the value range is $-131072$ to $131071$. The value range may be constrained in the following two manners:

Manner 1: Remove the Overflow Most Significant Bit of the Motion Vector:

$$ux = \left(vx + 2^{bitDepth}\right)\%2^{bitDepth}$$

$$vx = \left(ux >= 2^{bitDepth-1}\right)?\left(ux - 2^{bitDepth}\right):ux$$

$$uy = \left(vy + 2^{bitDepth}\right)\%2^{bitDepth}$$

$$vy = \left(uy >= 2^{bitDepth-1}\right)?\left(uy - 2^{bitDepth}\right):uy$$

For example, if a value of vx is $-32769$, after applying the foregoing formulas, the resulting value is $32767$. In a computer, decimal numbers are stored as two's complement. The two's complement of $-32769$ is $1,0111,1111,1111,1111$ (17 bits), then the most significant bit is discarded, so that the value of vx is $0111,1111,1111,1111$ (decimal number is $32767$), which is same as the output by applying the formulas.

Method 2: Remove the Overflow Most Significant Bit by Clipping the Value, as Shown in the Following Formula:

$$vx = \text{Clip3}\left(-2^{bitDepth-1}, 2^{bitDepth-1} - 1, vx\right)$$

$$vy = \text{Clip3}\left(-2^{bitDepth-1}, 2^{bitDepth-1} - 1, vy\right)$$

A definition of Clip3 means clipping a value of z within [x, y]:

$$\text{Clip3}(x, y, z) = \begin{cases} x; & z < x \\ y; & z > y \\ z; & \text{otherwise} \end{cases} \text{''}$$

Figure 4:
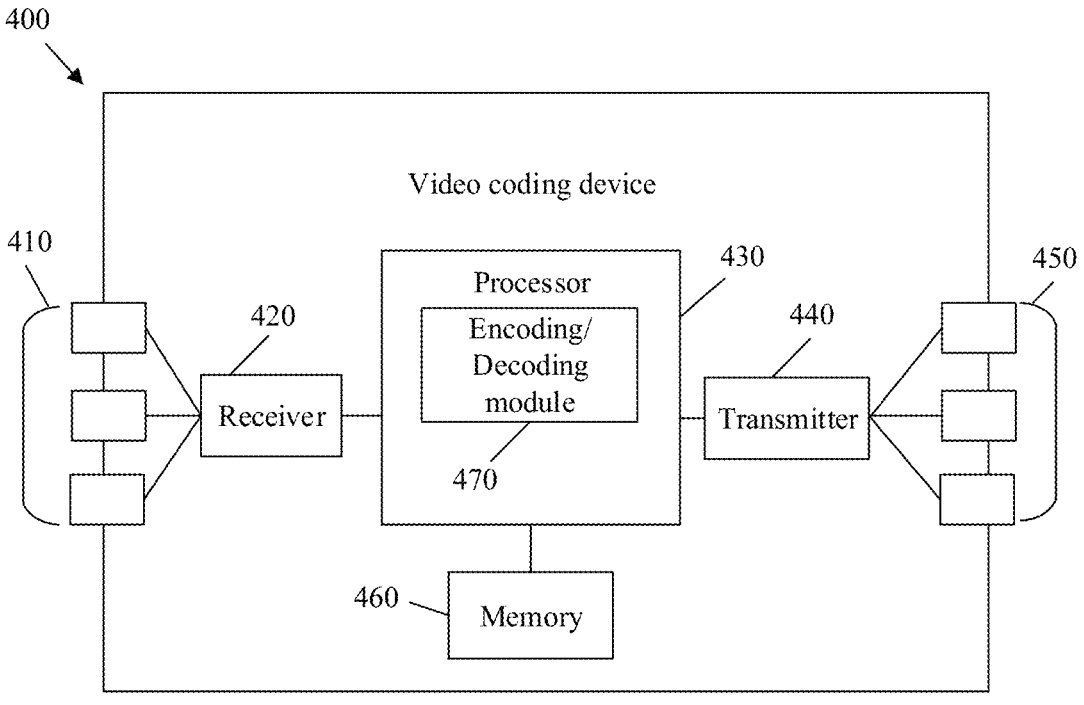
FIG. 4 is a block diagram of an instance of a video coding device 400 used to implement an embodiment of the present invention.

FIG. 4 is a schematic structural diagram of a video coding device 400 (such as a video encoding device 400 or a video decoding device 400) according to an embodiment of the present invention. The video coding device 400 is adapted to implement the embodiment described herein. In an embodiment, the video coding device 400 may be a video decoder (such as the decoder 30 of FIG. 1A) or a video encoder (such as the encoder 20 of FIG. 1A). In another embodiment, the video coding device 400 may be one or more components of the decoder 30 of FIG. 1A or the encoder 20 of FIG. 1A.

The video coding device 400 includes: an ingress port 410 and a receiver unit (Rx) 420 configured to receive data, a processor, a logic unit, or a central processing unit (CPU) 430 configured to process data, a transmitter unit (Tx) 440 and an egress port 450 configured to transmit data, and a memory 460 configured to store data. The video coding device 400 may further include a photoelectric conversion component and an electro-optical (EO) component that are coupled to the ingress port 410, the receiver unit 420, the transmitter unit 440, and the egress port 450, and that are used for an egress or an ingress of an optical signal or an electrical signal.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiment disclosed in this specification, so as to implement an inter prediction method provided in the embodiment of the present invention. For example, the encoding/decoding module 470 implements, processes, or provides various coding operations. Therefore, functionality of the video coding device 400 is substantially improved by the encoding/decoding module 470 and transition of the video coding device 400 to a different state is affected. Alternatively, the encoding/decoding module 470 is implemented by using instructions stored in the memory 460 and executed by the processor 430.

The memory 460 includes one or more disks, tape drives, and solid state disks, may be used as a storage device for overflowed data, and is configured to store programs when these programs are selectively executed, and store instructions and data that are read in a program execution process. The memory 460 may be volatile and/or non-volatile, and may be a read-only memory (ROM), a random access memory (RAM), a ternary content-addressable memory (ternary content-addressable memory, TCAM), and/or a static random access memory (SRAM).

Figure 5:
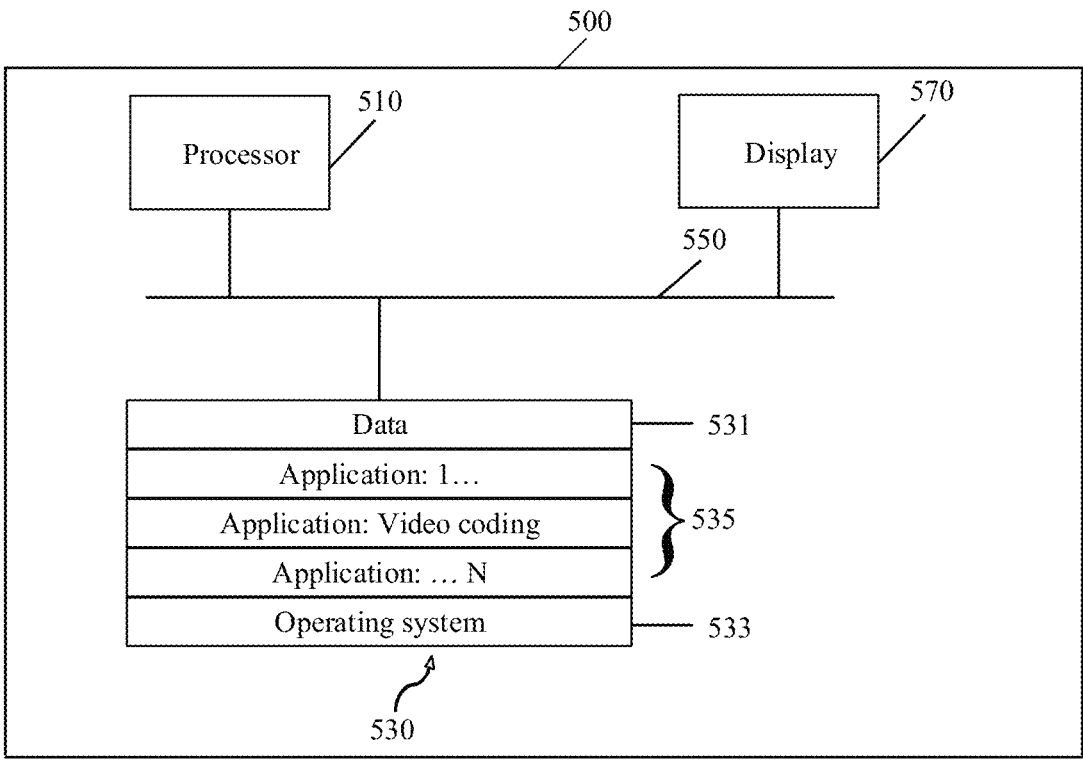
FIG. 5 is a block diagram of another example video coding device used to implement an embodiment of the present invention.

FIG. 5 is a simplified block diagram of an apparatus 500 that may be used as any one or two of the source device 12 and the destination device 14 of FIG. 1A according to an example embodiment. The apparatus 500 may implement the technologies of the present invention. In other words, FIG. 5 is a schematic block diagram of an implementation of an encoding device or a decoding device (referred to as a coding device 500) according to an embodiment of the present invention. The coding device 500 may include a processor 510, a memory 530, and a bus system 550. The processor is connected to the memory by using the bus system, the memory is configured to store instructions, and the processor is configured to execute the instructions stored in the memory. The memory of the coding device stores program code, and the processor may invoke the program code stored in the memory to execute various video encoding or decoding methods described in the present invention. To avoid repetition, details are not described herein again.

In the embodiment of this application, the processor 510 may be a central processing unit (Central Processing Unit, "CPU" for short), or the processor 510 may be another general purpose processor, a digital signal processor (DSP), an application-specific integrated circuit (ASIC), a field-programmable gate array (FPGA), or another programmable logic device, discrete gate or transistor logic device, discrete hardware component, or the like. The general purpose processor may be a microprocessor, or the processor may be any conventional processor or the like.

The memory 530 may include a read-only memory (ROM) device or a random access memory (RAM) device. Any another suitable type of storage device may also be used as the memory 530. The memory 530 may include code and data 531 accessed by the processor 510 by using the bus system 550. The memory 530 may further include an operating system 533 and an application program 535, and the application program 535 includes at least one program that allows the processor 510 to execute the video encoding or decoding method described in the present invention. For example, the application program 535 may include applications 1 to N, which further include a video encoding or decoding application (referred to as a video coding application) performing the video encoding or decoding method described in the present invention.

The bus system 550 may further include a power bus, a control bus, a status signal bus, and the like, in addition to a data bus. However, for clear description, various types of buses in the figure are marked as the bus system 550.

Optionally, the coding device 500 may further include one or more output devices, such as a display 570. In an example, the display 570 may be a touch-sensitive display that combines the display with a touch-sensitive unit operable to sense a touch input. The display 570 may be connected to the processor 510 by using the bus 550.

Although the processor 510 and the memory 530 of the apparatus 500 are depicted in FIG. 5 as integrated into a single unit, another configuration may be used. The operation of the processor 510 may be distributed in a plurality of machines that can be directly coupled (each machine has one or more processors), or in a local area or another network. The memory 530 may be distributed in a plurality of machines, such as network-based memories or memories in a plurality of machines running the apparatus 500. Although only a single bus is depicted herein, the bus 550 of the apparatus 500 may be formed by a plurality of buses. Further, the memory 530 may be directly coupled to another component of the apparatus 500 or may be accessed through a network, and may include a single integrated unit such as a storage card, or a plurality of units such as a plurality of storage cards. Therefore, the apparatus 500 may be implemented in a plurality of configurations.

To better understand the technical solutions in the embodiments of the present invention, the following further describes the inter prediction mode, a non-translational motion model, the inherited control point motion vector prediction method, the constructed control point motion vector prediction method, the affine motion model-based advanced motion vector prediction mode, the affine motion model-based merge mode, the subblock-based merge mode, and the generalized bidirectional prediction method that are involved in the embodiments of the present invention.

(1) Inter Prediction Mode: In the Existing Video Coding Standard HEVC, Two Inter Prediction Modes are Used: An Advanced Motion Vector Prediction (AMVP) Mode and a Merge Mode.

For the AMVP mode, spatially or temporally adjacent encoded blocks (denoted as adjacent blocks) of a current block are first traversed, and a candidate motion vector list (or referred to as a candidate motion information list) is constructed based on motion information of each adjacent block. Then, an optimal motion vector is determined from the candidate motion vector list based on a rate distortion cost, and candidate motion information with a lowest rate distortion cost is used as a motion vector predictor (MVP) of the current block. Positions of the adjacent blocks and a traversal sequence thereof are predefined. The rate distortion cost is calculated according to formula (1), where J represents the rate distortion cost RD cost, SAD represents a sum of absolute differences (SAD) between a predicted pixel value obtained after motion estimation is performed by using a candidate motion vector predictor and an original pixel value, R represents a bit rate, and λ represents a Lagrange multiplier. An encoder side transmits an index value of a selected motion vector predictor in the candidate motion vector list and a reference frame index value to a decoder side. Further, motion searching is performed in an MVP-centered adjacent domain to obtain an actual motion vector of a current block, and the encoder side transmits a difference (motion vector difference) between the MVP and the actual motion vector to the decoder side.

$$J = SAD + \lambda R \qquad (1)$$

Figure 6:
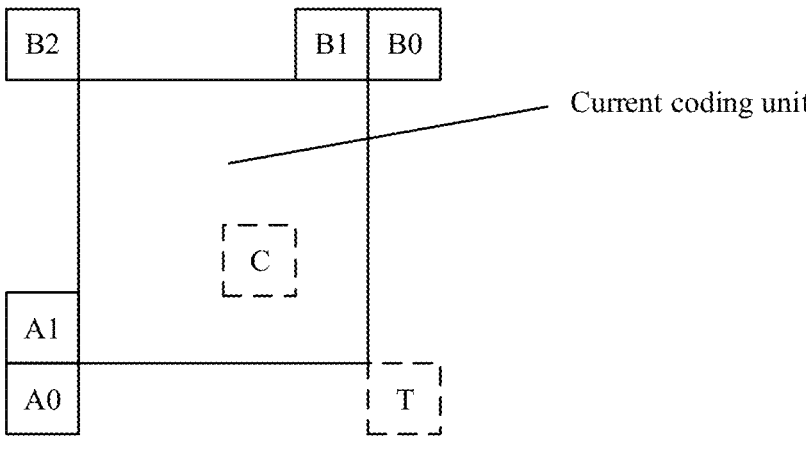
FIG. 6 is an example schematic diagram used to indicate candidate motion information of a current picture block in space domain and time domain.

For the merge mode, a candidate motion vector list is constructed based on motion information of spatially or temporally adjacent encoded blocks of a current block. Then, optimal motion information is determined from the candidate motion vector list as motion information of the current block by calculating a rate distortion cost. Then, an index value (which may be denoted as a merge index, the same below) of a position of the optimal motion information in the candidate motion vector list is transferred to the decoder side. Candidate motion information of the current block in space domain and time domain is shown in FIG. 6. The candidate motion information $iN^{th}$ space domain comes from five spatially adjacent blocks (A0, A1, B0, B1, and B2). If an adjacent block cannot be obtained (the adjacent block does not exist or the adjacent block is not encoded or a prediction mode used by the adjacent block is not an inter prediction mode), motion information of the adjacent block is not to be added to the candidate motion vector list. The candidate motion information of the current block in time domain is obtained by scaling an MV of a block in a corresponding position in a reference frame based on picture order counts (POC) of the reference frame and a current frame. First, it is determined whether a block in a position T in the reference frame can be obtained; and if the block cannot be obtained, a block in a position C is selected.

Similar to the AMVP mode, positions of adjacent blocks in the merge mode and a traversal sequence thereof are also predefined, and the positions of the adjacent blocks and the traversal sequence thereof may be different in different modes.

It can be learned that in both the AMVP mode and the merge mode, a candidate motion vector list needs to be maintained. Each time before new motion information is added to the candidate list, whether same motion information exists in the list is checked. If the same motion information exists, the motion information is not to be added to the list. This check process is referred to as pruning of the candidate motion vector list. List pruning is to prevent same motion information from appearing in the list, so as to avoid redundant rate distortion cost calculation.

During inter prediction in HEVC, same motion information is used for all pixels in a coding block, and then motion compensation is performed based on the motion information to obtain a predictor of a pixel in the coding block. However, not all the pixels in the coding block have a same motion feature. Using the same motion information may cause inaccurate motion compensation prediction, and consequently residual information is increased.

In an existing video coding standard, motion estimation is performed by using block matching based on a translational motion model, and it is assumed that motion of all pixels in the block is consistent. However, in the real world, motion is diverse, and there are many non-translational motion objects, such as a rotating object, a roller coaster that rotates in different directions, fireworks that are set off, and some special actions in a movie, especially a motion object in a UGC scenario. For encoding of these objects, if a block motion compensation technology based on a translational motion model in a current encoding standard is used, encoding efficiency is greatly affected. Therefore, a non-translational motion model, such as an affine motion model, is generated, so as to further improve encoding efficiency.

On this basis, based on different motion models, the AMVP mode may be divided into a translational motion model-based AMVP mode and a non-translational motion model-based AMVP mode. The merge mode may be divided into a translational motion model-based merge mode and a non-translational motion model-based merge mode.

(2) Non-translational motion model: Non-translational motion model prediction indicates that the encoder side and the decoder side use a same motion model to derive motion information of each motion compensation subunit (also referred to as a subblock) in a current block, and motion compensation is performed based on the motion information of the motion compensation subunit to obtain a prediction block. This improves prediction efficiency. Common non-translational motion models include a 4-parameter affine motion model and a 6-parameter affine motion model.

The motion compensation subunit in this embodiment of the present invention may be a pixel or a pixel block whose size is $N_1 \times N_2$ and divided by using a specific method, where $N_1$ and $N_2$ are both positive integers, and $N_1$ may be equal to $N_2$, or may not be equal to $N_2$.

Common non-translational motion models include a 4-parameter affine motion model and a 6-parameter affine motion model, and in a possible application scenario, an 8-parameter bilinear model may further exist, which are separately described in the following.

The 4-parameter affine motion model is shown in the following formula (2):

$$\begin{cases} vx = a_1 + a_3 x + a_4 y \\ vy = a_2 - a_4 x + a_3 y \end{cases} \tag{2}$$

The 4-parameter affine motion model may be represented by using motion vectors of two pixels and coordinates of the two pixels relative to the top-left sample of a current block, and a pixel used to represent a motion model parameter is referred to as a control point. If the top-left sample (0, 0) and the top-right sample (W, 0) are used as control points, motion vectors (vx0, vy0) and (vx1, vy1) of the top-left sample and the top-right sample control points of the current block are first determined, and motion information of each motion compensation subunit in the current block is obtained according to formula (3), where (x, y) is coordinates of the motion compensation subunit relative to the top-left sample of the current block, and W is a width of the current block.

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \tag{3}$$

The 6-parameter affine motion model is shown in the following formula (4):

$$\begin{cases} vx = a_1 + a_3 x + a_4 y \\ vy = a_2 + a_5 x + a_6 y \end{cases} \tag{4}$$

Figure 12B:
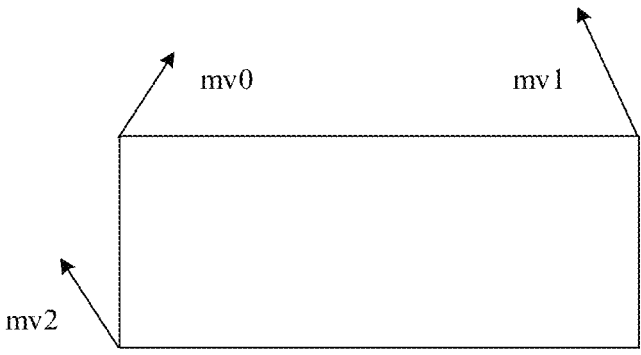
FIG. 12B is an example schematic diagram of motion information of three control points of a current affine picture block.

The 6-parameter affine motion model may be represented by using motion vectors of three pixels and coordinates of the three pixels relative to the top-left sample of a current block. If the top-left sample (0, 0), the top-right sample (W, 0), and the bottom-left sample (0, H) are used as control points (as shown in FIG. 12B), motion vectors of the top-left sample, top-right sample, and bottom-left sample control points of the current block are first respectively determined as (vx0,vy0), (vx1,vy1), and (vx2, vy2), and then motion information of each motion compensation subunit in the current block is obtained according to formula (5), where (x, y) is coordinates of the motion compensation subunit relative to the top-left sample of the current block, and W and H are respectively a width and a height of the current block.

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases} \tag{5}$$

The 8-parameter bilinear model is shown in the following formula (6):

$$\begin{cases} vx = a_1 + a_3 x + a_4 y + a_7 xy \\ vy = a_2 + a_5 x + a_6 y + a_8 xy \end{cases} \tag{6}$$

The 8-parameter bilinear model may be represented by using motion vectors of four pixels and coordinates of the four pixels relative to the top-left sample of a current coding block. If the top-left sample (0, 0), the top-right sample (W, 0), the bottom-left sample (0, H), and the bottom-right sample (W, H) are used as control points, motion vectors of the top-left sample, top-right sample, bottom-left sample, and bottom-right sample control points of the current coding block are first respectively determined as (vx0, vy0), (vx1, vy1), (vx2, vy2), and (vx3, vy3), and then motion information of each motion compensation subunit in the current coding block is derived based on the following formula (7), where (x, y) is coordinates of the motion compensation subunit relative to the top-left sample of the current coding block, and W and H are respectively a width and a height of the current coding block.

$$\begin{cases} v_x = \dfrac{v_{1x} - v_{0x}}{W}x + \dfrac{v_{2x} - v_{0x}}{H}y + \dfrac{v_{3x} + v_{0x} - v_{1x} - v_{2x}}{WH}y + v_{0x} \\ v_y = \dfrac{v_{1y} - v_{0y}}{W}x + \dfrac{v_{2y} - v_{0y}}{H}y + \dfrac{v_{3y} + v_{0y} - v_{1y} - v_{2y}}{WH}y + v_{0y} \end{cases} \tag{7}$$

A coding block (picture block) for which prediction is performed by using an affine motion model may be referred to as an affine coding block (affine picture block). It can be learned from the foregoing that the affine motion model is related to the motion information of the control point of the affine coding block.

Generally, motion information of a control point of an affine coding block may be obtained by using an affine motion model-based advanced motion vector prediction (AMVP) mode or an affine motion model-based merge mode. Further, motion information of a control point of a current coding block may be obtained by using an inherited control point motion vector prediction method or a constructed control point motion vector prediction method.

(3) Inherited control point motion vector prediction method: The inherited control point motion vector prediction method is to determine a candidate control point motion vector of a current block by using a motion model of an adjacent encoded affine coding block.

Figure 7:
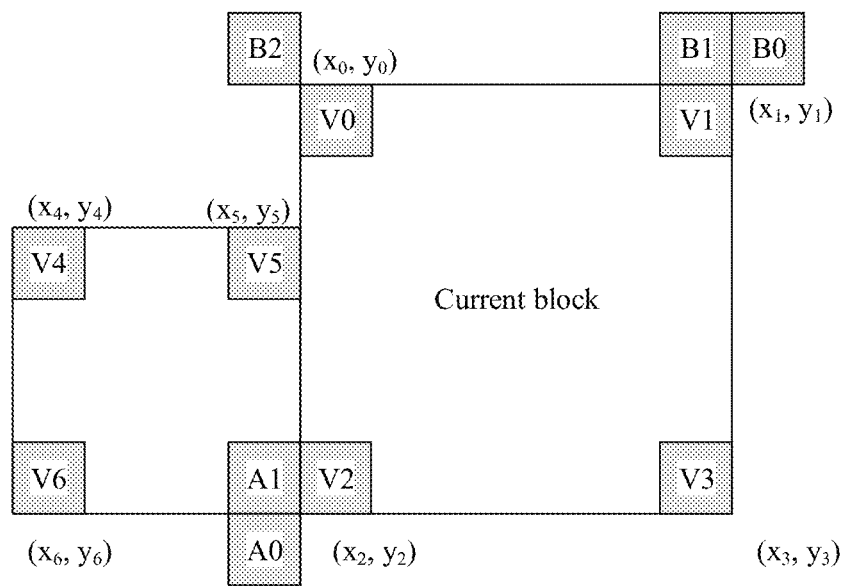
FIG. 7 is an example schematic diagram used to indicate obtaining of motion information of an affine model.

The current block shown in FIG. 6 is used as an example. Adjacent position blocks around the current block are traversed in a specified sequence, for example, A1→B1→B0→A0→B2, to find affine coding blocks (as shown in FIG. 7) in which the adjacent position blocks of the current block are located, so as to obtain control point motion information of the affine coding blocks, and further, a motion model constructed by using the control point motion information of the affine coding blocks is used to derive control point motion vectors of the current block to be used in the merge mode, or derive motion vector predictors of the control point to be used in the AMVP mode. A1→B1→B0→A0→B2 is merely an example, and a sequence of another combination is also applicable to the present invention. In addition, the adjacent position blocks are not limited to A1, B1, B0, A0, and B2.

The adjacent position block may be a pixel, a preset-size pixel block split based on a specific method, for example, may be a 4×4 pixel block, or may be a 4×2 pixel block, or may be a pixel block with another size, which is not limited. The affine coding block is an adjacent encoded block of the current block (or may be referred to as an adjacent affine coding block) that is predicted by using the affine motion model in a coding phase.

The following describes a process of determining a candidate control point motion vector of the current block by using A1 shown in FIG. 7 as an example, which is similar in other cases.

If a coding block in which A1 is located is a 4-parameter affine coding block (that is, the affine coding block is predicted by using the 4-parameter affine motion model), a motion vector (vx4, vy4) of the top-left sample (x4, y4) and a motion vector (vx5, vy5) of the top-right sample (x5, y5) of the affine coding block are obtained.

Then, a motion vector (vx0, vy0) of the top-left sample (x0, y0) of the current affine coding block is calculated by using the following formula (8):

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vy_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (8)$$

A motion vector (vx1, vy1) of the top-right sample (x1, y1) of the current affine coding block is calculated b using the following formula $$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vy_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases} \quad (9)$$

A combination of the motion vector (vx0, vy0) of the top-left sample (x0, y0) and the motion vector (vx1, vy1) of the top-right sample (x1, y1) of the current block that are obtained based on the affine coding block in which A1 is located is a candidate control point motion vector of the current block.

If a coding block in which A1 is located is a 6-parameter affine coding block (that is, the affine coding block is predicted by using the 6-parameter affine motion model), a motion vector (vx4, vy4) of the top-left sample (x4, y4), a motion vector (vx5, vy5) of the top-right sample (x5, y5), and a motion vector (vx6, vy6) of the bottom-left sample (x6, y6) of the affine coding block are obtained.

Then, a motion vector (vx0, vy0) of the top-left sample (x0, y0) of the current block is calculated by using the following formula (10):

$$\begin{cases} vx_0 = vx_4 + \dfrac{(vx_5 - vx_4)}{x_5 - x_4} \times (x_0 - x_4) + \dfrac{(vx_6 - vx_4)}{y_6 - y_4} \times (y_0 - y_4) \\ vy_0 = vy_4 + \dfrac{(vy_5 - vy_4)}{x_5 - x_4} \times (x_0 - x_4) + \dfrac{(vy_6 - vy_4)}{y_6 - y_4} \times (y_0 - y_4) \end{cases} \quad (10)$$

A motion vector (vx1, vy1) of the top-right sample (x1, y1) of the current block is calculated by using the following formula (11):

$$\begin{cases} vx_1 = vx_4 + \dfrac{(vx_5 - vx_4)}{x_5 - x_4} \times (x_1 - x_4) + \dfrac{(vx_6 - vx_4)}{y_6 - y_4} \times (y_1 - y_4) \\ vy_1 = vy_4 + \dfrac{(vy_5 - vy_4)}{x_5 - x_4} \times (x_1 - x_4) + \dfrac{(vy_6 - vy_4)}{y_6 - y_4} \times (y_1 - y_4) \end{cases} \quad (11)$$

A motion vector (vx2, vy2) of the bottom-left sample (x2, y2) of the current block is calculated by using the following formula (12):

$$\begin{cases} vx_2 = vx_4 + \dfrac{(vx_5 - vx_4)}{x_5 - x_4} \times (x_2 - x_4) + \dfrac{(vx_6 - vx_4)}{y_6 - y_4} \times (y_2 - y_4) \\ vy_2 = vy_4 + \dfrac{(vy_5 - vy_4)}{x_5 - x_4} \times (x_2 - x_4) + \dfrac{(vy_6 - vy_4)}{y_6 - y_4} \times (y_2 - y_4) \end{cases} \quad (12)$$

A combination of the motion vector (vx0, vy0) of the top-left sample (x0, y0) of the current block, the motion vector (vx1, vy1) of the top-right sample (x1, y1), and the motion vector (vx2, vy2) of the bottom-left sample (x2, y2) of the current block that are obtained based on the affine coding block in which A1 is located is a candidate control point motion vector of the current block.

It should be noted that another motion model, another candidate position, and another searching and traversal sequence may also be applied to the present invention, and details are not described in this embodiment of the present invention.

It should be noted that a method for representing motion models of adjacent and current coding blocks by using another control point may also be applied to the present invention, and details are not described herein.

(4) Constructed control point motion vectors prediction method 1: Constructed control point motion vectors prediction method of the affine motion model-based AMVP mode:

The constructed control point motion vector prediction method is to combine motion vectors of encoded blocks adjacent to control points of a current block as control point motion vectors of a current affine coding block, without needing to consider whether the adjacent encoded blocks are affine coding blocks. Based on different prediction modes (the affine motion model-based AMVP mode and the affine motion model-based merge mode), constructed control point motion vector prediction methods are different.

The following specifically describes the constructed control point motion vector prediction method of the affine motion model-based AMVP mode. The constructed control point motion vector prediction method is described by using an example shown in FIG. 8A, and motion vectors of the top-left sample and the top-right sample of a current block are determined by using motion information of encoded blocks adjacent to the current coding block. It should be noted that FIG. 8A is merely an example.

Figure 8A:
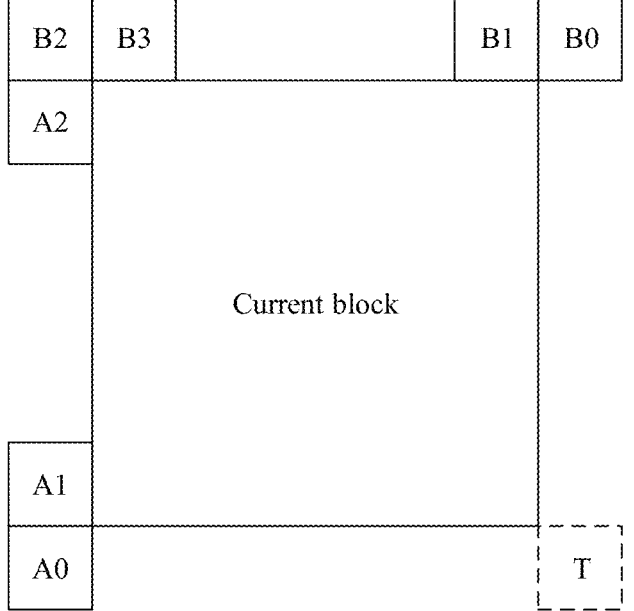
FIG. 8A and FIG. 8B are example schematic diagrams of a constructed control point motion vector prediction method.

As shown in FIG. 8A, in an embodiment (for example, the current block is predicted by using the 4-parameter affine motion model), motion vectors of encoded blocks A2, B2, and B3 adjacent to the top-left sample are used as candidate motion vectors of a motion vector of the top-left sample of the current block. Motion vectors of encoded blocks B1 and B0 adjacent to the top-right sample are used as candidate motion vectors of a motion vector of the top-right sample of the current block. The candidate motion vectors of the top-left sample and the top-right sample are combined to form a plurality of 2-tuples. Motion vectors of two encoded blocks included in the 2-tuple may be used as candidate control point motion vectors of the current block. Refer to the following formula (13A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\}, \{v_{B3}, v_{B0}\} \quad (13A)$$

where $v_{A2}$ represents the motion vector of A2, $v_{B1}$ represents the motion vector of B1, $v_{B0}$ represents the motion vector of B0, $v_{B2}$ represents the motion vector of B2, and $v_{B3}$ represents the motion vector of B3.

As shown in FIG. 8A, in another embodiment (for example, the current block is predicted by using the 6-parameter affine motion model), the motion vectors of the encoded blocks A2, B2, and B3 adjacent to the top-left sample are used as candidate motion vectors of the motion vector of the top-left sample of the current block. The motion vectors of the encoded blocks B1 and B0 adjacent to the top-right sample are used as candidate motion vectors of the motion vector of the top-right sample of the current block. Motion vectors of encoded blocks A0 and A1 adjacent to the bottom-left sample are used as candidate motion vectors of a motion vector of the bottom-left sample of the current block. The candidate motion vectors of the top-left sample, the top-right sample, and the bottom-left sample are combined to form a triplet. Motion vectors of three encoded blocks included in the triplet may be used as the candidate control point motion vectors of the current block, as shown in the following formulas (13B) and (13C):

$$\{v_{A2}, v_{B1}, v_{A0}\}, \{v_{A2}, v_{B0}, v_{A0}\}, \{v_{B2}, v_{B1}, v_{A0}\}, \quad (13B)$$

$$\{v_{B2}, v_{B0}, v_{A0}\}, \{v_{B3}, v_{B1}, v_{A0}\}, \{v_{B3}, v_{B0}, v_{A0}\}$$

$$\{v_{A2}, v_{B1}, v_{A1}\}, \{v_{A2}, v_{B0}, v_{A1}\}, \{v_{B2}, v_{B1}, v_{A1}\}, \quad (13C)$$

$$\{v_{B2}, v_{B0}, v_{A1}\}, \{v_{B3}, v_{B1}, v_{A1}\}, \{v_{B3}, v_{B0}, v_{A1}\}$$

where $v_{A2}$ represents the motion vector of A2, $v_{B1}$ represents the motion vector of B1, $v_{B0}$ represents the motion vector of B0, $v_{B2}$ represents the motion vector of B2, $v_{B3}$ represents the motion vector of B3, $v_{A0}$ represents the motion vector of A0, and $v_{A1}$ represents the motion vector of A1.

It should be noted that another method for combining control point motion vectors may also be applied to the present invention, and details are not described herein.

It should be noted that a method for representing motion models of adjacent and current coding blocks by using another control point may also be applied to the present invention, and details are not described herein.

Figure 8B:
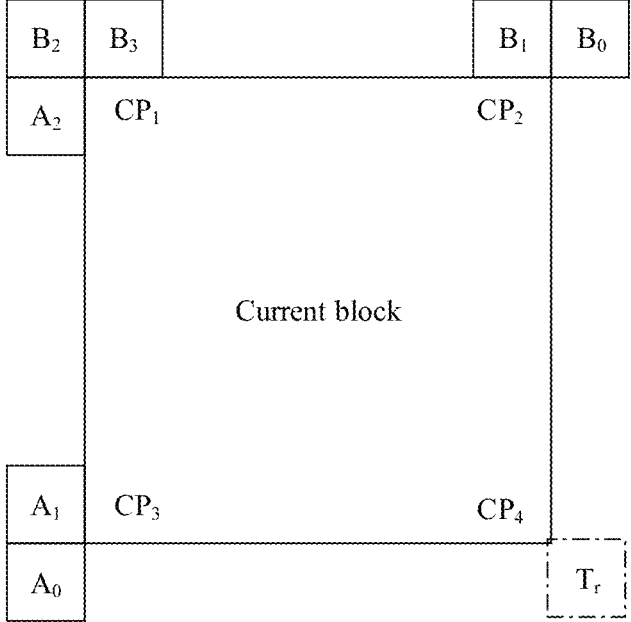

(5) Constructed control point motion vector prediction method 2: Constructed control point motion vector prediction method of the affine motion model-based merge mode:

The constructed control point motion vector prediction method is described by using an example shown in FIG. 8B, and motion vectors of the top-left sample and the top-right sample of a current block are determined by using motion information of encoded blocks adjacent to the current coding block. It should be noted that FIG. 8B is merely an example.

As shown in FIG. 8B, CPk (k=1, 2, 3, 4) represents a kth control point. A0, A1, A2, B0, B1, B2, and B3 are spatially adjacent positions of the current block, and are used to predict CP1, CP2, or CP3. T is a temporally adjacent position of the current block, and is used to predict CP4. It is assumed that coordinates of CP1, CP2, CP3, and CP4 are (0, 0), (W, 0), (H, 0), and (W, H), respectively, where W and H are a width and a height of the current block. Therefore, for each control point of the current block, motion information of each control point of the current block may be obtained in the following sequence:

1. For CP1, a check sequence is B2-A2-B3. If B2 can be obtained, motion information of B2 is used. Otherwise, A2 and B3 are to be checked. If motion information of the three positions cannot be obtained, motion information of CP1 cannot be obtained.

2. For CP2, a check sequence is B0-B1. If B0 can be obtained, CP2 uses motion information of B0. Otherwise, B1 is to be detected. If motion information of the two positions cannot be obtained, motion information of CP2 cannot be obtained.

3. For CP3, a check sequence is A0-A1.

4. For CP4, motion information of T is used.

Herein, that X can be obtained represents that a block including position X (X is A0, A1, A2, B0, B1, B2, B3 or T) is encoded and uses an inter prediction mode; otherwise, position X cannot be obtained. It should be noted that another method for obtaining control point motion information may also be applied to this embodiment of the present invention, and details are not described herein.

Then, the motion information of the control points of the current block is combined to obtain constructed control point motion information.

In an embodiment (for example, the current block is predicted by using the 4-parameter affine motion model), motion information of two control points of the current block is combined to form a 2-tuple to construct a 4-parameter affine motion model. A combination manner of the two control points may be {CP1, CP4},{CP2, CP3},{CP1, CP2}, {CP2, CP4}, {CP1, CP3}, or {CP3, CP4}. For example, a 4-parameter affine motion model constructed by using a 2-tuple of control points CP1 and CP2 may be denoted as Affine (CP1, CP2).

In another embodiment (for example, the current block is predicted by using the 6-parameter affine motion model), motion information of three control points of the current block is combined to form a triplet to construct a 6-parameter affine motion model. A combination manner of the three control points may be {CP1, CP2, CP4}, {CP1, CP2, CP3},{CP2, CP3, CP4}, or {CP1, CP3, CP4}. For example, a 6-parameter affine motion model constructed by using a triplet of control points CP1, CP2, and CP3 may be denoted as Affine (CP1, CP2, CP3).

In another embodiment (for example, the current block is predicted by using the 8-parameter bilinear model), motion information of four control points of the current block is combined to form a 4-tuple to construct an 8-parameter bilinear model. An 8-parameter bilinear model constructed by using a 4-tuple of control points CP1, CP2, CP3, and CP4 is denoted as Bilinear (CP1, CP2, CP3, CP4).

In this embodiment of the present invention, for ease of description, a combination of motion information of two control points (or two encoded blocks) is referred to as a 2-tuple, a combination of motion information of three control points (or three encoded blocks) is referred to as a triplet, and a combination of motion information of four control points (or four encoded blocks) is referred to as a 4-tuple.

These models are traversed in a preset sequence. If motion information of a control point corresponding to a combined model cannot be obtained, it is considered that the model cannot be obtained. Otherwise, a reference frame index of the model is determined, and a motion vector of the control point is scaled. If motion information of all control points after scaling is consistent, the model is invalid. If it is determined that motion information of control points that control the model can be obtained, and the model is valid, the motion information of the control points that construct the model are added to a motion information candidate list.

A method for scaling a control point motion vector is shown in formula (14):

$$MV_s = \frac{CurPoc - DecPoc}{CurPoc - SrcPoc} \times MV \qquad (14)$$

CurPoc represents a POC of a current frame, DesPoc represents a POC of a reference frame of a current block, SrcPoc represents a POC of a reference frame of a control point, $MV_s$ represents a motion vector obtained through scaling, and MV represents a control point motion vector.

In a possible embodiment, in a candidate list construction process, a construction apparatus (such as an encoder or decoder) determines whether reference frame indexes of all control points in an optional motion information combination are the same; and when the reference frame indexes of all the control points in the optional motion information combination are the same, the construction apparatus adds the optional motion information combination to the motion information candidate list. Compared with the foregoing method described in the embodiment shown in FIG. 8B, the construction apparatus does not perform motion vector determining and motion vector scaling on a control point in a combination, thereby resolving a problem of relatively high calculation complexity caused by motion vector scaling. That is, in this scenario, reference frame indexes of all control points in an optional motion information combination that meets a preset condition are the same.

In a possible embodiment, in a candidate list construction process, an construction apparatus (such as an encoder or decoder) determines whether reference frame indexes of all control points in an optional motion information combination are the same; when the reference frame indexes of all the control points in the optional motion information combination are the same, the construction apparatus determines whether optional motion vectors of all the control points in the optional motion information combination are the same; and if the optional motion vectors of all the control points in the optional motion information combination are different, the construction apparatus stores the optional motion information combination into the motion information candidate list. Compared with the foregoing method described in the embodiment shown in FIG. 8B, the construction apparatus does not perform motion vector scaling, thereby resolving a problem of relatively high calculation complexity caused by motion vector scaling. That is, in this scenario, reference frame indexes of all control points in an optional motion information combination that meets a preset condition are the same, and optional motion vectors of at least two control points are different.

In a possible embodiment, in a candidate list construction process, an optional motion information combination generated by a construction apparatus (such as an encoder or a decoder) may further include at least optional motion information of a first control point and optional motion information of a second control point, where the first control point and the second control point are adjacent control points of a current picture block. That is, the optional motion information combination cannot include only optional motion information of a diagonal control point of the current picture block.

It should be noted that in a specific embodiment of the present invention, a combination of different control points may also be converted into another control point combination.

For example, a 4-parameter affine motion model obtained by combining {CP1, CP4}, {CP2, CP3},{CP2, CP4}, {CP1, CP3}, and {CP3, CP4} is converted to be represented by{CP1, CP2} or {CP1, CP2, CP3}. A conversion method is as follows: Motion vectors of control points and coordinate information thereof are substituted into formula (2) to obtain a model parameter, and coordinate information of {CP1, CP2} is substituted into formula (3) to obtain motion vectors thereof.

More directly, conversion may be performed based on the following formulas (15) to (23), where W represents a width of the current block, H represents a height of the current block, in formulas (15) to (23), $(vx_0, vy_0)$ represents a motion vector of CP1, $(vx_1, vy_1)$ represents a motion vector of CP2, $(vx_2, vy_2)$ represents a motion vector of CP3, and $(vx_3, vy_3)$ represents a motion vector of CP4.

{CP1, CP2} may be converted into {CP1, CP2, CP3} by using the following formula (15), that is, the motion vector of CP3 in {CP1, CP2, CP3} may be determined by using formula (15):

$$\begin{cases} vx_2 = -\dfrac{vy_1 - vy_0}{W} H + vx_0 \\ vy_2 = +\dfrac{vx_1 - vx_0}{W} H + vy_0 \end{cases} \qquad (15)$$

{CP1, CP3} may be converted into {CP1, CP2} or {CP1, CP2, CP3} by using the following formula (16):

$$\begin{cases} vx_1 = +\dfrac{vy_2 - vy_0}{H} W + vx_0 \\ vy_1 = -\dfrac{vx_2 - vx_0}{H} W + vy_0 \end{cases} \qquad (16)$$

{CP2, CP3} may be converted into {CP1, CP2} or {CP1, CP2, CP3} by using the following formula (17):

$$\begin{cases} vx_0 = \dfrac{vx_2 - vx_1}{W*W + H*H}W*W - \dfrac{vy_2 - vy_1}{W*W + H*H}H*W + vx_1 \\ vy_0 = \dfrac{vy_2 - vy_1}{W*W + H*H}W*W + \dfrac{vx_2 - vx_1}{W*W + H*H}H*W + vy_1 \end{cases} \quad (17)$$

{CP1, CP4} may be converted into {CP1, CP2} or {CP1, CP2, CP3} by using the following formula (18) or (19):

$$\begin{cases} vx_1 = \dfrac{vx_3 - vx_0}{W*W + H*H}W*W + \dfrac{vy_3 - vy_0}{W*W + H*H}H*W + vx_0 \\ vy_1 = \dfrac{vy_3 - vy_0}{W*W + H*H}W*W - \dfrac{vx_3 - vx_0}{W*W + H*H}H*W + vy_0 \end{cases} \quad (18)$$

$$\begin{cases} vx_2 = \dfrac{vx_3 - vx_0}{W*W + H*H}H*H - \dfrac{vy_3 - vy_0}{W*W + H*H}H*W + vx_0 \\ vy_2 = \dfrac{vy_3 - vy_0}{W*W + H*H}W*H + \dfrac{vx_3 - vx_0}{W*W + H*H}H*H + vy_0 \end{cases} \quad (19)$$

{CP2, CP4} may be converted into {CP1, CP2} by using the following formula (20), and {CP2, CP4} may be converted into {CP1, CP2, CP3} by using formulas (20) and (21):

$$\begin{cases} vx_0 = -\dfrac{vy_3 - vy_1}{H}W + vx_1 \\ vy_0 = +\dfrac{vx_3 - vx_1}{H}W + vy_1 \end{cases} \quad (20)$$

$$\begin{cases} vx_2 = -\dfrac{vy_3 - vy_1}{H}W + vx_3 \\ vy_2 = +\dfrac{vx_3 - vx_1}{H}W + vy_3 \end{cases} \quad (21)$$

{CP3, CP4} may be converted into {CP1, CP2} by using the following formula (20), and {CP3, CP4} may be converted into {CP1, CP2, CP3} by using the following formulas (22) and (23):

$$\begin{cases} vx_0 = +\dfrac{vy_3 - vy_2}{W}H + vx_2 \\ vy_0 = -\dfrac{vx_3 - vx_2}{W}H + vy_2 \end{cases} \quad (22)$$

$$\begin{cases} vx_1 = +\dfrac{vy_3 - vy_2}{W}H + vx_3 \\ vy_1 = -\dfrac{vx_3 - vx_2}{W}H + vy_3 \end{cases} \quad (23)$$

For example, a 6-parameter affine motion model by combining {CP1, CP2, CP4}, {CP2, CP3, CP4}, and {CP1, CP3, CP4} is converted to be represented by control points {CP1, CP2, CP3}. A conversion method is as follows: Motion vectors of control points and coordinate information thereof are substituted into formula (4) to obtain a model parameter, and coordinate information of {CP1, CP2, CP3} is substituted into formula (5) to obtain motion vectors thereof.

More directly, conversion may be performed based on the following formulas (24) to (26), where W represents a width of the current block, H represents a height of the current block, in formulas (24) to (26), $(vx_0, vy_0)$ represents a motion vector of CP1, $(vx_1, vy_1)$ represents a motion vector of CP2, $(vx_2, vy_2)$ represents a motion vector of CP3, and $(vx_3, vy_3)$ represents a motion vector of CP4.

{CP1, CP2, CP4} may be converted into {CP1, CP2, CP3} by using formula (24):

$$\begin{cases} vx_2 = vx_3 + vx_0 - vx_1 \\ vy_2 = vy_3 + vy_0 - vy_1 \end{cases} \quad (24)$$

{CP2, CP3, CP4} may be converted into {CP1, CP2, CP3} by using formula (25):

$$\begin{cases} vx_0 = vx_1 + vx_2 - vx_3 \\ vy_0 = vy_1 + vy_2 - vy_3 \end{cases} \quad (25)$$

{CP1, CP3, CP4} may be converted into {CP1, CP2, CP3} by using formula (26):

$$\begin{cases} vx_1 = vx_3 + vx_0 - vx_2 \\ vy_1 = vy_3 + vy_0 - vy_2 \end{cases} \quad (26)$$

In a possible embodiment, after the currently constructed control point motion information is added to the candidate motion vector list, if a length of the candidate list is less than a maximum list length (for example, MaxAffineNumMrgCand) in this case, the combinations may be traversed in a preset sequence to obtain a valid combination as the candidate control point motion information; and if the candidate motion vector list is empty in this case, the candidate control point motion information is added to the candidate motion vector list. Otherwise, motion information in the candidate motion vector list is traversed in sequence, and whether motion information same as the candidate control point motion information exists in the candidate motion vector list is checked. If motion information same as the candidate control point motion information does not exist in the candidate motion vector list, the candidate control point motion information is added to the candidate motion vector list.

For example, a preset sequence is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4), that is, a total of 10 combinations. There may alternatively be five combinations, which is not limited in this application.

If control point motion information corresponding to a combination cannot be obtained, it is considered that the combination cannot be obtained. If a combination can be obtained, a reference frame index of the combination is determined (in a case of two control points, a smaller reference frame index is selected as the reference frame index of the combination; and in a case of more than two control points, a reference frame index with a largest quantity of occurrences is first selected, and if there are a plurality of reference frame indexes with a same quantity of occurrences, a smallest reference frame index is selected as the reference frame index of the combination), and control point motion vectors are scaled. If motion information of all control points after scaling is consistent, the combination is invalid.

(6) Advanced temporal motion vector prediction (advanced temporal motion vector prediction, ATMVP) method:

In inter prediction of HEVC, motion compensation is performed on all pixels in a coding unit (CU) by using same motion information, so as to obtain predictors of pixels in the CU. However, the pixels in the CU do not necessarily have a same motion feature. Predicting all the pixels in the CU by using the same motion information may reduce motion compensation accuracy. Using the ATMVP method helps improve motion compensation accuracy.

Figure 9:
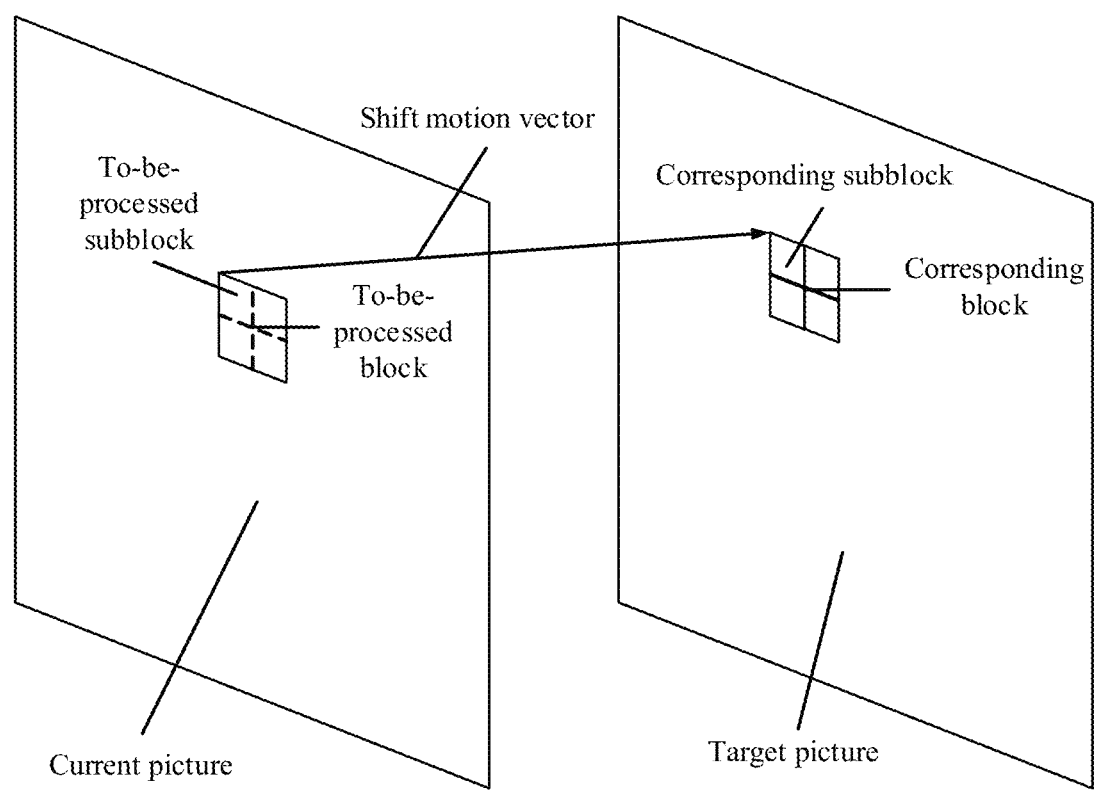
FIG. 9 is an example schematic diagram of an ATMVP technology.

FIG. 9 is used as an example. A process of performing inter prediction on a current picture by using an ATMVP technology mainly includes: determining a shift motion vector of a current to-be-processed block in a current coding picture; determining a corresponding subblock of a to-be-processed subblock from a corresponding reference picture (target picture) based on a position of the to-be-processed subblock in the current to-be-processed block and the shift motion vector; determining a motion vector of the current to-be-processed subblock based on a motion vector of the corresponding subblock; and performing motion compensation prediction on the to-be-processed subblock based on the motion vector of the to-be-processed subblock to obtain a relatively accurate predicted pixel value of the to-be-processed subblock. It may be understood that a relatively accurate predicted pixel value of the current to-be-processed block may be further obtained based on the foregoing process.

(7) PLANAR mode: A PLANAR method uses two linear filters in horizontal and vertical directions, and an average value of the two is used as a predicted pixel value of a current block. In this way, a predicted pixel value can change slowly, and subjective quality of a picture can be improved.

Figure 10:
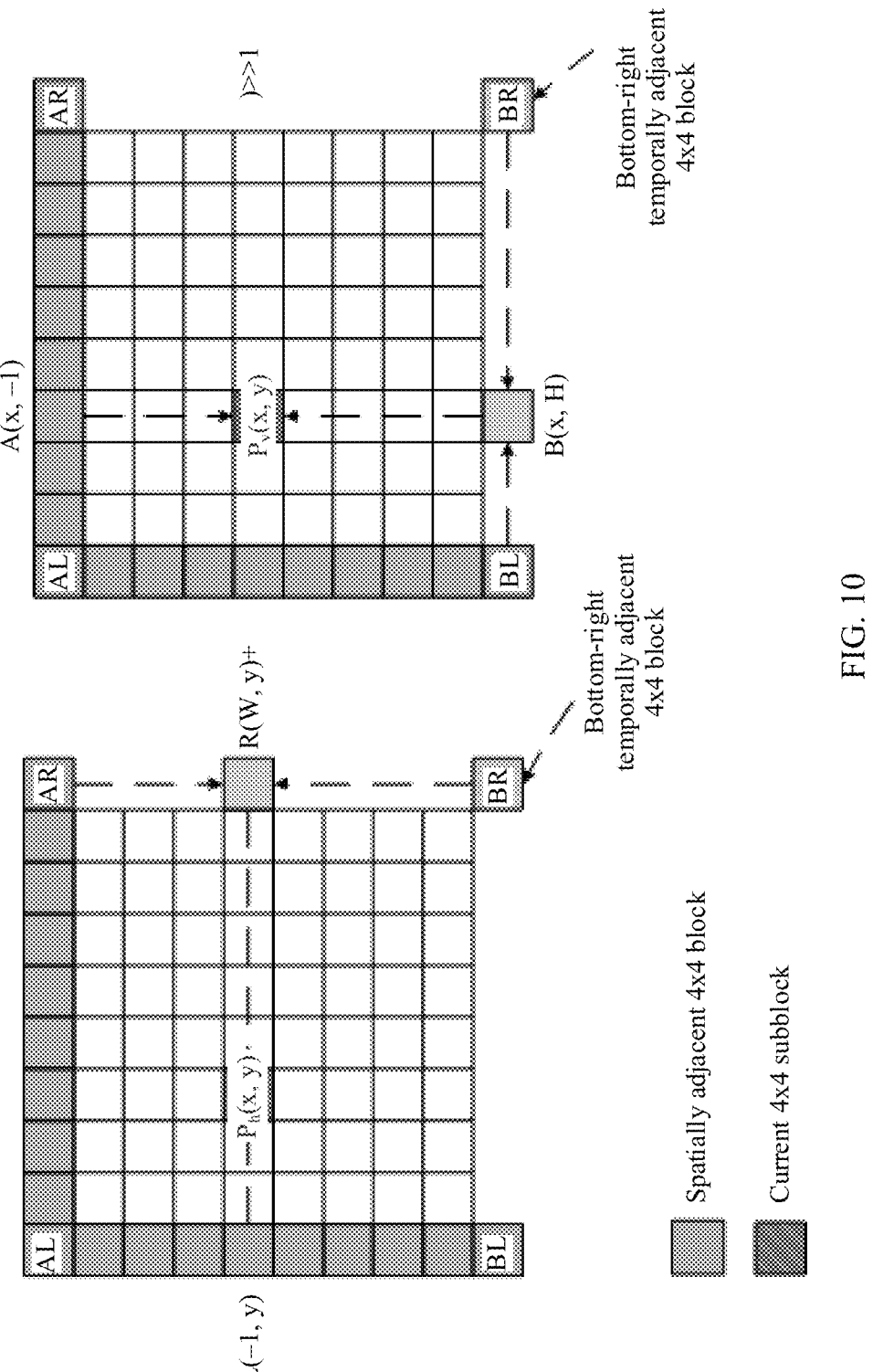
FIG. 10 is an example schematic diagram of a PLANAR (inter planar mode) technology.

FIG. 10 is used as an example. By using the PLANAR method, motion information of a top spatially adjacent position, a left spatially adjacent position, a right position, and a bottom position of each subblock (sub-coding unit) of a current block is obtained, and an average value of the motion information is obtained and is converted into motion information of each subblock of the current block.

Specifically, for a subblock whose coordinates are (x, y), a motion vector P(x, y) of the subblock may be calculated by using a horizontal interpolation motion vector $P_h$ (x, y) and a vertical interpolation motion vector $P_v$(x, y), as shown in formula (27):

$$P(x, y) = (H \times P_h(x, y) + W \times P_v(x, y) + H \times W)/(2 \times H \times W) \qquad (27)$$

The horizontal interpolation motion vector $P_h$ (x,y) and the vertical interpolation motion vector $P_v$(x, y) may be calculated by using motion vectors on the left, right, top and bottom sides of the current subblock, as shown in formulas (28) and (29):

$$P_h(x, y) = (W - 1 - x) \times L(-1, y) + (x + 1) \times R(W, y) \qquad (28)$$

$$P_v(x, y) = (H - 1 - y) \times A(x, -1) + (y + 1) \times B(x, H) \qquad (29)$$

L(−1,y) and R(W, y) represent the motion vectors in the left and right positions of the current subblock, and A(x, −1) and B(x, H) represent the motion vectors in the top and bottom positions of the current subblock.

The left motion vector L and the top motion vector A may be obtained from spatially adjacent blocks of the current coding block. Motion vectors L(−1,y) and A(x, −1) of coding blocks in preset positions (−1, y) and (x, −1) are obtained based on coordinates (x, y) of the subblock.

The right motion vector R(W, y) and the bottom motion vector B(x, H) are extracted by using the following method:

extracting temporal motion information BR in the bottom-right position of the current coding block; and performing weighted calculation by using an extracted motion vector AR in the top-right spatially adjacent position and the temporal motion information BR in the bottom-right position, to obtain the right motion vector R(W, y), as shown in the following formula (30):

$$R(W, y) = ((H - y - 1)AR + (y + 1)BR)/H \qquad (30)$$

performing weighted calculation by using an extracted motion vector BL in the bottom-left spatially adjacent position and the temporal motion information BR in the bottom-right position, to obtain the bottom motion vector B(x, H), as shown in the following formula (31):

$$B(x, H) = ((W - x - 1)BL + (x + 1)BR)/W \qquad (31)$$

All the motion vectors used in the above calculation are scaled to point to the first reference frame in a specific reference frame queue.

(8) Affine motion model-based advanced motion vector prediction mode (affine AMVP mode): For the affine AMVP mode, a candidate motion vector list of the affine motion model-based AMVP mode may be constructed by using the inherited control point motion vector prediction method and/or the constructed control point motion vector prediction method. In this embodiment of the present invention, the candidate motion vector list of the affine motion model-based AMVP mode may be referred to as a control point motion vector predictor candidate list, and control point motion vector predictors in the list include two (if a current block uses the 4-parameter affine motion model) candidate control point motion vectors or three (if a current block uses the 6-parameter affine motion model) candidate control point motion vectors.

In a possible application scenario, the control point motion vector predictor candidate list may be pruned and sorted according to a specific rule, and may be truncated or filled in to reach a specific quantity.

Then, on the encoder side, the encoder (such as the encoder 20) obtains a motion vector of each motion compensation subunit in a current coding block according to formula (3) or (5) or (7) and each control point motion vector predictor in the control point motion vector predictor candidate list, and further obtains a pixel value of a corresponding position in a reference frame to which the motion vector of each motion compensation subunit points, as a predictor of the motion compensation subunit, to perform motion compensation by using an affine motion model. An average value of differences between original values and predictors of all pixels in the current coding block is calculated, and a control point motion vector predictor corresponding to a minimum average value is selected as an optimal control point motion vector predictor, and is used as motion vector predictors of two or three or four control points in the current coding block. In addition, in a possible embodiment, motion searching is performed within a specific search range by using a control point motion vector predictor as a search start point to obtain control point motion vectors (CPMV), and a difference between the control point motion vector and the control point motion vector predictor (CPMVD) is calculated. Then, the encoder encodes an index number representing a position of the control point motion vector predictor in the control point motion vector predictor candidate list and the CPMVD into a bitstream and transfers the bitstream to the decoder side.

On the decoder side, the decoder (such as the decoder 30) obtains, through parsing, the index number and the control point motion vector difference (CPMVD) from the bitstream, determines the control point motion vector predictor (control point motion vectors predictor, CPMVP) from the control point motion vector predictor candidate list based on the index number, and adds the CPMVP to the CPMVD to obtain the control point motion vector.

(9) Affine motion model-based merge mode (affine merge mode): For the affine merge mode, a control point motion vector merge candidate list (control point motion vectors merge candidate list) may be constructed by using the inherited control point motion vector prediction method and/or the constructed control point motion vector prediction method.

In a possible application scenario, the control point motion vector merge candidate list may be pruned and sorted according to a specific rule, and may be truncated or filled in to reach a specific quantity.

On the encoder side, the encoder (such as the encoder 20) obtains a motion vector of each motion compensation subunit (a pixel or a pixel block with a size of $N_1 \times N_2$ that is obtained through division by using a specific method) in a current coding block according to formula (3) or (5) or (7) and each control point motion vector in the merge candidate list, so as to obtain a pixel value of a position in a reference frame to which the motion vector of each motion compensation subunit points; and uses the pixel value as a predictor of the motion compensation subunit to perform affine motion compensation. An average value of differences between original values and predictors of all pixels in the current coding block is calculated, and a control point motion vector corresponding to a minimum average value of the differences is selected as motion vectors of two or three or four control points in the current coding block. An index number indicating a position of the control point motion vector in the candidate list is encoded into a bitstream and sent to the decoder side.

On the decoder side, the decoder (such as the decoder 30) parses the index number, and determines the control point motion vector (CPMV) from the control point motion vector merge candidate list based on the index number.

(10) Subblock-based merge mode: With the subblock-based merge mode, candidate motion information obtained by using the ATMVP method and/or the PLANAR mode may be added to a candidate list based on (9). That is, a subblock-based merge candidate list may be constructed by using the inherited control point motion vector prediction method, and/or the constructed control point motion vector prediction method, and/or the ATMVP method, and/or the PLANAR method.

In a possible application scenario, the subblock-based merge candidate list may be pruned and sorted according to a specific rule, and may be truncated or filled in to reach a specific quantity.

On the encoder side, each piece of candidate motion information in the subblock-based merge candidate list is used, and if the candidate uses the ATMVP method or the PLANAR method, motion information of each subblock is obtained by using the method (6) or (7). If the candidate uses the affine motion mode, a motion vector of each motion compensation subunit (a subblock, a pixel, or a pixel block whose size is $N_1 \times N_2$ and split by using a specific method) in the current coding block is obtained by using formula (3)/(5)/(7) based on a motion vector of each control point, and a pixel value of a position in a reference frame to which the motion vector of each motion compensation subunit points is obtained as a predictor of the motion compensation subunit to perform affine motion compensation. An average value of differences between original values and predictors of all pixels in the current coding block is calculated, a candidate corresponding to a minimum average value of the differences is selected as motion information of the current coding block, and an index number representing a position of the candidate motion information in the candidate list is encoded into a bitstream and sent to the decoder.

On the decoder side, the index number is parsed, and the control point motion vector (CPMV) or the motion information of the subblock (in a case of using the ATMVP method or the PLANAR method) is determined from the control point motion vector merge candidate list based on the index number.

(11) Local illumination compensation (LIC) prediction:

A local illumination compensation technology is an inter prediction method for compensating for an illumination difference between a current block and a reference block. The LIC technology derives a predictor of the current block based on linear models of adjacent reconstructed pixels of the current block and adjacent reconstructed pixels of the reference block, which may be represented as formula (32):

$$pred_C(i, j) = \alpha * rec_C(i, j) + \beta \qquad (32)$$

where $\alpha$ and $\beta$ are linear model coefficients, $pred_c(i, j)$ is a predictor of a pixel in a position (i, j), and $rec_c(i, j)$ is a reconstructed value of the reference block; or $$pred'(x, y) = \alpha \cdot pred(x, y) + \beta \qquad (32)$$

where $pred'\_(x, y)$ is an updated predicted pixel value in a position (x, y) in the current block, $pred\_(x, y)$ is a predicted pixel value in the position (x, y) in the current block, and $\alpha$ and $\beta$ are linear model coefficients.

The linear model coefficients do not need to be encoded for transmission, but boundary pixels of adjacent reconstructed blocks of the current block and adjacent boundary pixels of the reference block are used to derive $\alpha$ and $\beta$. FIG. 18(a) and FIG. 18(b) are used as an example. A size of a current block is W×H. Adjacent pixels in FIG. 18(a) and FIG. 18(b) form a one-to-one correspondence, and a linear equation set is constructed by using the adjacent pixels in FIG. 18(a) and FIG. 18(b). A quantity of adjacent reference pixels is denoted as N, C(n) and R(n) are respectively an $N^{th}$ pixel value of adjacent reference pixels of the current block and an $N^{th}$ pixel value of adjacent reference pixels of the reference block, and the linear model coefficients are:

$$\alpha = \frac{N * \sum (C(n) * R(n)) - \sum C(n) * \sum R(n)}{N * \sum (R(n) * R(n)) - \sum R(n) * \sum R(n)} \qquad (32\text{-}1)$$

-continued $$\beta = \frac{\sum C(n) - \alpha * \sum R(n)}{N} \qquad (32\text{-}2)$$

(12) History-based motion vector prediction (HMVP):

After a merge candidate list is constructed by using the spatial MVP and ATMVP methods, an HMVP merge candidate is added to the merge candidate list. A history-based candidate list includes history-based candidates, where the history-based candidate is motion information of a previous coding block.

In the JVET-K0104 proposal, the history-based candidate list is constructed by using motion information of an encoded block in a current frame, and the history-based candidate list is accessed in a first-in first-out manner. A general manner of constructing and using a history-based candidate list on the encoder/decoder side is as follows:

Step 1: Initialize the history-based candidate list at the beginning of slice (SLICE/tile group) decoding, and clear the history-based candidate list.

Step 2: Decode a current CU, if the current CU or a current block uses a merge or inter prediction mode, generate a merge candidate motion information list or a motion vector predictor candidate list, and add a history-based candidate in the history-based candidate list to the merge candidate motion information list or the motion vector predictor candidate list.

Figure 16:
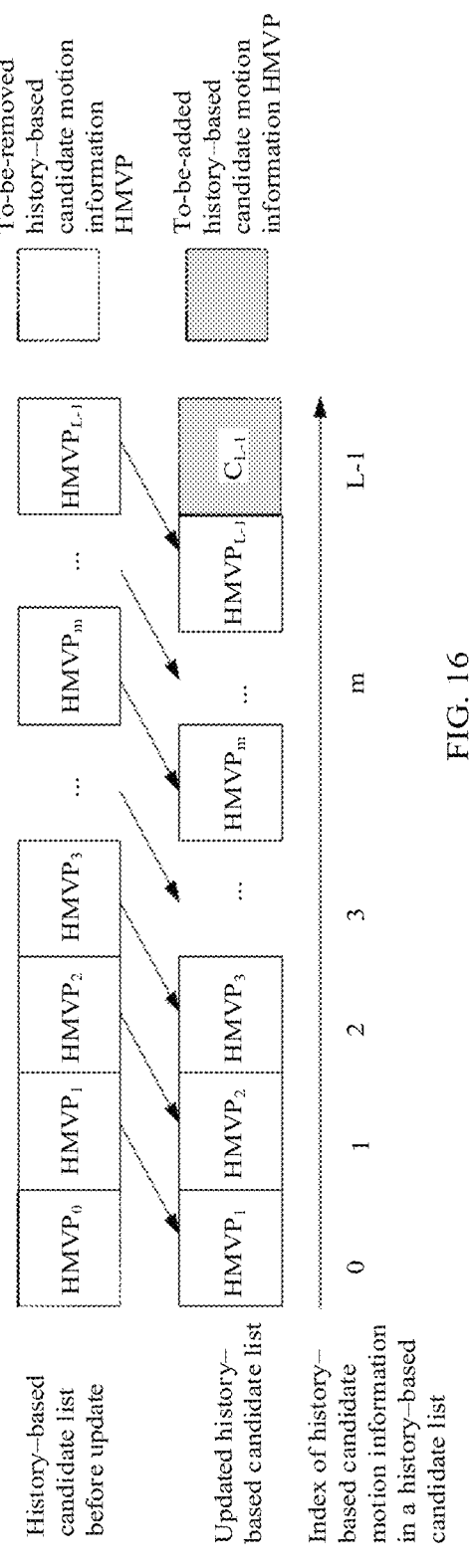
FIG. 16 and FIG. 17 are example schematic diagrams of an HMVP list.
Figure 17:
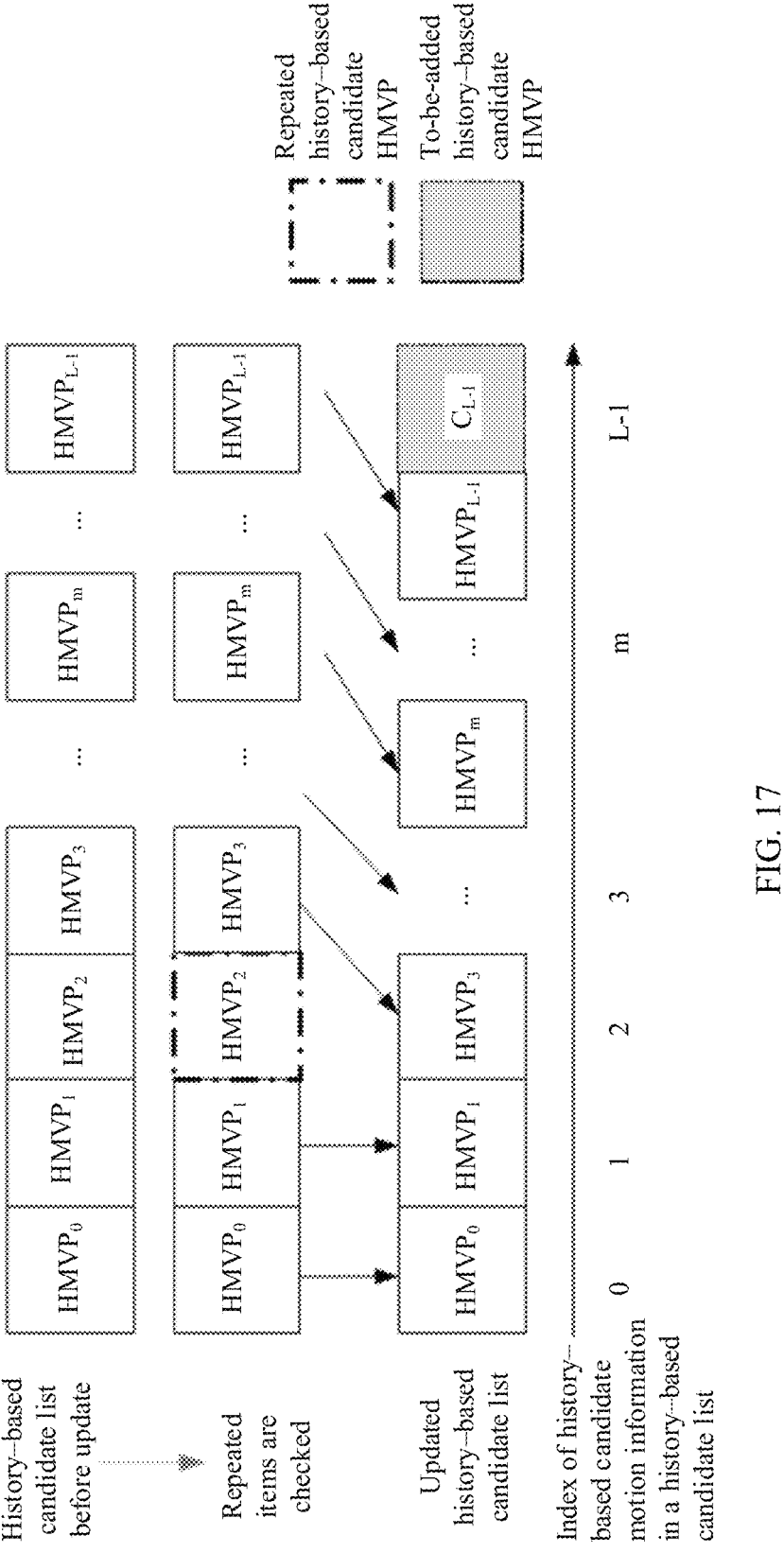

Step 3: After the current CU or the current block is decoded, add motion information of the current block to the history-based candidate list as a new history-based candidate, and update the history-based candidate list, as shown in FIG. 16 and FIG. 17. First, starting from the header of the history-based candidate list, the motion information of the current block is compared with the history-based candidate in the history-based candidate list. If a history-based candidate (for example, HMVP$_2$ in FIG. 16 and FIG. 17) is the same as the motion information of the current block, the history-based candidate HMVP$_2$ is removed. Then, a size of the history-based candidate list is checked. If the size of the list exceeds a preset size, a history-based candidate in the header of the list is removed. Finally, the motion information of the current block is added to the end of the history-based candidate list.

In some implementations, methods for deriving the linear model coefficient may alternatively be the following methods, which are not specifically limited.

Method 1: A method for deriving the linear model coefficient is shown in formula (32-3). $x_A$ represents a minimum value of pixels in an adjacent pixel set K of a reference block, and $x_8$ represents a maximum value of the pixels in the adjacent pixel set K of the reference block. $y_A$ and $y_B$ each respectively represent a minimum value and a maximum value of adjacent pixels of a current block, as shown in FIG. 19.

The adjacent pixel set K is a universal set or a subset of all adjacent pixels of the current block or the reference block.

The reference block may be one or more reference blocks. For example, if the current block is a unidirectional prediction block, the current block corresponds to one reference block, and if the current block is a bidirectional prediction block, the current block may correspond to a plurality of reference blocks.

$$\alpha = \frac{y_B - y_A}{x_B - x_A} \qquad (32\text{-}3)$$

-continued $$\beta = y_A - \alpha x_A$$

The linear model coefficients are substituted into formula pred' (x, y)=α·pred(x, y)+β to obtain a pixel value after LIC prediction, where pred(x, y) represents an original predicted value or prediction block sample obtained through inter prediction or motion compensation, and pred'(x, y) represents an updated predicted value or prediction block sample.

Method 2: A method for deriving the linear model coefficient is shown in formula (32-4). $x_A$ represents a secondary minimum value of pixels in an adjacent pixel set K of a reference block (after a minimum value is removed, a minimum value of the remaining pixel set is the secondary minimum value), and $x_8$ represents a secondary maximum value of the pixels in the adjacent pixel set K of the reference block (after a maximum value is removed, a maximum value of the remaining pixel set is the secondary maximum value). The reference block may be one or more reference blocks. For example, if the current block is a unidirectional prediction block, the current block corresponds to one reference block, and if the current block is a bidirectional prediction block, the current block may correspond to a plurality of reference blocks. $y_A$ and $y_B$ respectively represent a secondary minimum value and a secondary maximum value of adjacent pixels of the current block.

$$\alpha = \frac{y_B - y_A}{x_B - x_A} \qquad (32\text{-}4)$$

$$\beta = y_A - \alpha x_A$$

The following describes in detail the inter prediction method in the affine motion model-based AMVP mode and the inter prediction method in the affine motion model-based merge mode in this application.

On a decoder side, in the AMVP mode, a bitstream is directly parsed to obtain an LIC_flag; and in the merge mode, a candidate motion information list or a history-based candidate list (HMVP list) needs to be constructed, corresponding motion information and the LIC_flag are obtained from the list based on a candidate index (for example, a merge index or an HMVP index), and it is determined, based on a value of the LIC_flag, whether a current block needs to use LIC prediction.

In affine motion prediction, when LIC prediction is allowed for use, candidate motion information of each control point of the current block is obtained by using the inherited control point motion vector prediction method or the constructed control point motion vector prediction method, and an LIC_flag corresponding to each control point is obtained and stored for subsequent motion compensation and prediction. The obtained candidate motion information is further used in another subsequent decoding procedure, such as motion vector prediction in a decoding process of an adjacent block.

For the inherited control point motion vector prediction method, values of LIC_flags corresponding to all control points of a current to-be-processed picture block come from a same picture block. Therefore, the LIC_flags corresponding to the control points are consistent. Alternatively, values of LIC_flags corresponding to all control points of an adjacent picture block (for example, an adjacent encoded block or decoded block) of a current to-be-processed picture block come from a same coding unit. Therefore, the LIC- _flags corresponding to the control points are consistent. However, in the constructed (constructed) control point motion vector prediction method in the affine merge mode, LIC_flags of control points of a current to-be-processed picture block come from different picture blocks. Therefore, when a candidate motion information list of control points is constructed, LIC_flags of a plurality of control points may be different, and values of LIC_flags written into the candidate motion information list cannot be determined. For example, if an affine motion model used by a current affine decoding block is a 4-affine motion model, LIC_flags of subblocks in the top-left corner and the top-right corner are set to LIC_flags of control points of the top-left and top-right samples, and the top-left and top-right subblocks are respectively subblocks of different picture blocks (for example, coding units). If the LIC_flag of the top-left subblock is 0, and the LIC_flag of the top-right subblock is 1, it cannot be determined whether the LIC_flag of the current to-be-processed picture block is 0 or 1, thereby affecting an entire coding process.

To resolve the foregoing problem, it is ensured that when an affine coding block is allowed to use LIC prediction, a coding process is normally performed, and coding efficiency and accuracy are improved. The following specifically describes some implementations of determining the LIC_flag of the current to-be-processed picture block based on the constructed control point motion vector prediction method. Motion vectors of a plurality of control points of the current to-be-processed picture block are separately obtained based on motion vectors of a plurality of processed picture blocks (a plurality of adjacent encoded blocks for the encoder side; and a plurality of adjacent decoded blocks for the decoder side).

It should be understood that, in an implementation of this application, the determining the LIC_flag of the current to-be-processed picture block based on the constructed control point motion vector prediction method may also be understood as how to determine the value of the LIC_flag in the candidate motion information list.

In some possible implementations, a preset LIC_flag may be used as the LIC_flag of the current to-be-processed picture block, for example, a value of the preset LIC_flag is 0.

In a possible implementation, the LIC_flag of the current block is determined based on an LIC_flag of an adjacent block of the current to-be-processed picture block. For example, when at least one LIC_flag in the adjacent block is 1, the LIC_flag of the current block is 1.

In some possible implementations, LIC_flags of a plurality of control points of the to-be-processed picture block may be obtained; in the constructed control point motion vector prediction method, the LIC_flags of the plurality of control points are respectively LIC_flags of adjacent (spatially and/or temporally adjacent) processed picture blocks corresponding to the control points; then, the LIC_flag of the current to-be-processed picture block is determined based on the LIC_flags of the plurality of control points. The control points CP1, CP2, CP3, and CP4 described in the "constructed control point motion vector (constructed control point motion vectors) prediction method 2" are used as an example for description, where the control point CP4 is obtained from a temporally adjacent position of the current block, for example, a position T.

First, a method for determining a value of an LIC_flag of CP4 is as follows:

Method 1: Determine the LIC_flag of CP4 as a preset value, for example, 0 or 1.

Method 2: If a value of an LIC_flag can be obtained in the position T, the value of the LIC_flag in the position T is the value of the LIC_flag of CP4. Otherwise, the value is set to a preset value.

Method 3: If a value of an LIC_flag can be obtained in the position T, the following method is used to determine the value of the LIC_flag of CP4:

If a picture type of the current block is a P frame or a P slice, the value of the LIC_flag of CP4 is the value of the LIC_flag in the position T; or if a picture type of the current block is a B frame or B slice, and a value of one LIC_flag in first direction motion information (for example, motion information corresponding to list0) and second direction motion information (for example, motion information corresponding to list1) of the current block is 1, the value of the LIC_flag of CP4 is 1; otherwise, the value of the LIC_flag is 0.

Otherwise, (if the value of the LIC_flag cannot be obtained in the position T), it is determined that the value of the LIC_flag of CP4 is 0.

In addition, embodiments in which the LIC_flag of the current block is determined based on the values of the LIC_flags of the plurality of control points are as follows:

Embodiment 1

If a value of an LIC_flag of at least one control point in the plurality of control points is 1, it is determined that the value of the LIC_flag of the current block is 1. Otherwise, the value of the LIC_flag is 0.

For example, the current to-be-processed picture block has three control points, candidate motion information of the three control points is obtained by respectively using motion information of adjacent encoded blocks A, B, and C, and values of LIC_flags of the adjacent encoded blocks A, B, and C are respectively flag1, flag2, and flag3. If a value of at least one of flag1, flag2, and flag3 is 1, it is determined that the value of the LIC_flag of the current block is 1.

Embodiment 2

If a quantity of control points whose LIC_flags are a first value is greater than a quantity of control points whose LIC_flags are a second value in the plurality of control points, the value of the LIC_flag of the current block is the first value; otherwise, the LIC_flag is the second value.

In a possible implementation, the foregoing methods may be further used to determine a value of an LIC_flag in an HMVP list. After the current block is decoded, an HMVP candidate including the value of the LIC_flag of the current block is added to the HMVP list.

In a possible implementation, in the affine motion model-based merge mode, if a motion vector of each subblock of the current block is directly derived by using a model of an adjacent affine block, the value of the LIC_flag of the current block may also be obtained by using the adjacent affine block. For example, the value of the LIC_flag of the current block is the same as a value of an LIC_flag of the adjacent affine block.

Figure 12C:
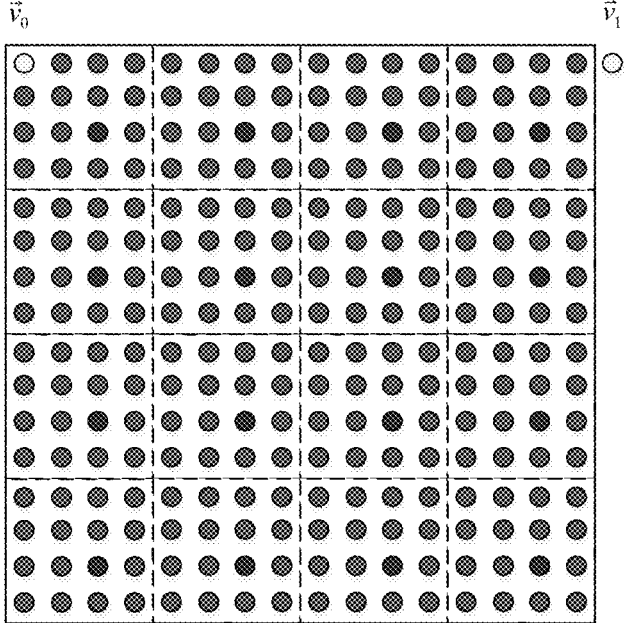
FIG. 12C is an example schematic diagram of a basic motion compensation unit (subblock) of a current affine picture block.
Figure 12D:
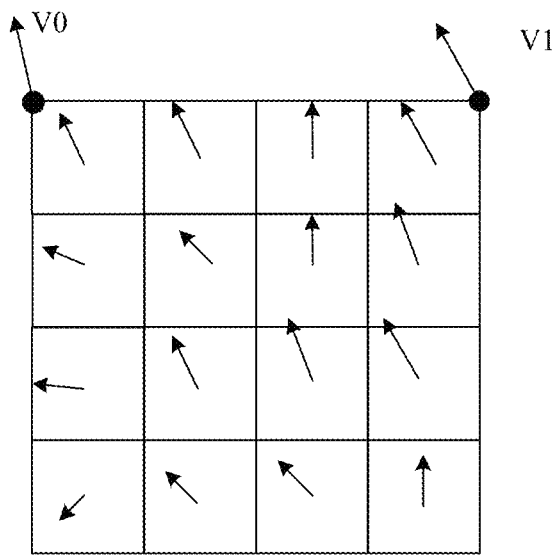
FIG. 12D is an example schematic diagram of a motion vector of a basic motion compensation unit (subblock) of a current affine picture block.
Figure 12E:
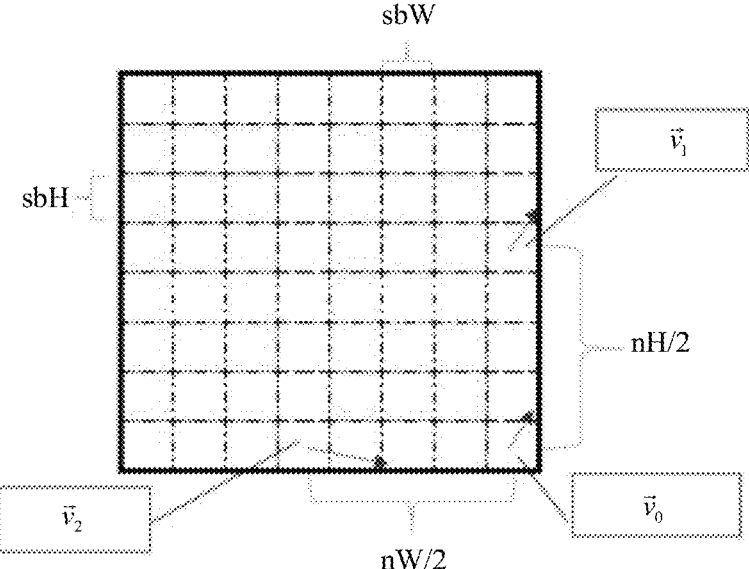
FIG. 12E is an example schematic diagram of deriving an affine model by using MVs of subblocks located in the bottom-right, the bottom-middle, and the right-middle of an adjacent affine picture block.

As shown in FIG. 12E, in a possible implementation, in the affine motion model-based merge mode, when an affine model is derived by using MVs of subblocks located in the bottom-right, bottom-middle, and right-middle of the adjacent affine block for inheritance, the value of the LIC_flag of the current block may be derived based on the value of the LIC_flag of the adjacent affine block. For example, the value of the LIC_flag of the current block is the same as a value of an LIC_flag of the adjacent affine block.

In a possible implementation, the value of the LIC_flag of the current block is derived based on an adjacent block in a preset position, where the adjacent block in the preset position may be one or more of A0, A1, A2, B0, B1, B2, and B3 described in FIG. 8A. For example, specific derivation methods are as follows:

1. If a value of an LIC_flag in at least one position of the preset position is 1, it is determined that the value of the LIC_flag of the current block is 1. Otherwise, the value of the LIC_flag is 0.

2. If a quantity of control points whose LIC_flags are a first value (for example, 1) is greater than a quantity of control points whose LIC_flags are a second value in the preset position, the value of the LIC_flag of the current block is the first value (for example, 1); otherwise, the LIC_flag is the second value (for example, 0).

3. If a quantity of control points whose LIC_flags are a first value (for example, 1) is greater than a quantity of control points whose LIC_flags are a second value in the preset position, the value of the LIC_flag of the current block is the first value (for example, 1); otherwise, if an LIC_flag in at least one position is 1, the value of the LIC_flag is the first value; otherwise, the LIC_flag is the second value (for example, 0).

It should be further noted that, based on the foregoing technical idea, another similar solution may be used for implementation. In addition, in a specific application scenario, one or more of the foregoing solutions may be implemented comprehensively.

It may be learned that, when LIC_flags of control points of the current affine picture block are different, by implementing the foregoing solutions in this embodiment of the present invention, an LIC_flag corresponding to candidate motion information of each control point can be quickly determined, so as to ensure that a local illumination compensation coding process of the affine coding block is normally performed, and coding efficiency and accuracy are improved.

In this embodiment of the present invention, the encoder side may use a syntax element to indicate an inter prediction mode and other related information of the current block to the decoder side.

Currently, for a partial syntax structure that is usually used to parse the inter prediction mode used by the current block, refer to Table 1 for example. It should be noted that the syntax element in the syntax structure may alternatively be represented by using another flag, which is not specifically limited in the present invention.

TABLE 1

| coding_unit(x0, y0, cbWidth, cbHeight, treeType) { | Descriptor |
|---|---|
| if(slice_type != I) { | |
|   cu_skip_flag[x0][y0] | ae(v) |
|   if(cu_skip_flag[x0][y0] = = 0) | |
|     pred_mode_flag | ae(v) |
| } | |
| if(CuPredMode[x0][y0] = = MODE_INTRA) { | |
|   if(treeType = = SINGLE_TREE \| \| treeType = = DUAL_TREE_LUMA) { | |
|     intra_luma_mpm_flag[x0][y0] | ae(v) |
|     if( intra_luma_mpm_flag[x0][y0] ) | |
|      intra_luma_mpm_idx[x0][y0] | ae(v) |
|     else | |
|      intra_luma_mpm_remainder[x0][y0] | ae(v) |
|   } | |
|   if(treeType = = SINGLE_TREE \| \| treeType = = DUAL_TREE_CHROMA) | |
|     intra_chroma_pred_mode[x0][y0] | ae(v) |
| } else { /* MODE_INTER */ | |
|   if(cu_skip_flag[x0][y0]) { | |
|     if(MaxNumSubblockMergeCand > 0 && cbWidth >= 8 && cbHeight >= 8) | |
|      merge_subblock_flag[x0][y0] | ae(v) |
|     if(merge_subblock_flag[x0][y0] = = 0 && MaxNumMergeCand > 1) | |
|      merge_idx[x0][y0] | ae(v) |
|     if(merge_subblock_flag[x0][y0] = = 1 && MaxNumSubblockMergeCand > 1) | |
|      merge_subblock_idx[x0][y0] | ae(v) |
|   } else { | |
|     merge_flag[x0][y0] | ae(v) |
|     if(merge_flag[x0][y0]) { | |
|      if((sps_affine_enabled_flag \| \| sps_sbtmvp_enabled_flag) && cbWidth >= 8 && cbHeight >= 8) | |
|       merge_subblock_flag[x0][y0] | ae(v) |
|      if(merge_subblock_flag[x0][y0] = = 0 && MaxNumMergeCand > 1) | |
|       merge_idx[x0][y0] | ae(v) |
|      if(merge_subblock_flag[x0][y0] = =1) | |
|       merge_subblock_idx[x0][y0] | ae(v) |
|     } else { | |
|      if(slice_type = = B ) | |
|       inter_pred_idc[x0][y0] | ae(v) |
|      if(sps_affine_enabled _flag && cbWidth >= 16 && cbHeight >= 16) { | |
|       inter_affine_flag[x0][y0] | ae(v) |
|       if(sps_affine_type_flag && inter_affine_flag[x0][y0]) | |
|        cu_affine_type_flag[x0][y0] | ae(v) |
|      } | |
|      if(inter_pred_idc[x0][y0] != PRED_L1) { | |
|       if(num_ref_idx_l0_active_minus1 > 0) | |

TABLE 1-continued

| coding_unit(x0, y0, cbWidth, cbHeight, treeType) { | Descriptor |
|---|---|
| ref_idx_l0[x0][y0] | ae(v) |
| mvd_coding(x0, y0, 0, 0) | |
| if(MotionModelIdc[x0][y0] > 0) | |
| mvd_coding(x0, y0, 0, 1) | |
| if(MotionModelIdc[x0][y0] > 1) | |
| mvd_coding(x0, y0, 0, 2) | |
| mvp_l0_flag[x0][y0] | ae(v) |
| } else { | |
| MvdL0[x0][y0][0] = 0 | |
| MvdL0[x0][y0][1] = 0 | |
| } | |
| if(inter_pred_idc[x0][y0] != PRED_L0) { | |
| if( num_ref_idx l1_active_minus1 > 0) | |
| ref_idx_l1[x0][y0] | ae(v) |
| if(mvd_l1_zero flag && inter_pred_idc[x0][y0] = = PRED_BI) { | |
| MvdL1[x0][y0][0] = 0 | |
| MvdL1[x0][y0][1] = 0 | |
| MvdCpL1[x0][y0][0][0] = 0 | |
| MvdCpL1[x0][y0][0][1] = 0 | |
| MvdCpL1[x0][y0][1][0] = 0 | |
| MvdCpL1[x0][y0][1][1] = 0 | |
| MvdCpL1[x0][y0][2][0] = 0 | |
| MvdCpL1[x0][y0][2][1] = 0 | |
| } else { | |
| mvd_coding(x0, y0, 1, 0) | |
| if(MotionModelIdc[x0][y0] > 0) | |
| mvd_coding(x0, y0, 1, 1) | |
| if(MotionModelIdc[x0][y0] > 1) | |
| mvd_coding(x0, y0, 1, 2) | |
| mvp_l1_flag[x0][y0] | ae(v) |
| } else { | |
| MvdL1[x0][y0][0] = 0 | |
| MvdL1[x0][y0][1] = 0 | |
| } | |
| if(sps_amvr_enabled_flag && inter_affine_flag = = 0 && | |
| (MvdL0[x0][y0][0] != 0 \| \| MvdL0[x0][y0][1] != 0 \| \| | |
| MvdL1[x0][y0][0] != 0 \| \| MvdL1[x0][y0][1] != 0)) | |
| amvr_mode[x0][y0] | ae(v) |
| } | |
| } | |
| } | |
| if(CuPredMode[x0][y0] != MODE_INTRA && cu_skip flag[x0][y0] = = 0) | |
| cu_cbf | ae(v) |
| if(cu_cbf) { | |
| transform_tree(x0, y0, cbWidth, cbHeight, treeType) | |
| } | |

In Table 1, ae(v) represents a syntax element that is encoded by using context-based adaptive binary arithmetic coding (context-based adaptive binary arithmetic coding, cabac).

A syntax element merge_flag[x0][y0] may be used to indicate whether a merge mode is to be used for a current block. For example, when merge_flag[x0][y0]=1, it indicates that the merge mode is to be used for the current block, and when merge_flag[x0][y0]=0, it indicates that the merge mode is not to be used for the current block. x0, y0 represent coordinates of the current block in a video picture.

A syntax element merge_subblock_flag[x0][y0] may be used to indicate whether a subblock-based merge mode is to be used for the current block. A type (slice_type) of a slice in which the current block is located is a P type or a B type. For example, when merge_subblock_flag[x0][y0]=1, it indicates that the subblock-based merge mode is to be used for the current block, and when merge_subblock_lag[x0][y0]=0, it indicates that the subblock-based merge mode is not to be used for the current block, and a translational motion model-based merge mode may be used.

A syntax element merge_idx[x0][y0] may be used to indicate an index value for a merge candidate list.

A syntax element merge_subblock_idx[x0][y0] may be used to indicate an index value for a subblock-based merge candidate list.

A syntax element inter_affine_flag[x0][y0] may be used to indicate whether the affine motion model-based AMVP mode is to be used for the current block when the slice in which the current block is located is a P-type slice or a B-type slice.

A syntax element cu_affine_type_flag[x0][y0] may be used to indicate whether motion compensation is applied to the current block by using a 6-parameter affine motion model when the slice in which the current block is located is a P-type slice or a B-type slice. When cu_affine_type_flag [x0][y0]=0, it indicates that motion compensation is not applied to the current block by using the 6-parameter affine motion model, and motion compensation may be performed by using only a 4-parameter affine motion model. When cu_affine_type_flag[x0][y0]=1, it indicates that motion compensation is applied to the current block by using the 6-parameter affine motion model.

Referring to Table 2, when MotionModelIdc[x0][y0]=1, it indicates that the 4-parameter affine motion model is to be used, when MotionModelIdc[x0][y0]=2, it indicates that the 6-parameter affine motion model is to be used, and when MotionModelIdc[x0][y0]=0, it indicates that the translational motion model is to be used.

TABLE 2

| MotionModelIdc[x0][y0] | motion model for motion compensation (motion model for motion compensation) |
|---|---|
| 0 | translational motion (translational motion) |
| 1 | 4-parameter affine motion (4-parameter affine motion) |
| 2 | 6-parameter affine motion (6-parameter affine motion) |

In addition, in Table 1, variables MaxNumMergeCand and MaxNumSubblockMergeCand are used to indicate a maximum list length and indicate a maximum length of a constructed candidate motion vector list. inter_pred_idc[x0][y0] is used to indicate a prediction direction. PRED_L1 is used to indicate backward prediction. num_ref_idx_l0_active_minus1 indicates a quantity of reference frames in a forward reference frame list, and ref_idx_l0[x0][y0] indicates a forward reference frame index value of the current block. mvd_coding(x0, y0, 0, 0) indicates the first motion vector difference. mvp_l0_flag[x0][y0] indicates an index value of a forward MVP candidate list. PRED_L0 indicates forward prediction. num_ref_idx_l1_active_minus1 indicates a quantity of reference frames in a backward reference frame list. ref_idx_l1[x0][y0] indicates a backward reference frame index value of the current block, and mvp_l1_flag[x0][y0] indicates an index value of a backward MVP candidate list.

Based on the foregoing description, the following further describes the inter prediction method provided in the embodiment of the present invention, which is described from a perspective of a decoder side. Referring to FIG. 11A, the method includes but is not limited to the following steps:

S601. Parse a bitstream to determine an inter prediction mode of a current to-be-processed picture block (or referred to as a current decoding block or referred to as a current block).

For example, the bitstream may be parsed based on the syntax structure shown in Table 1, so as to determine the inter prediction mode of the current block.

If it is determined that the inter prediction mode of the current block is an affine motion model-based AMVP mode, that is, the syntax elements merge_flag=0 and affine_inter_flag=1, it indicates that the inter prediction mode of the current block is the affine motion model-based AMVP mode, and S602a-S608a are subsequently performed.

If it is determined that the inter prediction mode of the current block is an affine motion model-based merge mode, that is, the syntax elements merge_flag=1 and affine_merge_flag=1, it indicates that the inter prediction mode of the current block is the affine motion model-based merge mode, and S602b-S606b are subsequently performed.

S602a. Construct a candidate motion information list corresponding to the affine motion model-based AMVP mode (affine AMVP mode).

In this embodiment of the present invention, a candidate control point motion vector predictor MVP of the current block is derived by using an inherited control point motion vector prediction method and/or a constructed control point motion vector prediction method, and is added to the candidate motion information list corresponding to the AMVP mode. Motion information in the candidate motion information list may include a candidate control point motion vector predictor and a prediction direction. In a possible embodiment, the motion information may further include other information.

A candidate motion vector list may include a 2-tuple list (a current coding block uses a 4-parameter affine motion model) or a triplet list or a 4-tuple list. The 2-tuple list includes one or more 2-tuples used to construct a 4-parameter affine motion model. The triplet list includes one or more triplets used to construct a 6-parameter affine motion model. The 4-tuple list includes one or more 4-tuples used to construct an 8-parameter bilinear model.

In a process of determining the candidate control point motion vector of the current block by using the inherited control point motion vector prediction method, motion vectors of at least two subblocks (or at least two preset positions) of an adjacent affine decoding block are used to derive the candidate control point motion vector predictor (candidate motion vector 2-tuple/triplet/4-tuple) of the current block, which is then added to the candidate motion vector list. For specific content of the inherited control point motion vector prediction method, refer to the foregoing detailed description in (3). For brevity of the specification, details are not described herein again.

In a process of determining the candidate control point motion vector of the current block based on the constructed control point motion vector prediction method, motion vectors of encoded blocks adjacent to control points of the current block are combined as motion vectors of the control points of the current affine coding block. For details, refer to the foregoing (4) and (5).

For example, if an affine motion model used by the current block is a 4-parameter affine motion model (that is, MotionModelIdc is 1), motion vectors of the top-left sample and the top-right sample of the current block are determined by using motion information of encoded blocks adjacent to the current block. Specifically, the constructed control point motion vector prediction method 1 or the constructed control point motion vector prediction method 2 may be used to obtain the candidate control point motion vector of the current block, which is then added to the candidate motion vector list corresponding to the AMVP mode.

For example, if an affine motion model used by the current block is a 6-parameter affine motion model (that is, MotionModelIdc is 2), motion vectors of the top-left sample, the top-right sample, and the bottom-left sample of the current block are determined by using motion information of encoded blocks adjacent to the current block. Specifically, the constructed control point motion vector prediction method 1 or the constructed control point motion vector prediction method 2 may be used to obtain the candidate control point motion vector of the current block, which is then added to the candidate motion vector list corresponding to the AMVP mode.

It should be noted that a method for representing motion models of adjacent and current blocks by using another control point may also be applied to the present invention, and details are not described herein.

In a possible embodiment of the present invention, the candidate motion vector 2-tuple/triplet/4-tuple list may be pruned and sorted according to a specific rule, and may be truncated or filled in to reach a specific quantity.

S603a: Parse the bitstream to determine a selected multi-tuple motion vector predictor, for example, an optimal control point motion vector predictor.

Specifically, an index number is obtained by parsing the bitstream, and the optimal control point motion vector predictor (CPMVP) is determined based on the index number from the candidate motion vector list constructed in S602a.

For example, if the affine motion model used by the current block is a 4-parameter affine motion model (MotionModelIdc is 1), the index number of the candidate motion vector list is obtained through parsing. For example, the index number is mvp_l0_flag or mvp_l1_flag, and optimal motion vector predictors of two control points are determined based on the index number from the candidate motion vector list.

For another example, if the affine motion model used by the current block is a 6-parameter affine motion model (MotionModelIdc is 2), the index number of the candidate motion vector list is obtained through parsing, and optimal motion vector predictors of three control points are determined based on the index number from the candidate motion vector list.

S604a: Parse the bitstream to determine a control point motion vector.

Specifically, a control point motion vector difference (CPMVD) is obtained by parsing the bitstream, and then the control point motion vector is obtained based on the control point motion vector difference and the optimal motion vector predictor (CPMVP) determined in S603a.

For example, if the affine motion model used by the current block is a 4-parameter affine motion model (MotionModelIdc is 1), when forward prediction is used as an example, motion vector differences of two control points are respectively mvd_coding(x0, y0, 0, 0) and mvd_coding(x0, y0, 0, 1). The motion vector differences of the two control points of the current block are decoded from the bitstream. For example, motion vector differences of the top-left position control point and the top-right position control point may be decoded from the bitstream. Then, the motion vector difference and the motion vector predictor of each control point are added to obtain the control point motion vector, that is, the motion vectors of the top-left position control point and the top-right position control point of the current block are obtained.

For another example, if the affine motion model used by the current block is a 6-parameter affine motion model (MotionModelIdc is 2), when forward prediction is used as an example, motion vector differences of three control points are respectively mvd_coding(x0, y0, 0, 0), mvd_coding(x0, y0, 0, 1), and mvd_coding(x0, y0, 0, 2). The motion vector differences of the three control points of the current block are decoded from the bitstream. For example, motion vector differences of the top-left control point, the top-right control point, and the bottom-left control point are decoded from the bitstream. Then, the motion vector difference and the motion vector predictor of each control point are added to obtain the control point motion vector, that is, the motion vectors of the top-left control point, the top-right control point, and the bottom-left control point of the current block are obtained.

It should be noted that this embodiment of the present invention may alternatively use another affine motion model and another control point position, and details are not described herein.

It should be understood that, in the affine motion model of this application, a position of a control point of an adjacent block (that is, an adjacent affine block) may correspond to a position of a control point of the current block, or may not correspond to the position of the control point of the current block. For example, control points of the current block are the top-left sample and the top-right sample (as shown in FIG. 12A or FIG. 12D), and control points of the adjacent block of the current block may not be the top-left sample and the top-right sample. For example, MVs of bottom-right, bottom-middle, and middle-right subblocks (also referred to as MVs in the bottom-right position, the bottom-middle position, and the middle-right position) of the adjacent affine block are used to derive an affine model for inheritance (as shown in FIG. 12E, the control point of the adjacent block may correspond to a position with ½ SB (½ width or height)).

In this application, the candidate motion information list is used as an example for description. It should be understood that a history-based candidate list (HMVP) may alternatively be used. For example, a decoded affine CPMV, position information, and a corresponding LIC_flag are stored in the HMVP list. Subsequently, an affine block obtains the CPMV, the position information, and the corresponding LIC_flag from the HMVP list, derives an affine model for inheritance, and decides whether to perform LIC processing. In this application, a decoded affine model parameter may also be stored, and subsequently, the affine block directly reads the model parameter for inheritance.

Figure 12F:
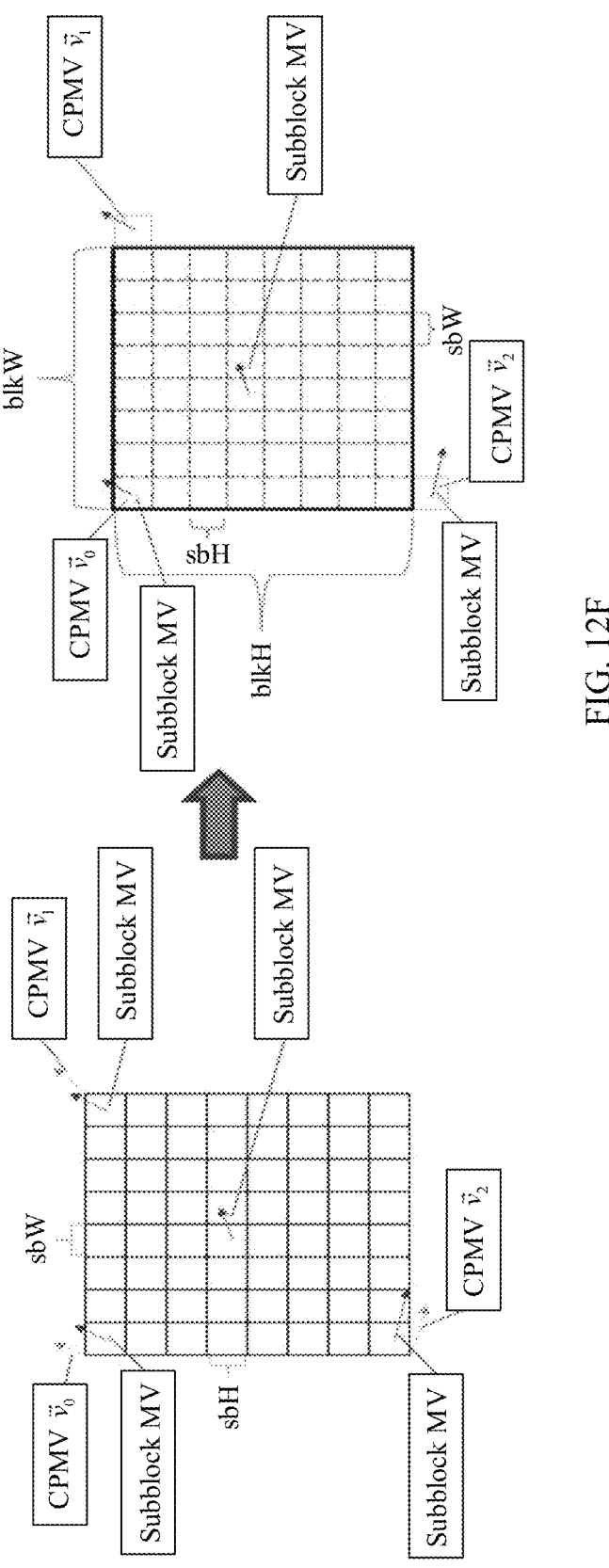
FIG. 12F is an example schematic diagram of shifting all control point positions of a current affine picture block to the bottom-right or top-left direction by two pixels.

In this application, in different implementations, as shown in FIG. 12F, the control point position of the current affine block may be shifted to the bottom-right or top-left direction by two pixels.

S605a. Obtain a motion vector of each subblock in the current block based on the affine motion model used by the current block; or, obtain a motion vector of each subblock in the current block based on control point motion information of the current block and control point position coordinates of the current block. It should be understood that the model parameter of the affine motion model used by the current block may be obtained based on the control point motion information of the current block and the control point position coordinates of the current block.

For each subblock of the current affine decoding block (one subblock may also be equivalent to one motion compensation unit, and a width and a height of the subblock are less than a width and a height of the current block), motion information of a pixel in a preset position in the motion compensation unit may be used to indicate motion information of all pixels in the motion compensation unit. It is assumed that a size of the motion compensation unit is M×N, and the pixel in the preset position may be a pixel at a center point (M/2, N/2), the top-left pixel (0, 0), the top-right pixel (M−1, 0), or a pixel in another position of the motion compensation unit. The following uses the center point of the motion compensation unit as an example for description. Refer to FIG. 12C and FIG. 12D. In FIG. 12C and FIG. 12D, V0 represents a motion vector of the top-left control point, and V1 represents a motion vector of the top-right control point. Each small box represents one motion compensation unit.

Coordinates of the center point of the motion compensation unit relative to the top-left pixel of the current affine decoding block are calculated by using the following formula (33), where i is an ith motion compensation unit in a horizontal direction (from left to right), j is a jth motion compensation unit in a vertical direction (from top to bottom), $(x_{(i,j)}, y_{(i,j)})$ represents coordinates of a center point of an (i, j)th motion compensation unit relative to the top-left control point pixel of the current affine decoding block, and the top-left control point pixel position herein does not involve a position shift. However, it should be understood that, in this application, the control point position of the current affine block may involve a position shift, for example, a shift by N pixels (for example, one or two pixels) to the bottom-right or top-left direction.

For example, if the affine motion model used by the current affine decoding block is a 6-parameter affine motion model, $(x_{(i,j)}, y_{(i,j)})$ is substituted into a 6-parameter affine motion model formula (34) to obtain a motion vector of a center point of each motion compensation unit as motion vectors $(vx_{(i,j)}, vy_{(i,j)})$ of all pixels in the motion compensation unit.

For example, if the affine motion model used by the current affine decoding block is a 4-parameter affine motion model, $(x_{(i,j)}, y_{(i,j)})$ is substituted into a 4-parameter affine motion model formula (35) to obtain a motion vector of a center point of each motion compensation unit as motion vectors $(vx_{(i,j)}, vy_{(i,j)})$ of all pixels in the motion compensation unit.

$$\begin{cases} x_{(i,j)} = M \times i + \dfrac{M}{2}, i = 0, 1 \dots \\ y_{(i,j)} = N \times j + \dfrac{N}{2}, j = 0, 1 \dots \end{cases} \tag{33}$$

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \tag{34}$$

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \tag{35}$$

It should be understood that, in this application, in the affine motion model, at least two preset positions of a reference block/an adjacent block may be any positions, are not limited to vertex positions, or may be positions with a ½ width or a ½ height.

In this application, the decoded affine model parameter may be stored, and subsequently, the affine block may read the affine model parameter for inheritance. For example, when the affine model parameter is inherited, an LIC_flag may be inherited.

S606$a$. Perform motion compensation on each subblock based on the determined motion vector of the subblock to obtain a predicted pixel value of the subblock.

S607$a$: Parse a value of an LIC_flag from the bitstream; and if the LIC_flag is 1, perform step S608$a$.

The value of the LIC_flag is parsed from the bitstream. If the LIC_flag is 0, the current affine block is not to use LIC prediction, and step S608$a$ does not need to be performed. It should be noted that this step may be before or after S606$a$, which is not limited in this application.

S608$a$. Update a predicted pixel value of the current affine block by using an LIC prediction method, to obtain an updated predicted pixel value of the current affine block.

The predicted pixel value of the current affine block is updated based on a linear model coefficient (also referred to as an update parameter), which may alternatively be understood as performing (local) illumination compensation on the predicted pixel value of the current affine block based on the linear model coefficient (using a local illumination compensation technology to perform local illumination compensation on the predicted pixel value of the current affine block), so as to obtain a predicted pixel value of the current affine block after (local) illumination compensation. A method for obtaining the linear model coefficient is not limited in this application, and a specific method is not limited in this application. Specifically, the updated predicted pixel value of the current affine block may be determined according to formula (32).

$$pred'(x, y) = \alpha \cdot pred(x, y) + \beta \tag{32}$$

In formula (32), pred'_(i, j) is an updated predicted pixel value in a position (i, j) in the current affine block, pred_(i, j) is a predicted pixel value in the position (i, j) in the current affine block, and $\alpha$ and $\beta$ are linear model coefficients.

pred_(i, j) may be understood as a predicted pixel value or a reconstructed pixel value in a position (i, j) in a reference block corresponding to the current affine block (a reference subblock (also referred to as a prediction subblock) corresponding to each subblock may be obtained based on motion vector motion compensation of each subblock in the current affine block, so as to obtain the reference block (also referred to as a prediction block) corresponding to the current affine block), and the predicted pixel value or the reconstructed pixel value in the position (i, j) in the reference block corresponding to the current affine block may be used as the predicted pixel value in the position (i, j) in the current affine block.

S602$b$. Construct a candidate motion information list of the affine motion model-based merge mode (merge affine).

Specifically, the candidate motion information list of the affine motion model-based merge mode may be constructed by using an inherited control point motion vector prediction method and/or a constructed control point motion vector prediction method. Motion information in the candidate motion information list includes a candidate control point motion vector predictor (candidate motion vector combination), a prediction direction, a reference frame index, and the like. In this embodiment of this application, the motion information may further include an LIC_flag, and certainly, the motion information may also include other information. Alternatively, one or more candidates in the candidate motion information list include candidate motion information and an LIC_flag, where the candidate motion information includes a candidate control point motion vector predictor (candidate motion vector combination), a prediction direction, a reference frame index, and the like. In this embodiment of this application, the candidate may further include other information. For related implementation, refer to the detailed description in the foregoing (9). For brevity of the specification, details are not described herein again.

In a possible embodiment, a subblock-based merge candidate list (sub-block based merging candidate list) may further be constructed by using an ATMVP method, and/or the inherited control point motion vector prediction method, and/or the constructed control point motion vector prediction method, and/or a PLANAR method. For related implementation, refer to the detailed description in the foregoing (6), (7), (9), and (10). Details are not described herein again.

For specific implementation of the inherited control point motion vector prediction method and/or the constructed control point motion vector prediction method, refer to the detailed description in the foregoing (3), (4), and (5). Details are not described herein again.

For example, after candidate motion vector combinations of a control point are obtained by using the constructed control point motion vector prediction method, if a length of the candidate list is less than a maximum list length MaxAffineNumMrgCand in this case, the combinations are traversed in a preset sequence to obtain a valid combination as candidate control point motion information; and if the candidate motion vector list is empty in this case, the candidate control point motion information is added to the candidate motion vector list. Otherwise, motion information in the candidate motion vector list is traversed in sequence, and whether motion information same as the candidate control point motion information exists in the candidate motion vector list is checked. If motion information same as the candidate control point motion information does not exist in the candidate motion vector list, the candidate control point motion information is added to the candidate motion vector list.

For example, a preset sequence is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4), that is, a total of 10 combinations.

Step S6021*b* includes step S6021*b*, which is used to determine a value of an LIC_flag in the candidate motion information list. S6021*b* is described as follows:

If control point motion information corresponding to a combination cannot be obtained, it is considered that the combination cannot be obtained. If a combination can be obtained, a reference frame index of the combination is determined (in a case of two control points, a smaller reference frame index is selected as the reference frame index of the combination; and in a case of more than two control points, a reference frame index with a largest quantity of occurrences is first selected, and if there are a plurality of reference frame indexes with a same quantity of occurrences, a smallest reference frame index is selected as the reference frame index of the combination), and control point motion vectors are scaled. If motion information of all control points after scaling is consistent, the combination is invalid.

If control point motion information corresponding to a combination can be obtained, a value of an LIC_flag corresponding to the combination is determined. Because control point motion vectors of the current to-be-processed picture block come from different adjacent decoded blocks, and values of LIC_flags of the different adjacent decoded blocks may be different, one or more implementations described above may be used to process the values of the LIC_flags of the different adjacent decoded blocks, so as to obtain the value of the LIC_flag corresponding to the combination.

For another example, if the candidate motion vector of the control point is obtained by using the inherited control point motion vector prediction method, values of LIC_flags corresponding to candidate motion vectors of all control points all come from a same adjacent decoded block. Subsequently, the candidate motion vector of the control point and the value of the corresponding LIC_flag may be added to the candidate motion information list.

Optionally, in this embodiment of the present invention, the candidate motion vector list may be further filled in. For example, after the foregoing traversal process, in this case, the length of the candidate motion vector list is less than the maximum list length MaxAffineNumMrgCand, the candidate motion vector list may be filled in until the length of the list is equal to MaxAffineNumMrgCand.

In addition, in a possible embodiment, the candidate motion information list may be pruned and sorted according to a specific rule, and may be truncated or filled in to reach a specific quantity. For example, filling may be performed by adding a zero motion vector, or filling may be performed by combining and performing weighted averaging on candidate motion information in an existing list. It should be noted that another method for filling in the candidate motion vector list may also be applied to the present invention, and details are not described herein.

S603*b*. Parse the bitstream to determine a selected candidate or optimal control point motion information.

Specifically, an index number is obtained by parsing the bitstream, and the selected candidate or the optimal control point motion information is determined based on the index number from the candidate motion vector list constructed in S602*b*. It may be understood that the optimal control point motion information includes an optimal candidate motion vector combination, a prediction direction, an LIC_flag, and a reference frame index. In a possible embodiment, the optimal control point motion information may further include other information. Alternatively, the candidate corresponding to the index number includes candidate motion information and an LIC_flag.

S604*b*. Obtain a motion vector of each subblock in the current block based on control point motion information and control point position information that are included in the selected candidate.

In an implementation, the motion vector of each subblock in the current block is obtained based on the optimal control point motion information and the control point position information.

In an implementation, in the affine merge mode, the motion vector of each subblock of the current affine block is directly derived by using an affine model of an adjacent affine block. The affine model of the adjacent affine block may be obtained based on the control point motion information and the control point position information that are included in the selected candidate.

Alternatively, in an implementation, the motion vector of each subblock in the current block is obtained based on an affine motion model used by the current block; or the motion vector of each subblock in the current block is obtained based on the control point motion information of the current block and control point position coordinates of the current block. It should be understood that the model parameter of the affine motion model used by the current block may be obtained based on the control point motion information of the current block and the control point position coordinates of the current block. The control point motion information of the current block is obtained based on the control point motion information and the control point position information that are included in the selected candidate.

For a related implementation process, refer to the foregoing description in S605*a*. Details are not described herein again.

S605*b*. Perform motion compensation on each subblock based on the determined motion vector of the subblock to obtain a predicted pixel value of the subblock.

S606*b*. Update a predicted pixel value of the current affine block by using an LIC prediction method, to obtain an updated predicted pixel value of the current affine block.

If the value of the LIC_flag in the candidate corresponding to the index number in step S603*b* is 1, step S606*b* is performed. Otherwise, a predicted pixel value of each subblock is obtained by performing step S605*b*.

The process is the same as that described in S608*a*.

For a detailed implementation process, further refer to the detailed description in the foregoing (11). For brevity of the specification, details are not described herein again.

It may be learned that in an inter prediction process in this embodiment of the present invention, the decoder side may perform local illumination compensation by using the LIC prediction method in combination with the affine motion model-based AMVP mode or merge mode. If the current block uses the affine motion model-based merge mode, the LIC_flag of the current block may be included in a candidate corresponding to a candidate index. In other words, the LIC_flag of the current block may be directly obtained based on the LIC_flag of the adjacent decoded block, or may be obtained through analysis based on the LIC_flag of the control point of the adjacent decoded block. If the current block uses the affine motion model-based AMVP mode, the value of the LIC_flag of the current block may be obtained from the bitstream, thereby ensuring smooth execution of the decoding process. The LIC_flag of the current block may be further used in a decoding process of a subsequent to-be-decoded block. This improves coding efficiency and prediction accuracy.

Based on the foregoing description, the following further describes the inter prediction method provided in the embodiment of the present invention, which is described from a perspective of an encoder side. Referring to FIG. 1B, the method includes but is not limited to the following steps:

S701. Determine an inter prediction mode of a current block.

In a specific implementation, a plurality of inter prediction modes may also be preset for inter prediction on the encoder side. For example, the plurality of inter prediction modes include the foregoing described affine motion model-based AMVP mode and affine motion model-based merge mode. The encoder side traverses the plurality of inter prediction modes, so as to determine an optimal inter prediction mode for prediction of the current block.

In another specific implementation, only one type of inter prediction mode may alternatively be preset for inter prediction on the encoder side. That is, in this case, the encoder side directly determines that a default inter prediction mode is currently used, and the default inter prediction mode is the affine motion model-based AMVP mode or the affine motion model-based merge mode.

In this embodiment of the present invention, if it is determined that the inter prediction mode of the current block is the affine motion model-based AMVP mode, S702a-S705a are subsequently performed. When an LIC_flag is 0, steps S702a and S70301a are performed. When the LIC_flag is 1, steps S702a and S70302a are performed.

In this embodiment of the present invention, if it is determined that the inter prediction mode of the current block is the affine motion model-based merge mode, S702b-S704b are subsequently performed.

S702a. Construct a candidate motion vector list corresponding to the affine motion model-based AMVP mode.

When the LIC_flag is 0 or the LIC_flag is 1, this step needs to be performed.

In this embodiment of the present invention, a candidate control point motion vector of the current block is derived by using an inherited control point motion vector prediction method and/or a constructed control point motion vector prediction method, and is added to the candidate motion vector list corresponding to the AMVP mode, where motion information in the candidate motion vector list includes a candidate control point motion vector predictor (candidate motion vector combination) and a prediction direction. For specific implementation of S702a, refer to the foregoing description of S602a. Details are not described herein again.

For specific implementation of the inherited control point motion vector prediction method and/or the constructed control point motion vector prediction method, refer to the detailed description in the foregoing (3), (4), and (5). Details are not described herein again.

S70301a: On the encoder side, the encoder (such as the encoder 20) obtains a motion vector of each motion compensation subunit in a current coding block according to formula (3) or (5) or (7) and each control point motion vector predictor in a control point motion vector predictor candidate list, and further obtains a pixel value of a corresponding position in a reference frame to which the motion vector of each motion compensation subunit points, as a predictor of the motion compensation subunit, to perform motion compensation by using an affine motion model. An average value of differences between original values and predictors of all pixels in the current coding block is calculated, and a control point motion vector predictor corresponding to a minimum average value is selected as an optimal control point motion vector predictor, and is used as motion vector predictors of two or three or four control points in the current coding block. In addition, in a possible embodiment, motion searching is performed within a specific search range by using a control point motion vector predictor as a search start point to obtain control point motion vectors (CPMV), and a difference between the control point motion vector and the control point motion vector predictor (CPMVD) is calculated.

S70302a: On the encoder side, the encoder (such as the encoder 20) obtains a motion vector of each motion compensation subunit in a current coding block according to formula (3) or (5) or (7) and each control point motion vector predictor in a control point motion vector predictor candidate list, further obtains a pixel value of a corresponding position in a reference frame to which the motion vector of each motion compensation subunit points, as a predictor of the motion compensation subunit, to perform motion compensation by using an affine motion model, and refreshes the predictor of each motion compensation subunit by using an LIC prediction method after obtaining the predictor. An average value of differences between original values and predictors of all pixels in the current coding block is calculated, and a control point motion vector predictor corresponding to a minimum average value is selected as an optimal control point motion vector predictor, and is used as motion vector predictors of two or three or four control points in the current coding block. In addition, in a possible embodiment, motion searching is performed within a specific search range by using a control point motion vector predictor as a search start point to obtain control point motion vectors (CPMV), and a difference between the control point motion vector and the control point motion vector predictor (CPMVD) is calculated.

S704a: Determine a value of an LIC_flag based on a rate distortion cost.

Rate distortion costs during prediction in a case of the LIC_flag being 1 and in a case of the LIC_flag being 0 are compared, and the value of the LIC_flag corresponding to a smaller rate distortion cost is transmitted to a decoder side.

S705a: Encode, into a bitstream, an index number of an optimal control point motion vector predictor in the candidate motion vector list, a control point motion vector difference (CPMVD), the LIC_flag, a reference frame index, and indication information of the inter prediction mode.

In an instance, the encoder side may perform motion searching within a specific search range by using the optimal control point motion vector predictor as a search start point to obtain control point motion vectors (CPMV), and calculate a difference between the control point motion vector and the control point motion vector predictor (CPMVD).

In specific implementation, for a syntax element encoded into the bitstream, further refer to the foregoing description in Table 1 and Table 2. Details are not described herein again.

S702*b*. Construct a candidate motion vector list corresponding to the affine motion model-based merge mode.

Specifically, the candidate motion information list of the affine motion model-based merge mode may be constructed by using an inherited control point motion vector prediction method and/or a constructed control point motion vector prediction method. Motion information in the candidate motion information list includes a candidate control point motion vector predictor (candidate motion vector combination), a prediction direction, an LIC_flag, and a reference frame index. For related implementation, further refer to the detailed description in the foregoing (9).

For an LIC_flag corresponding to each candidate control point motion vector predictor in the candidate motion information list, for example, if a candidate control point motion vector predictor is obtained by using the inherited control point motion vector prediction method, that is, the candidate control point motion vector predictor is obtained by using a motion model of an adjacent encoded block, an LIC_flag of the adjacent encoded block may be used as the LIC_flag corresponding to the candidate control point motion vector predictor.

For another example, if candidate control point motion vector predictors are obtained by using the constructed control point motion vector prediction method, in the candidate control point motion vector predictors, motion vector predictors of different control points come from different adjacent encoded blocks. Because different adjacent encoded blocks may have different LIC_flags, one or more implementations described in the foregoing may be used to process the LIC_flags of the different adjacent encoded blocks, so as to obtain the LIC_flags corresponding to the candidate control point motion vector predictors.

A method for determining the LIC_flag in this step is the same as the determining method on the decoder side, and details are not described herein again.

In a possible embodiment, a subblock-based merge candidate list (sub-block based merging candidate list) may further be constructed by using an ATMVP method, and/or the inherited control point motion vector prediction method, and/or the constructed control point motion vector prediction method, and/or a PLANAR method. For related implementation, refer to the detailed description in the foregoing (6), (7), (9), and (10). Details are not described herein again.

For specific implementation of the inherited control point motion vector prediction method and/or the constructed control point motion vector prediction method, refer to the detailed description in the foregoing (3), (4), and (5). For specific implementation of S702*b*, further refer to the foregoing description of S602*b*. Details are not described herein again.

S703*b*. Determine optimal control point motion information based on a rate distortion cost.

In an instance, the encoder side may obtain a motion vector of each motion compensation subunit in a current coding block by using a control point motion vector (for example, a candidate motion vector 2-tuple/triplet/4-tuple) in the candidate motion vector list and formula (3), (5), or (7), so as to obtain a pixel value in a position in a reference frame to which the motion vector of each motion compensation subunit points as a predictor of the motion compensation subunit and perform affine motion compensation. An average value of differences between original values and predictors of all pixels in the current coding block is calculated, a control point motion vector corresponding to a minimum average value of the differences is selected as an optimal control point motion vector, and the optimal control point motion vector is used as motion vectors of two or three or four control points in the current coding block.

In another instance, if a subblock-based merge candidate list is constructed by performing S702*b*, each piece of candidate motion information in the merge candidate list is traversed, and if the candidate uses the ATMVP or PLANAR mode, motion information of each subblock is obtained based on the method of (6) or (7). If the candidate uses the affine motion mode, a motion vector of each subblock in the current block is obtained by using the formula (3)/(5)/(7) based on each control point motion vector, and a pixel value in a position in a reference frame to which the motion vector of each subblock points is obtained as a predictor of the subblock for affine motion compensation. An average value of differences between original values and predictors of all pixels in the current block is calculated, and a candidate corresponding to a minimum average value of the differences is selected as optimal control point motion information of the current block.

S704*b*. Encode, into a bitstream, an index number of the optimal control point motion information in the candidate motion vector list and indication information of the inter prediction mode, so as to subsequently transmit the bitstream to a decoder side.

In specific implementation, for a syntax element encoded into the bitstream, further refer to the foregoing description in Table 1 and Table 2. Details are not described herein again.

It should be noted that the foregoing embodiment describes only a process in which the encoder side implements encoding and bitstream sending. Based on the foregoing description, a person skilled in the art understands that the encoder side may further implement, in another phase, another method described in the embodiment of the present invention. For example, during prediction of the current block on the encoder side, for specific implementation of a reconstruction process of the current block, refer to a related method (as described in the embodiment in FIG. 11A) described on the decoder side. Details are not described herein again.

It may be learned that, in an inter prediction process in this embodiment of the present invention, the encoder side may perform encoding by using the LIC prediction method in combination with the affine motion model-based AMVP mode or merge mode. If the current block uses the affine motion model-based merge mode and uses the constructed control point motion vector prediction method, a GBi index number corresponding to the candidate motion vector information of the current block may be obtained through processing based on an LIC_flag of an adjacent encoded block of the control point. It is ensured that an encoding process is smoothly performed, and the LIC_flag of the current block may be further used for an encoding process of a subsequent to-be-encoded block. This improves encoding efficiency and prediction accuracy.

The foregoing describes the video decoding method and the video encoding method in the embodiments of this application in detail with reference to the accompanying drawings. The following describes an inter prediction method in an embodiment of this application with reference to FIG. 11C. It should be understood that the encoder 20 (which may be specifically an inter prediction unit 244) or the decoder 30 (which may be specifically an inter prediction unit 344) performs steps in the inter prediction method in this embodiment of this application. To avoid unnecessary repetition, the following appropriately omits repeated description when introducing the inter prediction method in this embodiment of this application.

S1001. Obtain a predicted pixel value of a current affine block.

S1002. Obtain a local illumination compensation LIC flag of the current affine block, where the LIC flag is used to indicate whether local illumination compensation LIC is applied to the current affine block.

S1003. When the LIC flag indicates that LIC is applied to the current affine block, update the predicted pixel value of the current affine block based on an update coefficient for local illumination compensation LIC, to obtain an updated predicted pixel value of the current affine block.

Figure 13:
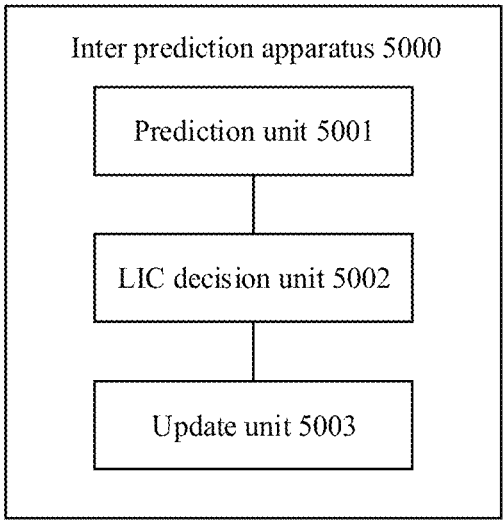
FIG. 13 is a block diagram of an example inter prediction apparatus 5000 used to implement an embodiment of the present invention.

The following describes an inter prediction apparatus 5000 in an embodiment of this application with reference to FIG. 13. It should be understood that the inter prediction apparatus shown in FIG. 13 can perform steps in the video encoding or decoding method in the embodiment of this application. To avoid unnecessary repetition, the following appropriately omits repeated description when introducing the inter prediction apparatus in this embodiment of this application.

FIG. 13 is a schematic block diagram of an inter prediction apparatus according to an embodiment of this application. In an implementation, the inter prediction apparatus 5000 shown in FIG. 13 may include: a prediction unit 5001, configured to obtain a predicted pixel value of a current affine block; an LIC decision unit 5002, configured to obtain an LIC flag (for example, LIC_flag) of the current affine block, where the LIC flag is used to indicate whether local illumination compensation (local illumination compensation, LIC) is applied to the current affine block; and an update unit 5003, configured to: when the LIC flag indicates that LIC is applied to the current affine block, update the predicted pixel value of the current affine block based on an update coefficient for LIC, to obtain an updated predicted pixel value of the current affine block.

In another implementation, the inter prediction apparatus 5000 shown in FIG. 13 may include: a prediction unit 5001, configured to obtain a predicted pixel value of a current affine block; an LIC decision unit 5002, configured to determine whether a local illumination compensation (LIC) operation is applied to the current affine block (for example, determine whether the LIC operation is applied to the current affine block); and an update unit 5003, configured to: if the local illumination compensation operation needs applied to the current affine block, update the predicted pixel value of the current affine block based on an update coefficient for the LIC operation, to obtain an updated predicted pixel value of the current affine block.

In the apparatus embodiment of this application, local illumination compensation LIC is performed on the predicted pixel value of the current affine block, to improve inter prediction accuracy, reduce a residual value, save a bit rate while maintaining video quality, and further improve coding performance.

The inter prediction apparatus 5000 may be either an encoder device or a decoder device.

When the inter prediction apparatus 5000 is an encoder device, the prediction unit 5001, the LIC decision unit 5002, and the update unit 5003 in the inter prediction apparatus 5000 may be corresponding to the inter prediction unit 244 in the encoder 20 shown in FIG. 2.

When the inter prediction apparatus 5000 is a decoder device, the prediction unit 5001, the LIC decision unit 5002, and the update unit 5003 in the inter prediction apparatus 5000 may be corresponding to the inter prediction unit 344 in the decoder 30 shown in FIG. 3.

In addition, the inter prediction apparatus 5000 may also be referred to as a codec device or a codec. Encoding or decoding of a video picture can be implemented by using the inter prediction apparatus 5000.

In some possible embodiments, the LIC decision unit 5002 is configured to:

determine a corresponding candidate from a list based on a candidate index parsed from a bitstream, where the candidate includes a multi-tuple motion vector and an LIC flag, and the list includes a candidate list or a history-based candidate list (HMVP list), where the LIC flag in the candidate is used as the LIC flag of the current affine block or the LIC flag of the current affine block is inherited from the LIC flag in the candidate.

In some possible embodiments, the prediction unit 5001 is further configured to construct the list, where each candidate of one or more candidates in the list includes a multi-tuple motion vector and an LIC flag, and the list includes a candidate list or a history-based candidate list (HMVP list).

In some possible embodiments, when the candidate in the list is obtained through inheritance, the multi-tuple motion vector represents motion vectors of a plurality of control points of an adjacent affine block of the current affine block, or the multi-tuple motion vector represents motion vectors of a plurality of control points of the current affine block, where an affine model of the current affine block is inherited from an affine model of the adjacent affine block of the current affine block; and correspondingly, the LIC flag is inherited from an LIC flag of the adjacent affine block.

In some possible embodiments, when the candidate in the list is obtained through construction, the multi-tuple motion vector represents motion vectors of a plurality of control points of the current affine block, and the motion vectors of the plurality of control points respectively come from a plurality of adjacent encoded blocks of the current affine block; and correspondingly, the LIC flag is determined based on LIC flags of the plurality of adjacent encoded blocks; or the LIC flag is determined based on LIC flags of the plurality of control points. It should be understood that the LIC flags of the plurality of control points may inherit the LIC flags of the adjacent encoded blocks of the current picture block.

In some possible embodiments, when the candidate in the list is obtained through construction, and values of a plurality of LIC flags of the plurality of control points corresponding to the multi-tuple motion vector are the same, the LIC flag in the candidate is any one of the LIC flags whose values are the same or any one of the plurality of LIC flags; otherwise, when at least one of the plurality of LIC flags of the plurality of control points corresponding to the multi-tuple motion vector is a first value, the LIC flag in the candidate is an LIC flag whose value is the first value; otherwise, the LIC flag in the candidate is an LIC flag whose value is a second value; or when a quantity of LIC flags having a first value is greater than or equal to a quantity of LIC flags having a second value in the plurality of LIC flags of the plurality of control points corresponding to the multi-tuple motion vector, the LIC flag in the candidate is an LIC flag whose value is the first value; otherwise, the LIC flag in the candidate is an LIC flag whose value is the second value; or when a quantity of LIC flags having a first value is less than a quantity of LIC flags having a second value in the plurality of LIC flags of the plurality of control points corresponding to the multi-tuple motion vector, the LIC flag in the candidate is an LIC flag whose value is the second value; otherwise, the LIC flag in the candidate is an LIC flag whose value is the first value.

In some possible embodiments, when the candidate in the list is obtained through construction, and at least one of the plurality of LIC flags of the plurality of control points corresponding to the multi-tuple motion vector is a first value, the LIC flag in the candidate is an LIC flag whose value is the first value; otherwise, the LIC flag in the candidate is an LIC flag whose value is a second value; or when a quantity of LIC flags having a first value is greater than or equal to a quantity of LIC flags having a second value in the plurality of LIC flags of the plurality of control points corresponding to the multi-tuple motion vector, the LIC flag in the candidate is an LIC flag whose value is the first value; otherwise, the LIC flag in the candidate is an LIC flag whose value is the second value; or when a quantity of LIC flags having a first value is less than a quantity of LIC flags having a second value in the plurality of LIC flags of the plurality of control points corresponding to the multi-tuple motion vector, the LIC flag in the candidate is an LIC flag whose value is the second value; otherwise, the LIC flag in the candidate is an LIC flag whose value is the first value.

In some possible embodiments, when the control point motion vector (CPMV) is obtained through construction, if motion information of an $N^{th}$ control point in the plurality of control points of the current affine block comes from a temporally adjacent encoded block of the current affine block, it is determined that an LIC flag of the $N^{th}$ control point is a default value or a preset value (the default value or the preset value is the second value, for example, 0); or in some possible embodiments, when the control point motion vector (CPMV) is obtained through inheritance, if motion information of an $N^{th}$ control point in the plurality of control points of the adjacent affine block of the current affine block comes from a temporally adjacent encoded block of the adjacent affine block, it is determined that an LIC flag of the $N^{th}$ control point in the plurality of control points of the adjacent affine block of the current affine block is a default value or a preset value (the default value or the preset value is the second value, for example, 0).

In some possible embodiments, when the control point motion vector (CPMV) is obtained through construction, if motion information of an $N^{th}$ control point in the plurality of control points of the current affine block comes from a temporally adjacent encoded block of the current affine block and an LIC flag of the temporally adjacent encoded block is available (available, that is, can be obtained), an LIC flag of the $N^{th}$ control point is inherited from the LIC flag of the temporally adjacent encoded block; or in some possible embodiments, when the control point motion vector (CPMV) is obtained through inheritance, if motion information of an $N^{th}$ control point in the plurality of control points of the adjacent affine block of the current affine block comes from a temporally adjacent encoded block of the adjacent affine block and an LIC flag of the temporally adjacent encoded block is available (available, that is, can be obtained), an LIC flag of the $N^{th}$ control point in the plurality of control points of the adjacent affine block of the current affine block is inherited from the LIC flag of the temporally adjacent encoded block.

In some possible embodiments, the LIC decision unit 5002 is configured to: obtain the LIC flag (for example, LIC_flag) of the current affine block parsed or derived from a bitstream; or determine that the LIC flag of the current affine block is a default value or a preset value (the default value or the preset value is a first value or a second value, for example, 1 or 0); or determine that an LIC flag of an $N^{th}$ control point in a plurality of control points of the current affine block is a default value or a preset value (the default value or the preset value is the second value, for example, 0), where motion information of the $N^{th}$ control point comes from a temporally adjacent encoded block; or determine that an LIC flag of an $N^{th}$ control point in a plurality of control points of an adjacent affine block of the current affine block is a default value or a preset value (the default value or the preset value is the second value, for example, 0).

In some possible embodiments, the value of the LIC flag is the first value (for example, 1), indicating that local illumination compensation (local illumination compensation, LIC) is applied to the current affine block; or the value of the LIC flag is the second value (for example, 0), indicating that local illumination compensation (local illumination compensation, LIC) is not applied to the current affine block.

In some possible embodiments, the update unit 5003 is configured to: determine, based on a reference pixel set, the update coefficient (for example, a linear model coefficient) used for LIC, where the reference pixel set includes at least one reconstructed pixel adjacent to a left boundary (a left-most pixel) of the current affine block, and at least one reconstructed pixel adjacent to a top boundary (a top-most pixel) of the current affine block; or, the reference pixel set includes reconstructed pixels adjacent to a left boundary and/or a top boundary of the current affine block; and update the predicted pixel value of the current affine block based on the update coefficient for LIC, to obtain the updated predicted pixel value of the current affine block.

In some possible embodiments, motion information (for example, motion vectors) of one or more subblocks of the current affine block is used to obtain, determine, or locate a subset or a universal set of the reference pixel set.

In some possible embodiments, the one or more subblocks of the current affine block include a subblock in the top-left position, a subblock in the central position, a subblock in the top-most position, and/or a subblock in the left-most position.

In some possible embodiments, the update unit 5003 is configured to update the predicted pixel value of the current affine block based on the update coefficient for LIC, to obtain the updated predicted pixel value of the current affine block, where:

$$\text{pred}'(x,y)=\alpha\cdot\text{pred}(x,y)+\beta,$$

where pred'_(i, j) is an updated predicted pixel value in a position (i, j) in the current affine block, pred_(i, j) is a predicted pixel value in the position (i, j) in the current affine block, and $\alpha$ and $\beta$ are update coefficients or linear model coefficients.

In some possible embodiments, the current affine block includes a plurality of subblocks, and the prediction unit 5001 is configured to: obtain a motion vector of each subblock in the current affine block based on the motion vectors of the plurality of control points of the current affine block and position coordinates of the plurality of control points of the current affine block; or obtain a motion vector of each subblock in the current affine block based on a stored affine model parameter or an affine model parameter of the current affine block or an affine model parameter of the adjacent affine block of the current affine block; or obtain a motion vector of each subblock in the current affine block based on motion vectors of the plurality of control points of the adjacent affine block of the current affine block and position coordinates of the plurality of control points of the adjacent affine block; or obtain a motion vector of each subblock in the current affine block based on a stored multi-tuple motion vector and stored position coordinates, or stored motion vectors of a plurality of control points and position coordinates of the plurality of control points; and perform a motion compensation process or performing a prediction process based on the motion vector of each subblock in the current affine block, so as to obtain a predicted pixel value of each subblock.

Figure 14:
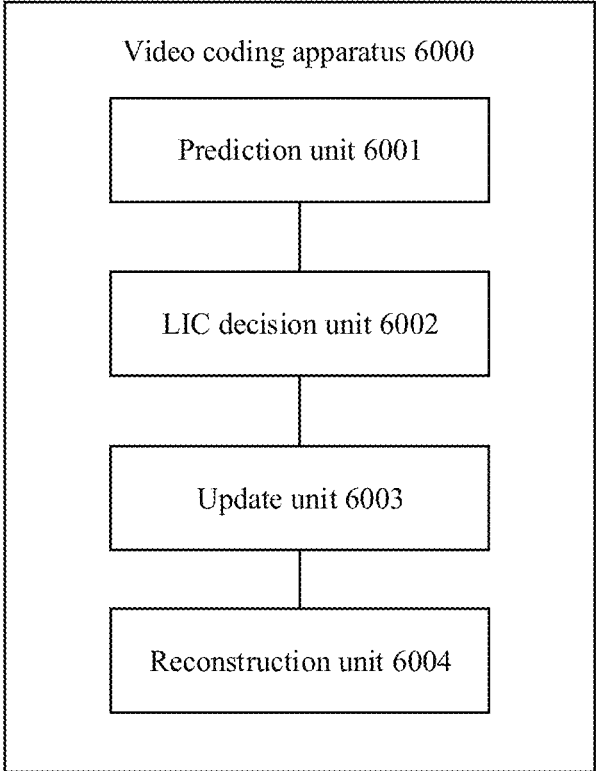
FIG. 14 is a block diagram of an instance of a video encoding or decoding apparatus 6000 used to implement an embodiment of the present invention.

FIG. 14 is a schematic block diagram of a video picture encoding or decoding apparatus according to an embodiment of this application. An apparatus 6000 shown in FIG. 14 includes: a prediction unit 6001, configured to obtain a predicted pixel value of a current affine block; an LIC decision unit 6002, configured to obtain an LIC flag of the current affine block, where the LIC flag is used to indicate whether local illumination compensation (LIC) is applied to the current affine block; an update unit 6003, configured to: when a value of the LIC flag is a first value, update the predicted pixel value of the current affine block based on an update coefficient for LIC, to obtain an updated predicted pixel value of the current affine block; and a reconstruction unit 6004, configured to reconstruct the current affine block based on the updated predicted pixel value; where the reconstruction unit 6004 is further configured to: when the value of the LIC flag is a second value, reconstruct the current affine block based on the predicted pixel value.

Figure 15:
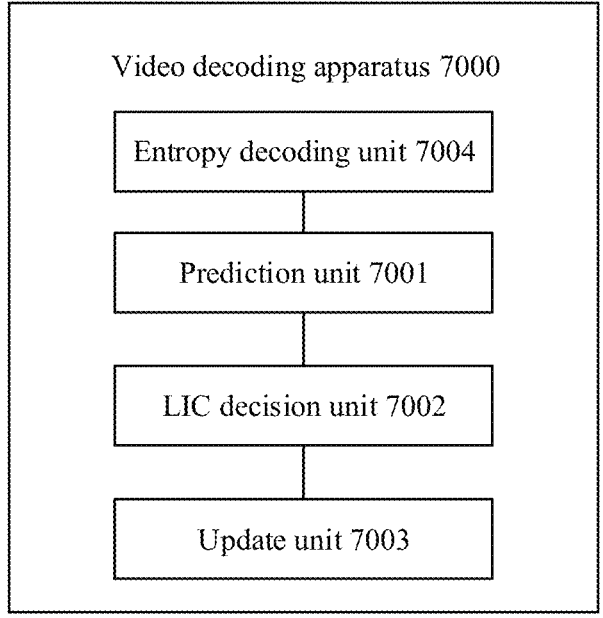
FIG. 15 is a block diagram of another example video decoding apparatus 7000 used to implement an embodiment of the present invention.

FIG. 15 is a schematic block diagram of a video picture decoding apparatus according to an embodiment of this application. An apparatus 7000 shown in FIG. 15 includes: an entropy decoding unit 7004, configured to parse a bitstream to obtain a candidate index; a prediction unit 7001, configured to determine a corresponding candidate from a list based on the index, where the candidate includes an LIC flag and an affine model parameter or information representing an affine model parameter, and obtain a predicted pixel value of a current affine block based on the affine model parameter or the information representing the affine model parameter in the candidate (for example, obtain a motion vector of each subblock of the current affine block, so as to obtain a predicted pixel value of each subblock of the current affine block); an LIC decision unit 7002, configured to determine, based on the LIC flag in the candidate, whether local illumination compensation (local illumination compensation, LIC) is applied to the current affine block; and an update unit 7003, configured to: when the LIC decision unit determines to perform LIC on the current affine block (or when the LIC decision unit determines to perform LIC on one or more subblocks of the current affine block), update the predicted pixel value of the current affine block based on an update coefficient for LIC, to obtain an updated predicted pixel value of the current affine block.

In some possible embodiments, the information representing the affine model parameter includes a multi-tuple motion vector and position coordinates that are corresponding to a plurality of control points of the current affine block, or a multi-tuple motion vector and position coordinates that are corresponding to a plurality of control points of an adjacent affine block of the current affine block.

In some possible embodiments, the LIC decision unit 7002 is configured to: when a value of the LIC flag is a first value, determine to perform LIC on the current affine block (or determine to perform LIC on one or more subblocks of the current affine block); or when a value of the LIC flag is a second value, determine not to perform LIC on the current affine block (or determine not to perform LIC on one or more subblocks of the current affine block).

It should be further noted that for specific implementation of the entropy decoding unit 7004, the prediction unit 7001, the LIC decision unit 7002, and the update unit 7003, refer to related description in the foregoing embodiment. For brevity of the specification, details are not described herein again.

A person skilled in the art can appreciate that functions described with reference to various illustrative logical blocks, modules, and algorithm steps disclosed in this specification may be implemented by hardware, software, firmware, or any combination thereof. If the functions are implemented by software, the functions described in various illustrative logical blocks, modules, and steps may be stored in or transmitted by a computer-readable medium as one or more instructions or code, and executed by a hardware-based processing unit. The computer-readable medium may include a computer-readable storage medium. The computer-readable storage medium corresponds to a tangible medium such as a data storage medium, or a communication medium including any medium that facilitates transmission of a computer program from a place to another place (for example, according to a communication protocol). In this manner, the computer-readable medium may be generally corresponding to: (1) a non-transitory tangible computer-readable storage medium, or (2) a communication medium such as a signal or a carrier. A data storage medium may be accessed by one or more computers or one or more processors to retrieve an instruction, code, and/or a data structure for implementing any available medium in technologies described in the present invention. A computer program product may include a computer-readable medium.

By way of example and not limitation, some computer-readable storage media may include a RAM, a ROM, an EEPROM, a CD-ROM, another optical disc storage device or magnetic disk storage device, another magnetic storage apparatus, a flash memory, or any other medium that can store required program code in a form of an instruction or a data structure and can be accessed by a computer. Furthermore, any connection is appropriately referred to as a computer-readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer-readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), and a Blu-ray disc, where the disk generally magnetically reproduces data, and the optical disc optically reproduces data by using a laser. A combination of the above shall further be included in the scope of the computer-readable medium.

The instructions may be executed by one or more processors such as one or more digital signal processors (DSPs), general purpose microprocessors, application-specific integrated circuits (ASICs), field-programmable gate arrays (FPGAs), or other equivalent integrated or discrete logic circuits. Therefore, the term "processor" used in this specification may refer to the foregoing structure, or any other structure that may be applied to implementation of the technologies described in this specification. In addition, in some aspects, the functionalities described in this specification may be provided in a dedicated hardware and/or software module configured for encoding and decoding, or may be incorporated into a combined codec. In addition, the technologies may be fully implemented in one or more circuits or logic elements.

The technologies in the present invention may be implemented in various apparatuses or devices, including a wireless handset, an integrated circuit (IC), or a group of ICs (for example, a chipset). In the present invention, various components, modules, or units are described to emphasize functions of an apparatus configured to implement the disclosed technologies, but the functions do not need to be implemented by different hardware units. Actually, as described above, various units may be combined into a codec hardware unit, or may be provided by interoperable hardware units (including one or more processors described above) in combination with appropriate software and/or firmware.

In the foregoing embodiments, the description of each embodiment has respective focuses. For a part that is not described in detail in an embodiment, refer to related descriptions in other embodiments.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method, comprising:
parsing or deriving a candidate index from a bit stream of video data;
constructing a list using an inherited control point motion vector prediction method or a constructed control point motion vector prediction method, wherein the list comprises a candidate list or a history-based candidate list, each candidate in the list is a candidate for using in a prediction process of a current block, and each candidate in the list comprises a multi-tuple motion vector and a local illumination compensation (LIC) flag;
determining a candidate from the list based on the candidate index;
obtaining an LIC flag of the current block based on the candidate that is determined from the list based on the candidate index, wherein the LIC flag of the current block indicates whether LIC is applied to the current block, and wherein an LIC flag in the candidate in the list that is determined based on the candidate index is used as the LIC flag of the current block, or the LIC flag of the current block is inherited from the LIC flag in the candidate in the list that is determined based on the candidate index;
performing LIC to the current block when a value of the LIC flag of the current block is equal to a first value, to obtain a prediction block of the current block; and
skipping performing LIC to the current block when a value of the LIC flag of the current block is equal to a second value; and
wherein an affine model of the current block is inherited from an affine model of an adjacent block of the current block.

2. The method according to claim 1, wherein an inter prediction mode of the current block is an affine mode.

3. The method according to claim 1, wherein performing LIC comprises updating a predicted pixel value of the current block based on an LIC update coefficient, to obtain an updated predicted pixel value of the current block.

4. The method according to claim 1, wherein each candidate in the list further comprises a prediction direction.

5. The method according to claim 1, wherein the list comprises the history-based candidate list.

6. The method according to claim 1, wherein constructing the list using the inherited control point motion vector prediction method or the constructed control point motion vector prediction method comprises:
constructing the list using the inherited control point motion vector prediction method.

7. The method according to claim 1, wherein constructing the list using the inherited control point motion vector prediction method or the constructed control point motion vector prediction method comprises:
constructing the list using the constructed control point motion vector prediction method.

8. A device, comprising:
at least one memory storing instructions; and
at least one processor coupled to the at least one memory and configured to execute the instructions to cause the device to be configured to:
parse or derive a candidate index from a bit stream of video data;
construct a list using an inherited control point motion vector prediction method or a constructed control point motion vector prediction method, wherein the list comprises a candidate list or a history-based candidate list, each candidate in the list is a candidate for using in a prediction process of a current block, and each candidate in the list comprises a multi-tuple motion vector and a local illumination compensation (LIC) flag;
determine a candidate from the list based on the candidate index
obtain an LIC flag of the current block based on the candidate that is determined from the list based on the candidate index, wherein the LIC flag of the current block indicates whether LIC is applied to the current block, and wherein an LIC flag in the candidate in the list that is determined based on the candidate index is used as the LIC flag of the current block, or the LIC flag of the current block is inherited from the LIC flag in the candidate in the list that is determined based on the candidate index;
perform LIC to the current block when a value of the LIC flag of the current block is equal to a first value, to obtain a prediction block of the current block; and
skip performing LIC to the current block when a value of the LIC flag of the current block is equal to a second value; and
wherein an affine model of the current block is inherited from an affine model of an adjacent block of the current block.

9. The device according to claim 8, wherein an inter prediction mode of the current block is an affine mode.

10. The device according to claim 8, wherein performing LIC comprises updating a predicted pixel value of the current block based on an LIC update coefficient, to obtain an updated predicted pixel value of the current block.

11. The device according to claim 8, wherein each candidate in the list further comprises a prediction direction.

12. The device according to claim 8, wherein the list comprises the history-based candidate list.

13. The device according to claim 8, wherein constructing the list using the inherited control point motion vector prediction method or the constructed control point motion vector prediction method comprises:

constructing the list using the inherited control point motion vector prediction method.

14. The device according to claim 8, wherein constructing the list using the inherited control point motion vector prediction method or the constructed control point motion vector prediction method comprises:

constructing the list using the constructed control point motion vector prediction method.

15. A non-transitory computer-readable medium storing computer instructions that, when executed by one or more processors, cause the one or more processors to perform operations comprising:

parsing or deriving a candidate index from a bit stream of video data;

constructing a list using an inherited control point motion vector prediction method or a constructed control point motion vector prediction method, wherein the list comprises a candidate list or a history-based candidate list, each candidate in the list is a candidate for using in a prediction process of a current block, and each candidate in the list comprises a multi-tuple motion vector and a local illumination compensation (LIC) flag;

determining a candidate from the list based on the candidate index;

obtaining an LIC flag of the current block based on the candidate that is determined from the list based on the candidate index, wherein the LIC flag indicates whether LIC is applied to the current block, and wherein an LIC flag in the candidate in the list that is determined based on the candidate index is used as the LIC flag of the current block, or the LIC flag of the current block is inherited from the LIC flag in the candidate in the list that is determined based on the candidate index;

performing LIC to the current block when a value of the LIC flag of the current block is equal to a first value, to obtain a prediction block of the current block; and skipping performing LIC to the current block when a value of the LIC flag of the current block is equal to a second value; and wherein an affine model of the current block is inherited from an affine model of an adjacent block of the current block.

16. The non-transitory computer-readable medium according to claim 15, wherein an inter prediction mode of the current block is an affine mode.

17. The non-transitory computer-readable medium according to claim 15, wherein performing LIC comprises updating a predicted pixel value of the current block based on an LIC update coefficient, to obtain an updated predicted pixel value of the current block.

18. The non-transitory computer-readable medium according to claim 15, wherein the list comprises the history-based candidate list.

19. The non-transitory computer-readable medium according to claim 15, wherein constructing the list using the inherited control point motion vector prediction method or the constructed control point motion vector prediction method comprises:

constructing the list using the inherited control point motion vector prediction method.

20. The non-transitory computer-readable medium according to claim 15, wherein constructing the list using the inherited control point motion vector prediction method or the constructed control point motion vector prediction method comprises:

constructing the list using the constructed control point motion vector prediction method.

\* \* \* \* \*